US012762972B1

(12) United States Patent
Perez et al.

(10) Patent No.: US 12,762,972 B1
(45) Date of Patent: Oct. 13, 2026

(54) ELECTRONIC VEHICULAR INCIDENT REPORTING SYSTEM AND PROCESSES

(71) Applicants: Michael Arthur Perez, Walnut, CA (US); Andrew C Ray, Concord, CA (US); Patrick Washington, View Park, CA (US)

(72) Inventors: Michael Arthur Perez, Walnut, CA (US); Andrew C Ray, Concord, CA (US); Patrick Washington, View Park, CA (US)

(73) Assignee: Certified Safe Driver, Inc., Walnut, CA (US)

( * ) Notice: Subject to any disclaimer, the term of this patent is extended or adjusted under 35 U.S.C. 154(b) by 0 days.

(21) Appl. No.: 18/406,233

(22) Filed: Jan. 8, 2024

Related U.S. Application Data

(63) Continuation-in-part of application No. 18/118,593, filed on Mar. 7, 2023, now abandoned, which is a continuation of application No. 17/098,060, filed on Nov. 13, 2020, now Pat. No. 11,600,199.

(60) Provisional application No. 62/935,009, filed on Nov. 13, 2019.

(51) Int. Cl.

| | |
|---|---|
| ***G09B 19/16*** | (2006.01) |
| ***G06V 20/59*** | (2022.01) |
| ***G06V 40/20*** | (2022.01) |
| *G06Q 10/10* | (2023.01) |
| *G06Q 30/018* | (2023.01) |
| *G06Q 50/20* | (2012.01) |
| *G06Q 50/26* | (2012.01) |

(52) U.S. Cl.
CPC ......... *G09B 19/167* (2013.01); *G06V 20/597* (2022.01); *G06V 40/20* (2022.01); *G06Q 10/10* (2013.01); *G06Q 30/018* (2013.01); *G06Q 50/2057* (2013.01); *G06Q 50/265* (2013.01)

(58) Field of Classification Search
CPC .... G09B 19/167; G06V 20/597; G06V 40/20; G06Q 10/10; G06Q 30/018; G06Q 50/2057; G06Q 50/265
See application file for complete search history.

(56) References Cited

U.S. PATENT DOCUMENTS

| | | | | |
|---|---|---|---|---|
| 8,660,918 | B2 * | 2/2014 | Weber | G06Q 40/02 434/362 |
| 11,853,926 | B1 * | 12/2023 | Jones | G06V 20/60 |
| 2017/0084065 | A1 * | 3/2017 | Gordon | G06F 16/5838 |

* cited by examiner

*Primary Examiner* — Timothy A Musselman
(74) *Attorney, Agent, or Firm* — Plager Schack LLP; Mark H. Plager; Stephen Hallberg

(57) ABSTRACT

A cloud-based training tool for coaching and reinforcement of defensive driver skills and knowledge, an electronic vehicular incident reporting system (EIRS) and an EIRS process are disclosed. The cloud-based training tool for coaching and reinforcement of defensive driver skills and knowledge is unlike anything in its field. The cloud-based training tool for coaching and reinforcement of defensive driver skills and knowledge uses a scoring system that provides accuracy on knowledge and skills. The EIRS process and system provide comprehensive procedural control and guidance for gathering all critical information related to a vehicular incident.

6 Claims, 43 Drawing Sheets

ELECTRONIC VEHICULAR INCIDENT REPORTING SYSTEM AND PROCESSES

CLAIM OF BENEFIT TO PRIOR APPLICATION

This application is a continuation-in-part of and claims benefit to U.S. Non-Provisional patent application Ser. No. 18/118,593, entitled "INCIDENT EVALUATION, TRAINING, AND CORRECTION PROCESSES AND SYSTEM WITH A CLOUD-BASED TRAINING TOOL FOR COACHING AND REINFORCEMENT OF DEFENSIVE DRIVER SKILLS AND KNOWLEDGE," filed Mar. 7, 2023, which itself is a continuation application of U.S. Non-Provisional patent application Ser. No. 17/098,060, filed Nov. 13, 2020 and now granted as U.S. Pat. No. 11,600,199, issued Mar. 7, 2023. The U.S. Non-Provisional patent application Ser. No. 18/118,593 is incorporated herein by reference.

BACKGROUND

Embodiments of the invention described in this specification relate generally to vehicle accident reporting systems, and more particularly, to an electronic vehicular incident reporting system and electronic vehicular incident reporting system processes that provide guided, comprehensive guidance for a driver to gather crash critical details pertaining to a crash incident or accident.

Manual input of data is typically needed before creating and compiling data analysis reports. However, this manual process is time consuming and prone to error. Many systems use check marks for binary input (e.g., YES or NO, marked manually in form). Reducing the process of manual input from creating and compiling data analysis reports is a key aspect in providing an effective evaluation, training, and correct behavior reinforcing mechanism to drivers and other workers or agents in various environments.

In addition to providing effective evaluation and training to drivers (and other workers or agents), and reinforcing correct driver behavior, there are also other aspects of driving, such as vehicular incidents, that all too often result in injury or property damage. Specifically, many drivers (for companies or other professional drivers) get into accidents or encounter incidents (such as injuries) which need to be reported and followed through. For example, vehicular incidents that result in vehicle damage, other property damage, or injury need to be reported to insurance or a company (driver operating vehicle for company). However, there is often so much site-based information that needs to be captured and relayed to insurance/company for a vehicular incident that it is typical for a driver to miss some information, which later on becomes difficult to track down (e.g., witnesses at the scene are near impossible to track down if their name and/or contact information is not ascertained at the site of the incident) and retrieve (e.g., capturing images of damage to vehicle(s) and/or property, which later on may be fixed by a repair shop, construction/contractor, etc.). These and other details are usually best retrieved at the time and site of the vehicular incident, yet there are so many details involved in any incident that drivers simply miss some of the them or, due to possible trauma of the accident, miss many of them. Consequently, much of the critical information needed at the site of an accident or incident is forgotten or missed.

Some existing options are available to help drivers in such situations. For example, conventional vehicle insurance apps exist which allow drivers to communicate with insurance providers about an accident or incident. However, the conventional options are very limited and fail to guide or direct a user in gathering all the critical information needed at the accident site (and at the time of, or shortly after, the accident). Furthermore, existing insurance apps are not designed in ways to provide critical vehicular incident details to relevant working groups associated with a driver. For example, if the driver is involved with an accident and was operating a company vehicle, the company would be highly interested in receiving all the critical details of the incident. Furthermore, some companies may also wish to have their own insurance to handle subsequent claims arising out the incident, yet there are no apps which link companies and insurance providers in getting such vehicular incident details after an accident. In essence, there is no existing company, system, or mobile app that captures all vital detail information in one system that is able to get to the root cause of any incident/accident/injury/illness.

Therefore, what is needed is a way to provide guiding user support to control the procedural steps in gathering critical information at the onset of an accident or incident so that vital information is retained by the driver (and made available to a company or organization associated with the driver) and to further ensure that all of the critical incident details and information are captured and aggregated together into one system that is able to get to the root cause of any incident/accident/injury/illness.

BRIEF DESCRIPTION

An incident evaluation, training, and correction system and process and an electronic vehicular incident reporting system and a comprehensive electronic vehicular incident reporting process are disclosed. In some embodiments, the comprehensive electronic vehicular incident reporting process comprises a plurality of electronic vehicular incident reporting processes.

In some embodiments, the incident evaluation, training, and correction system and process are designed to spot at-risk behavior, explain both the at-risk behavior and correct behavior, enforce the correct behavior, and document the incident that gave rise to the at-risk behavior. In some embodiments, the incident evaluation, training, and correction system includes a cloud-based training tool for coaching and reinforcement of defensive driver skills and knowledge. In some embodiments, the cloud-based training tool uses a scoring system that provides accuracy on knowledge and skills.

In some embodiments, the comprehensive electronic vehicular incident reporting process and the electronic vehicular incident reporting system (hereinafter also referred to as the "electronic incident reporting system", the "electronic crash incident reporting system", the "EIRS system", or simply by reference to acronyms "E.I.R.S." or "EIRS") provide comprehensive procedural control and guidance for gathering all critical information related to a vehicular incident.

In some embodiments, the comprehensive electronic vehicular incident reporting process is implemented in software and, when running on a computing device (such as a mobile device or other computing device), provide step-by-step guidance and comprehensive procedural control for gathering all critical information related to a vehicular incident. In some embodiments, the plurality of electronic vehicular incident reporting processes (hereinafter also referred to as the "electronic incident reporting processes", the "electronic crash incident reporting processes", or the "EIRS processes") are implemented in the software-implementation of the comprehensive electronic vehicular incident reporting process. In some embodiments, the plurality of EIRS processes are each implemented as software programs that are integrated into the software-implementation of the comprehensive EIRS process and also configured to run on a computing device independently.

In some embodiments, the software implementation of the plurality of EIRS processes comprises a mobile software application ("mobile app" or "EIRS mobile app") that is configured to run on a mobile device of a driver (also referred to as a "user"). In some embodiments, the plurality of EIRS processes comprise a plurality of high-level EIRS processes and a plurality of comprehensive detailed EIRS processes. In some embodiments, each of several EIRS processes in the plurality of EIRS processes are implemented in the EIRS mobile app as distinct sections with distinct user interfaces through which to gather various critical information related to a vehicular incident. In some embodiments, the user proceeds through the plurality of EIRS processes by interacting with the distinct user interfaces of the EIRS mobile app in sequence. In some embodiments, the user selectively and non-sequentially proceeds through one or more of the EIRS processes by navigating to and interacting with the user interfaces associated with the selected EIRS processes and their corresponding sections in the EIRS mobile app. In this way, the EIRS mobile app provides a mobile way to capture crash critical information about an incident, thereby ensuring that a driver of a vehicle involved in the incident can easily gather all of the critical information pertaining to the incident by a guided sequence or guided, non-sequential completion of the work involved in gathering all of the crash critical information.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
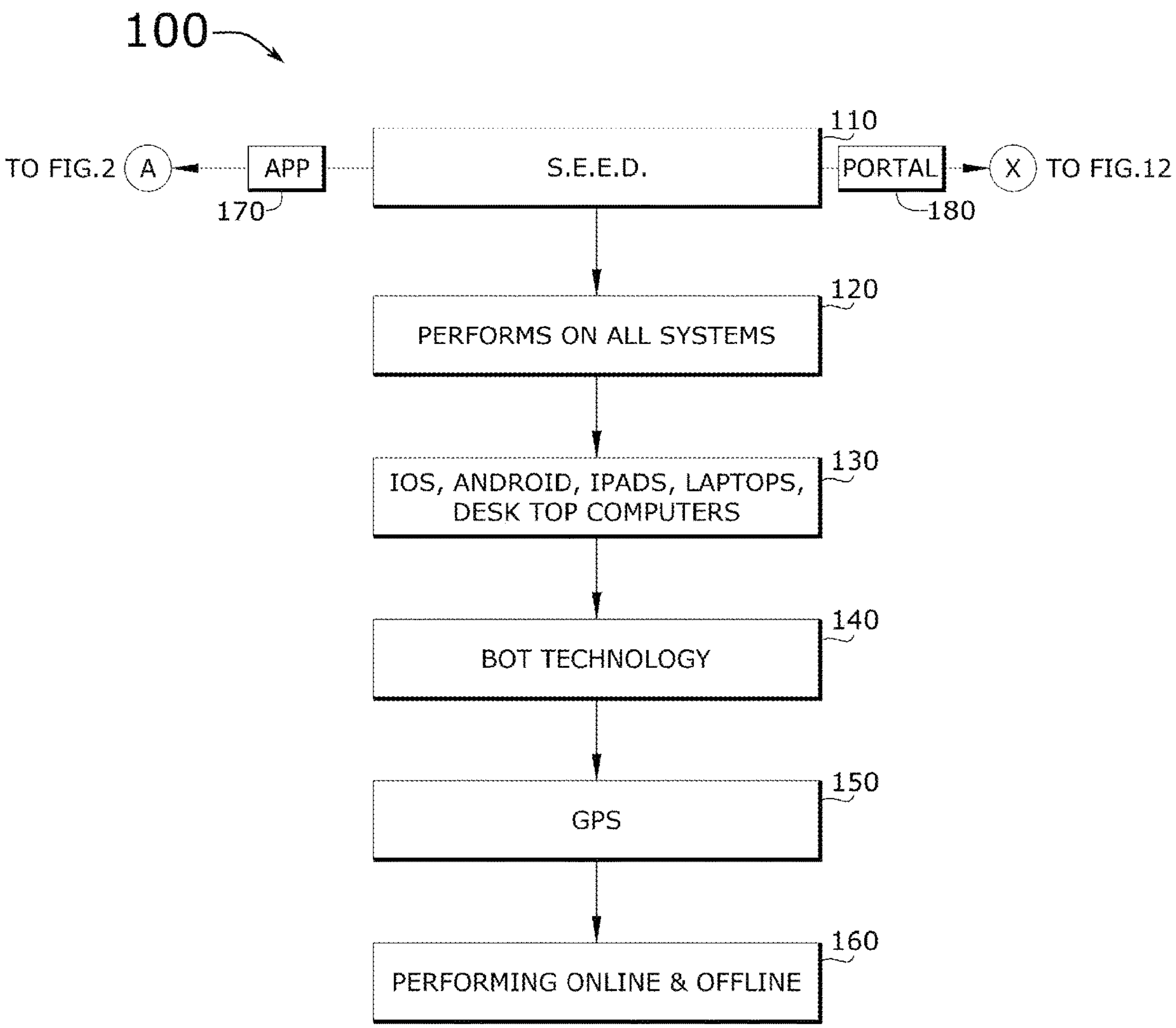

Having thus described the invention in general terms, reference is now made to the accompanying drawings, which are not necessarily drawn to scale, and which show different views of different example embodiments, and wherein:

FIG. 1 conceptually illustrates a cloud-based training tool of a SEED system that performs a SEED process in some embodiments.

Figure 2:
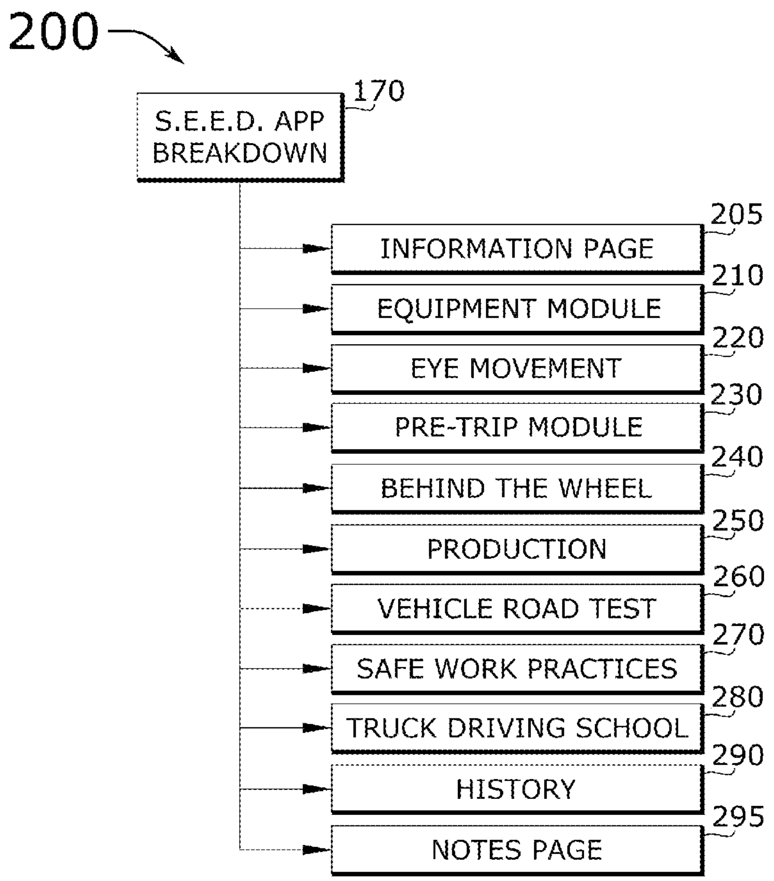

FIG. 2 conceptually illustrates a high level breakdown of a SEED app implementation of an incident evaluation, training, and correction process for spotting at-risk behavior, explaining the both at-risk behavior and correct behavior, enforcing the correct behavior, and documenting the incident that gave rise to the at-risk behavior in some embodiments.

Figure 3:
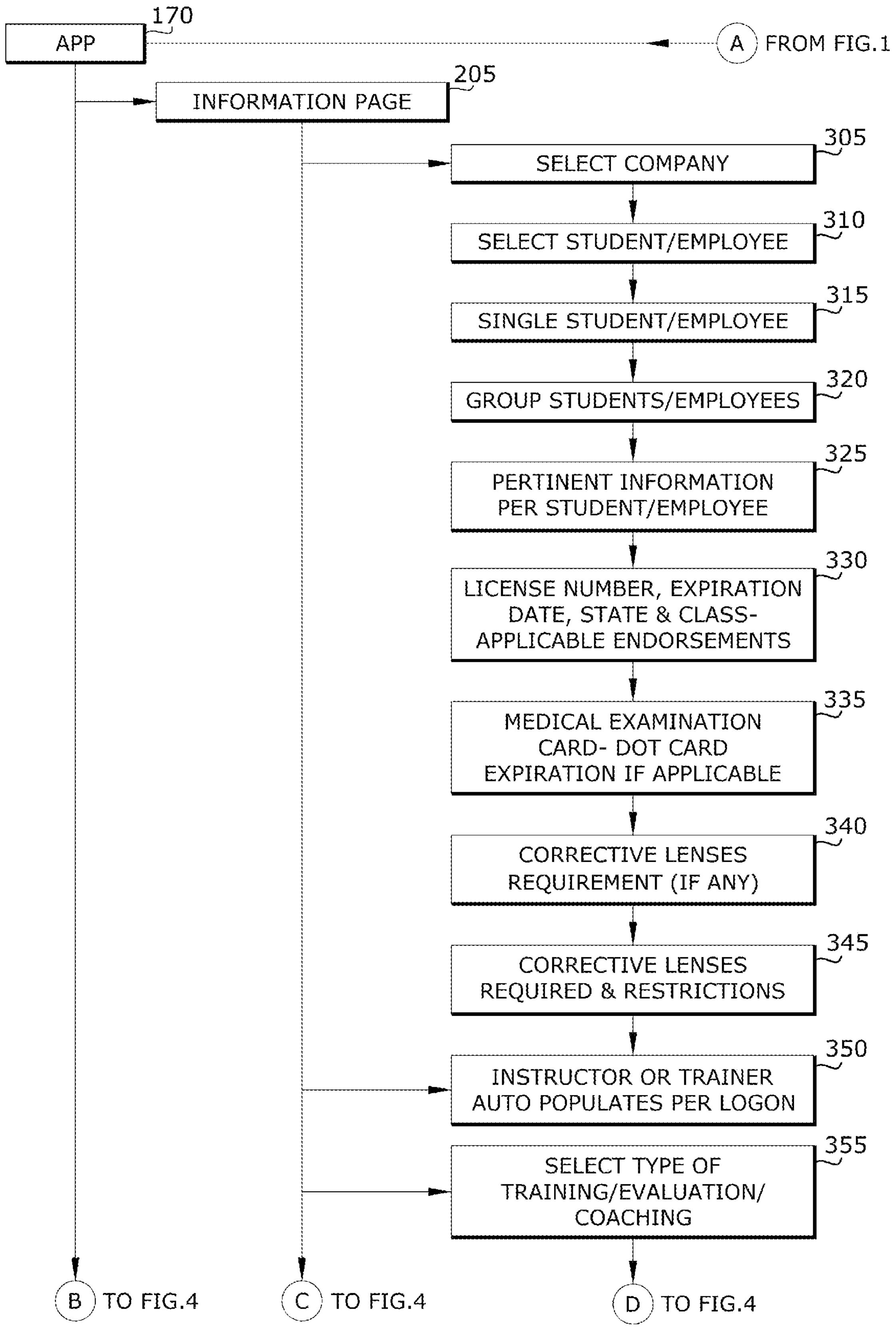

FIG. 3 conceptually illustrates a detailed breakdown of a SEED app implementation of an incident evaluation, training, and correction process for spotting at-risk behavior, explaining the both at-risk behavior and correct behavior, enforcing the correct behavior, and documenting the incident that gave rise to the at-risk behavior in some embodiments.

Figure 4:
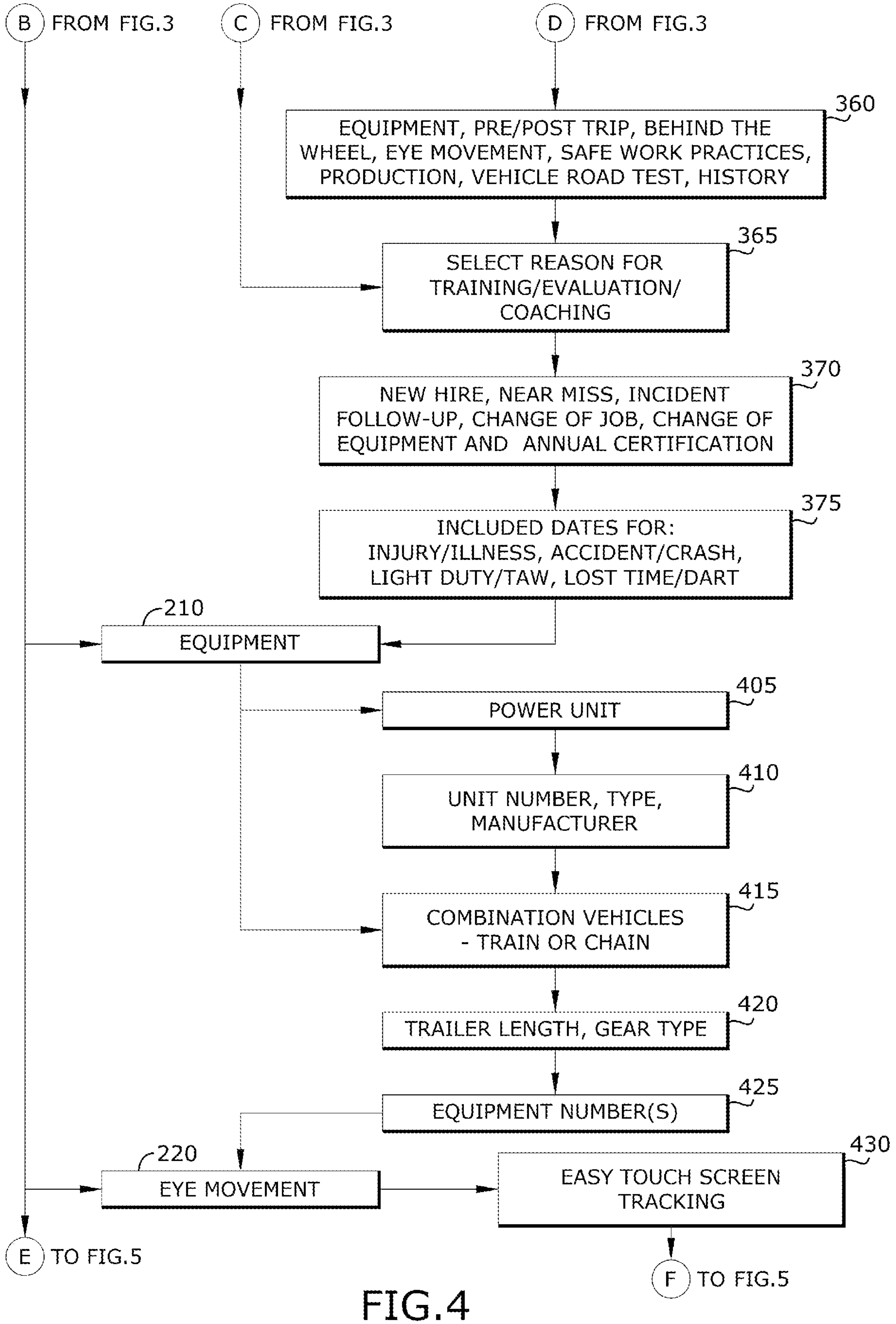

FIG. 4 conceptually illustrates a continuation of the detailed breakdown of the SEED app implementation of the incident evaluation, training, and correction process of FIG. 3.

Figure 5:
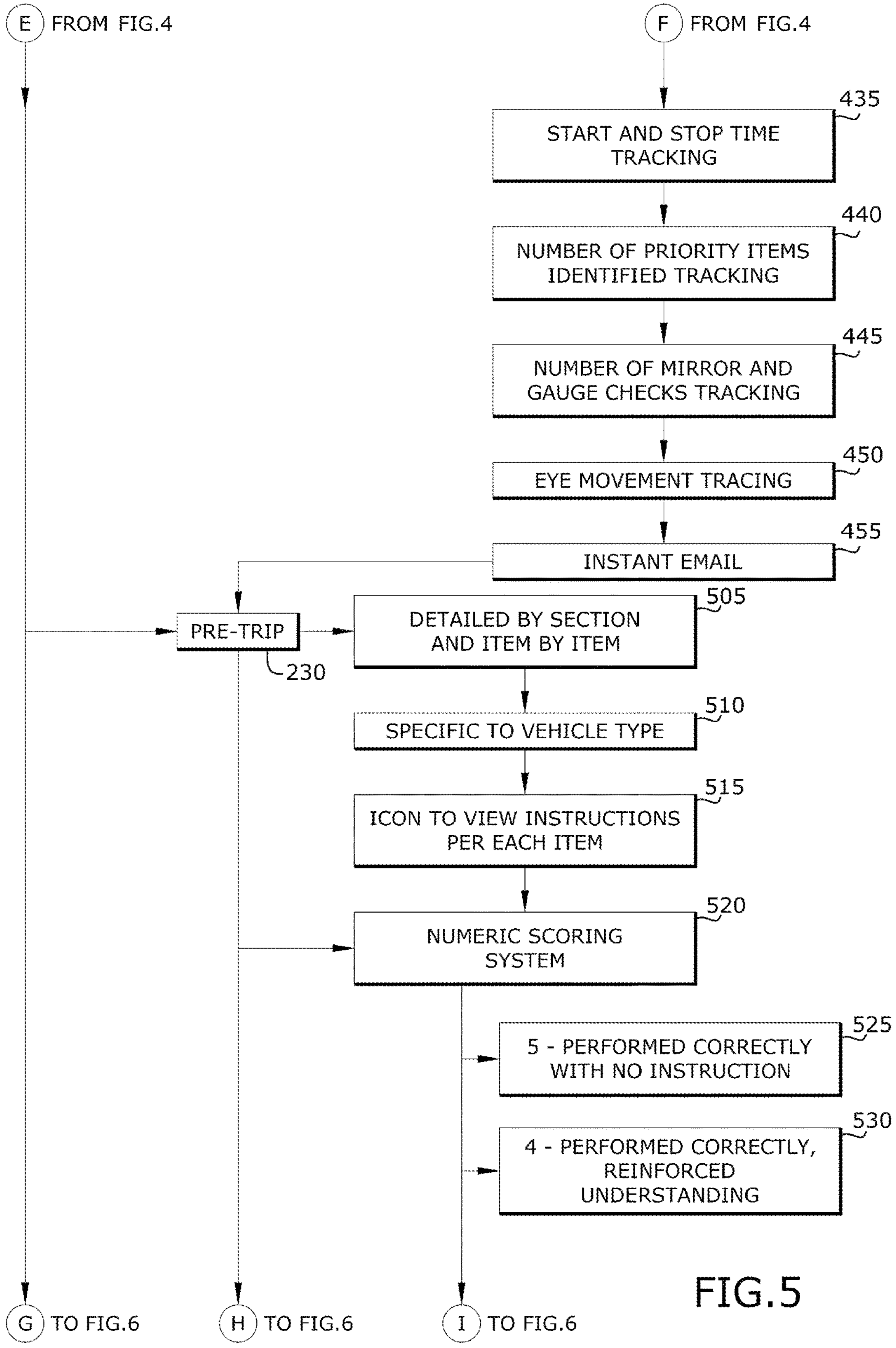

FIG. 5 conceptually illustrates a continuation of the detailed breakdown of the SEED app implementation of the incident evaluation, training, and correction process of FIG. 4.

Figure 6:
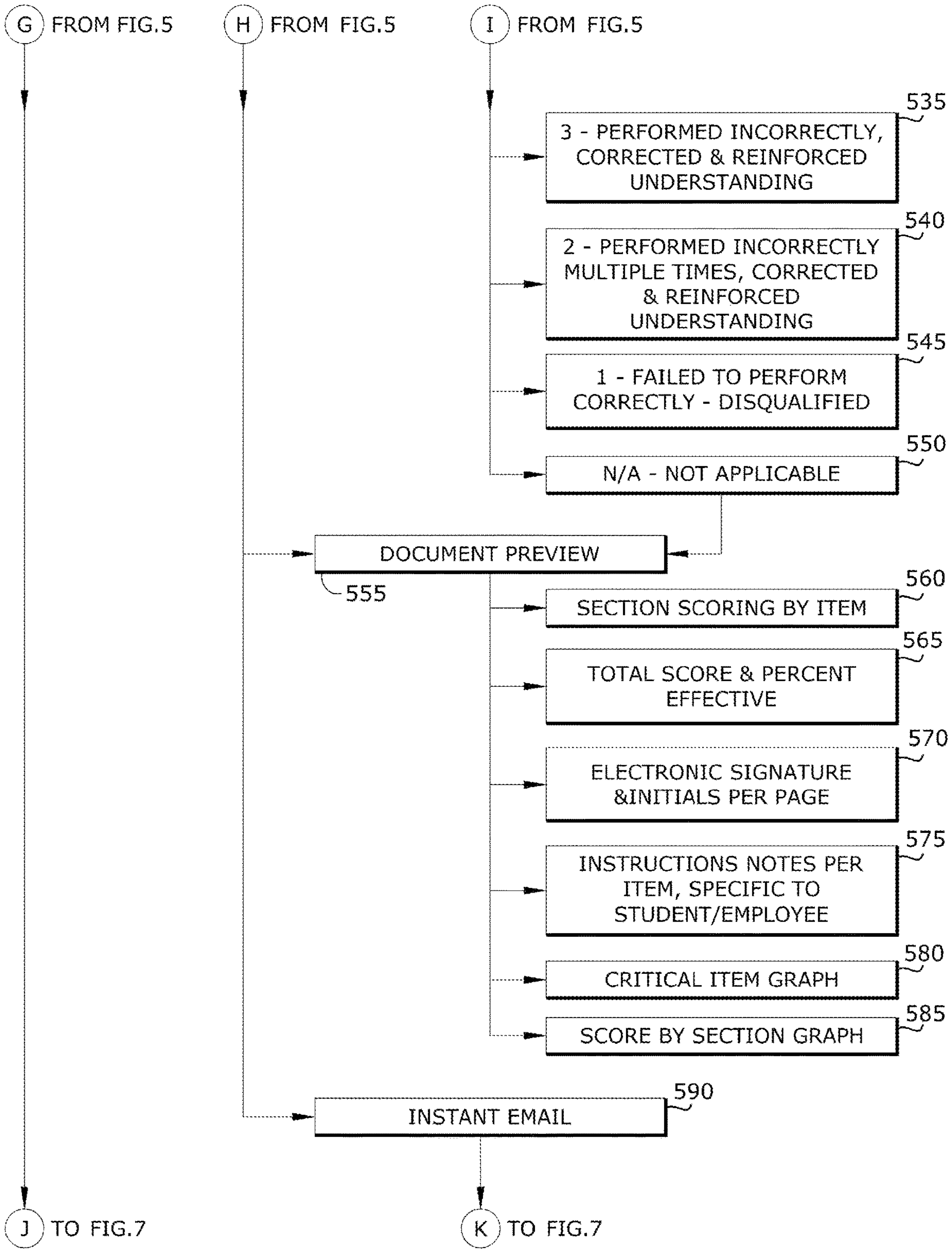

FIG. 6 conceptually illustrates a continuation of the detailed breakdown of the SEED app implementation of the incident evaluation, training, and correction process of FIG. 5.

Figure 7:
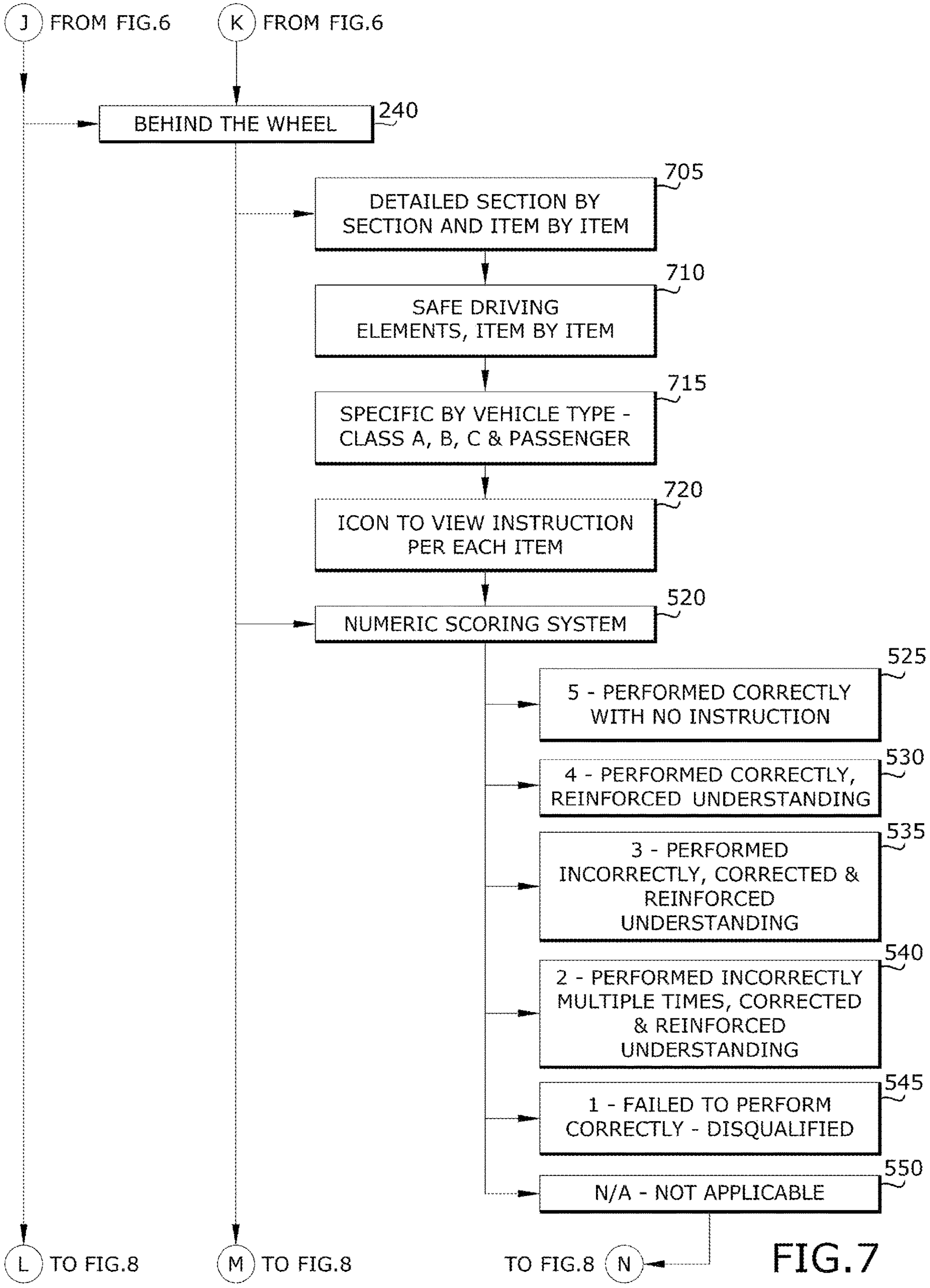

FIG. 7 conceptually illustrates a continuation of the detailed breakdown of the SEED app implementation of the incident evaluation, training, and correction process of FIG. 6.

Figure 8:
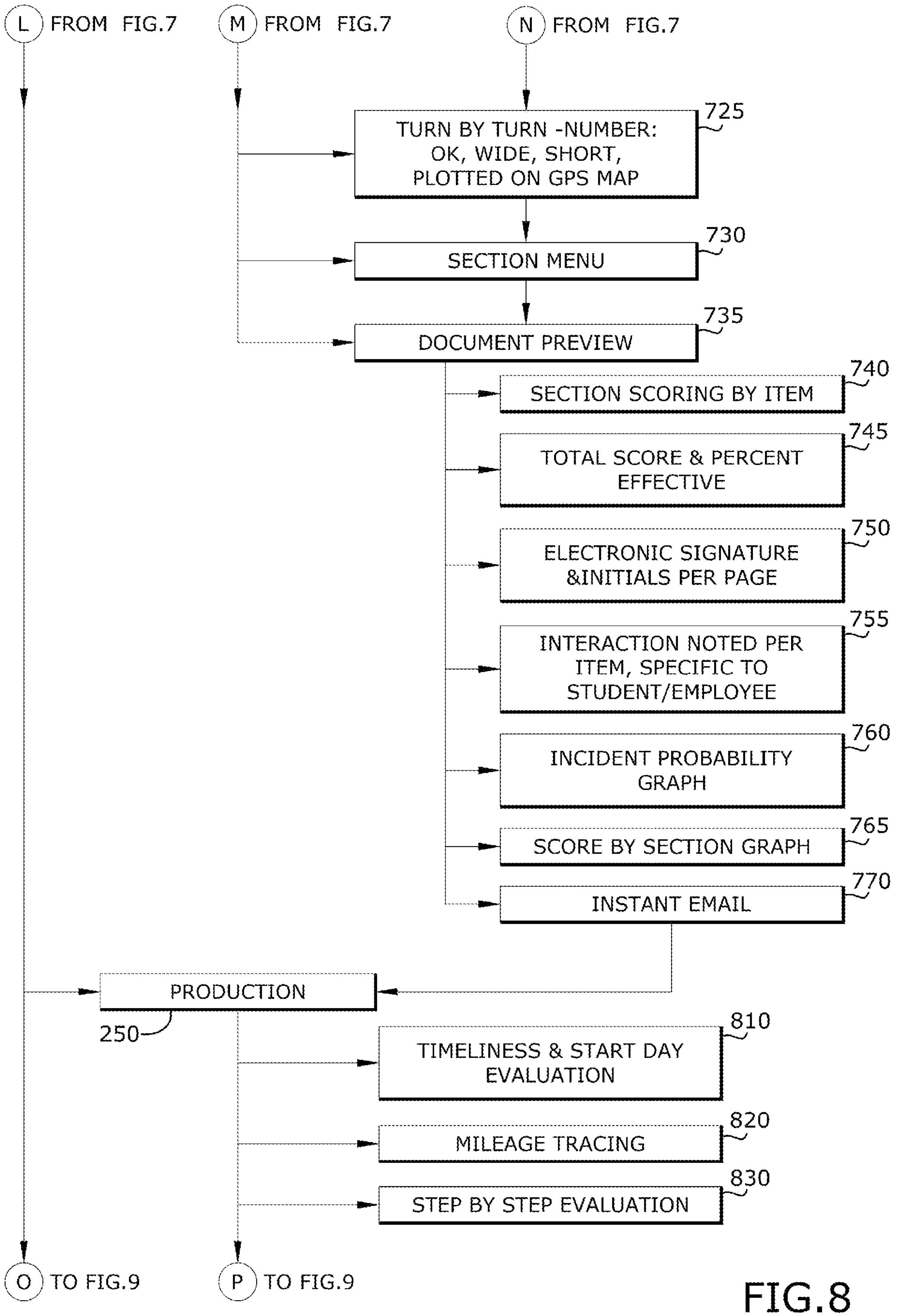

FIG. 8 conceptually illustrates a continuation of the detailed breakdown of the SEED app implementation of the incident evaluation, training, and correction process of FIG. 7.

Figure 9:
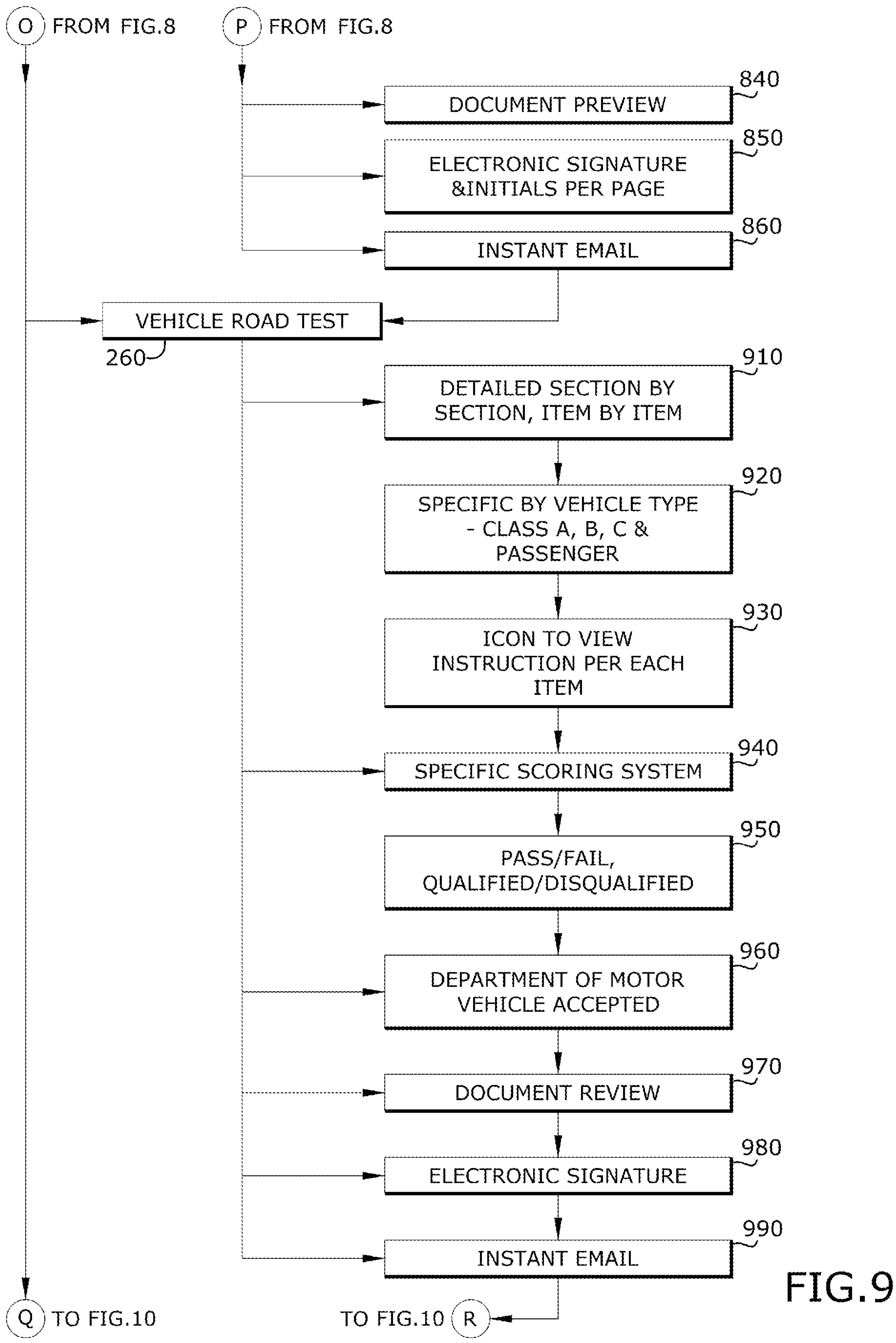

FIG. 9 conceptually illustrates a continuation of the detailed breakdown of the SEED app implementation of the incident evaluation, training, and correction process of FIG. 8.

Figure 10:
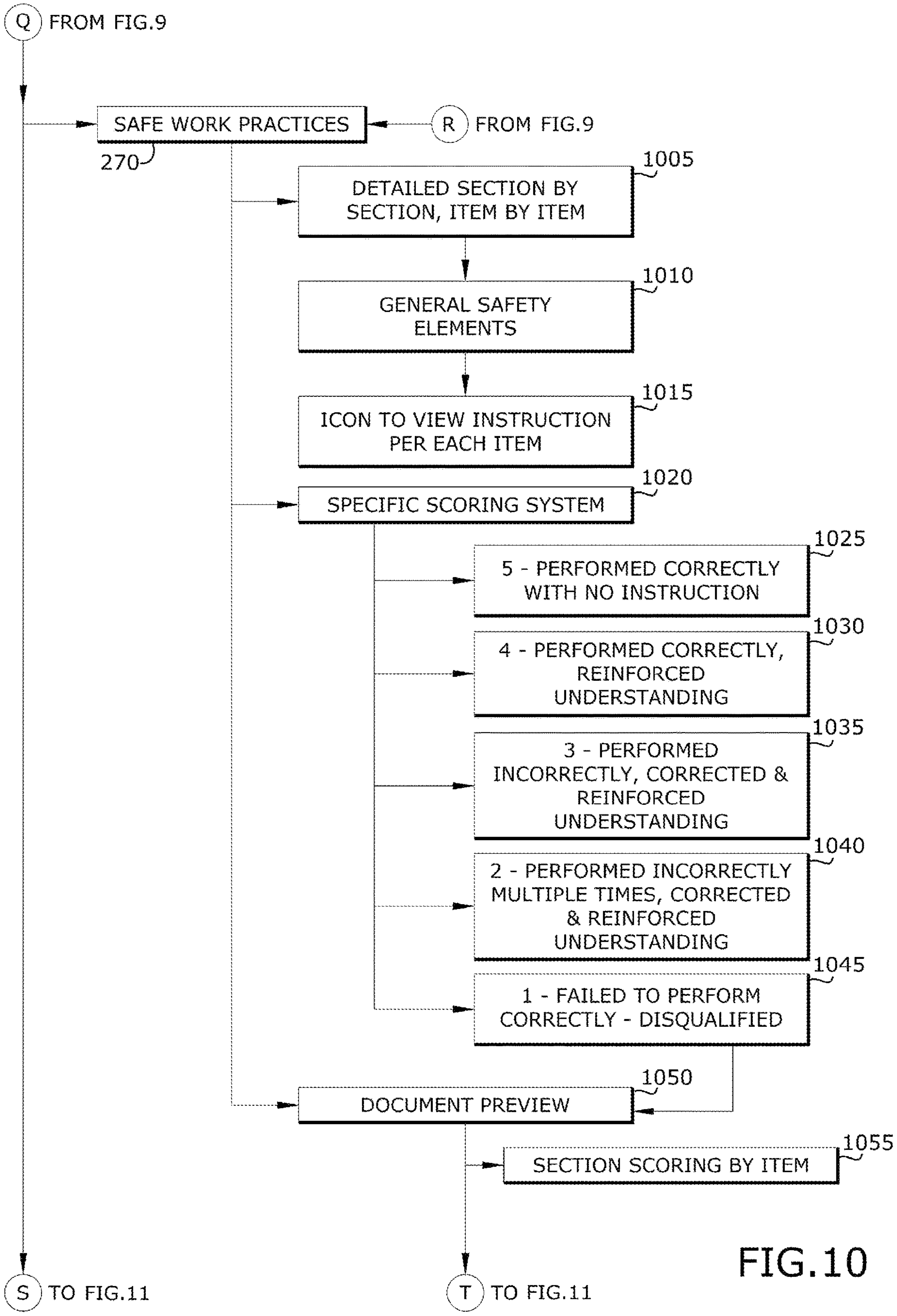

FIG. 10 conceptually illustrates a continuation of the detailed breakdown of the SEED app implementation of the incident evaluation, training, and correction process of FIG. 9.

Figure 11:
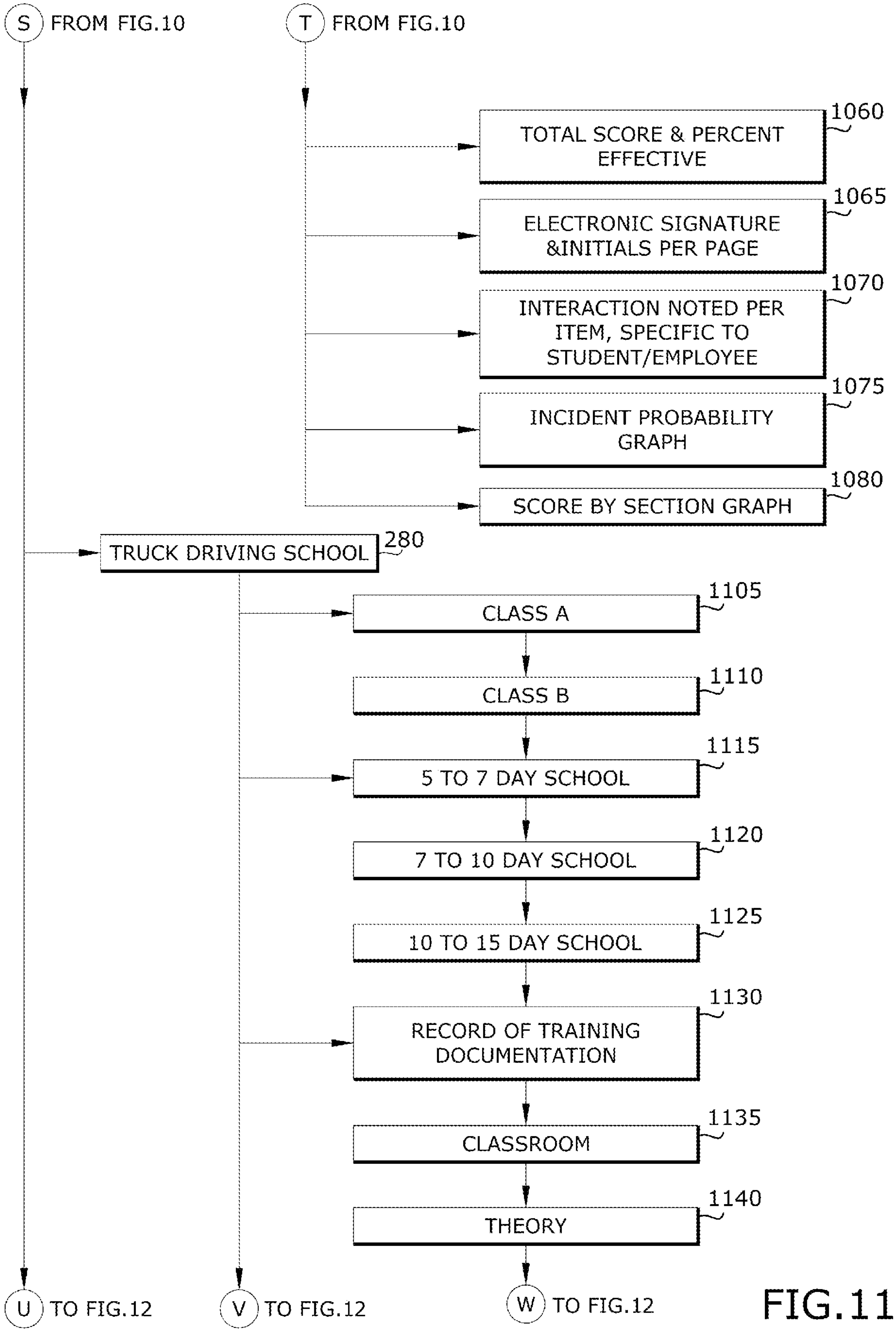

FIG. 11 conceptually illustrates a continuation of the detailed breakdown of the SEED app implementation of the incident evaluation, training, and correction process of FIG. 10.

Figure 12:
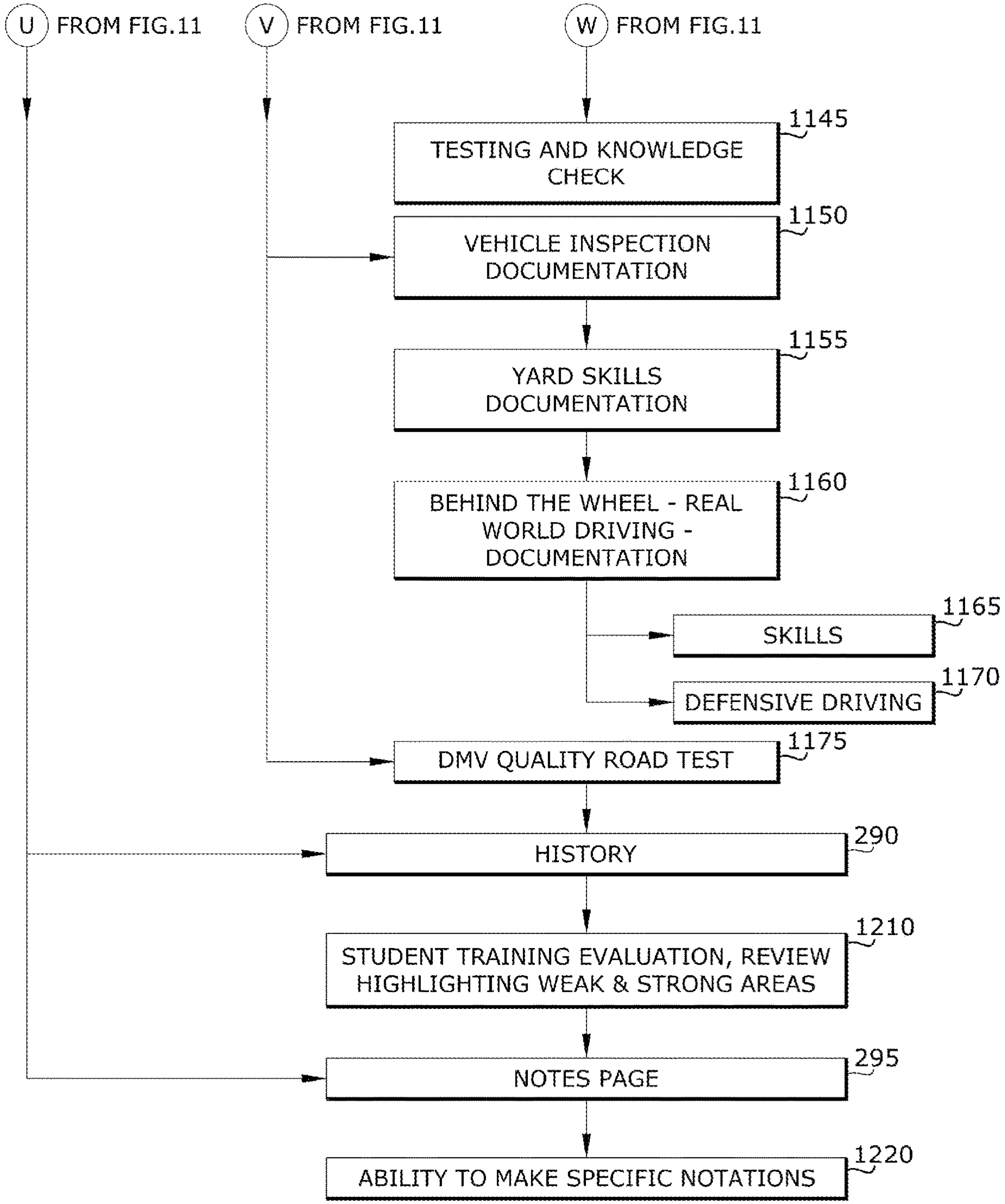

FIG. 12 conceptually illustrates a continuation of the detailed breakdown of the SEED app implementation of the incident evaluation, training, and correction process of FIG. 11.

Figure 13:
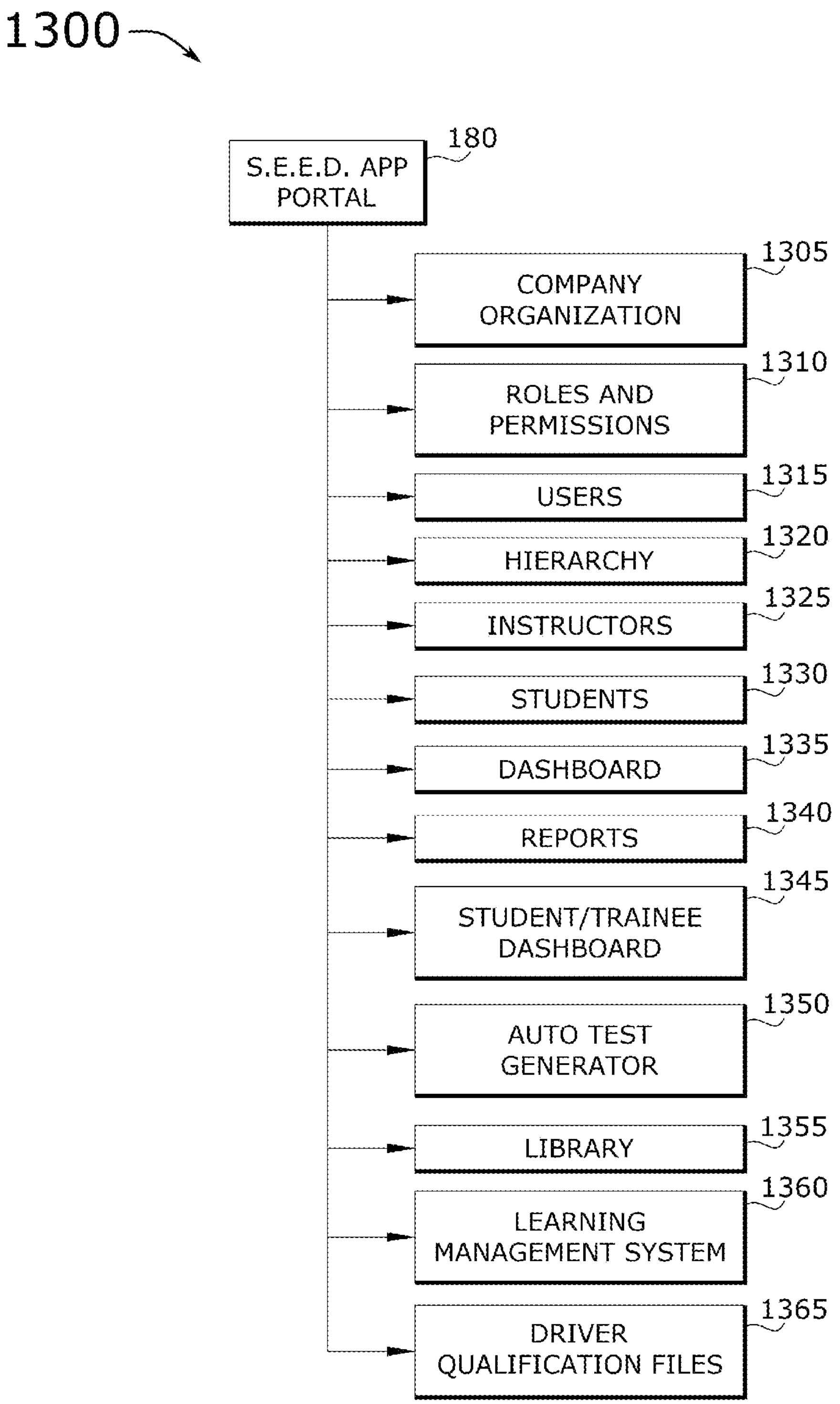

FIG. 13 conceptually illustrates a high level breakdown of a SEED portal implementation of an incident evaluation, training, and correction system to spot at-risk behavior, explain both the at-risk behavior and correct behavior, enforce the correct behavior, and document the incident that gave rise to the at-risk behavior in some embodiments.

Figure 14:
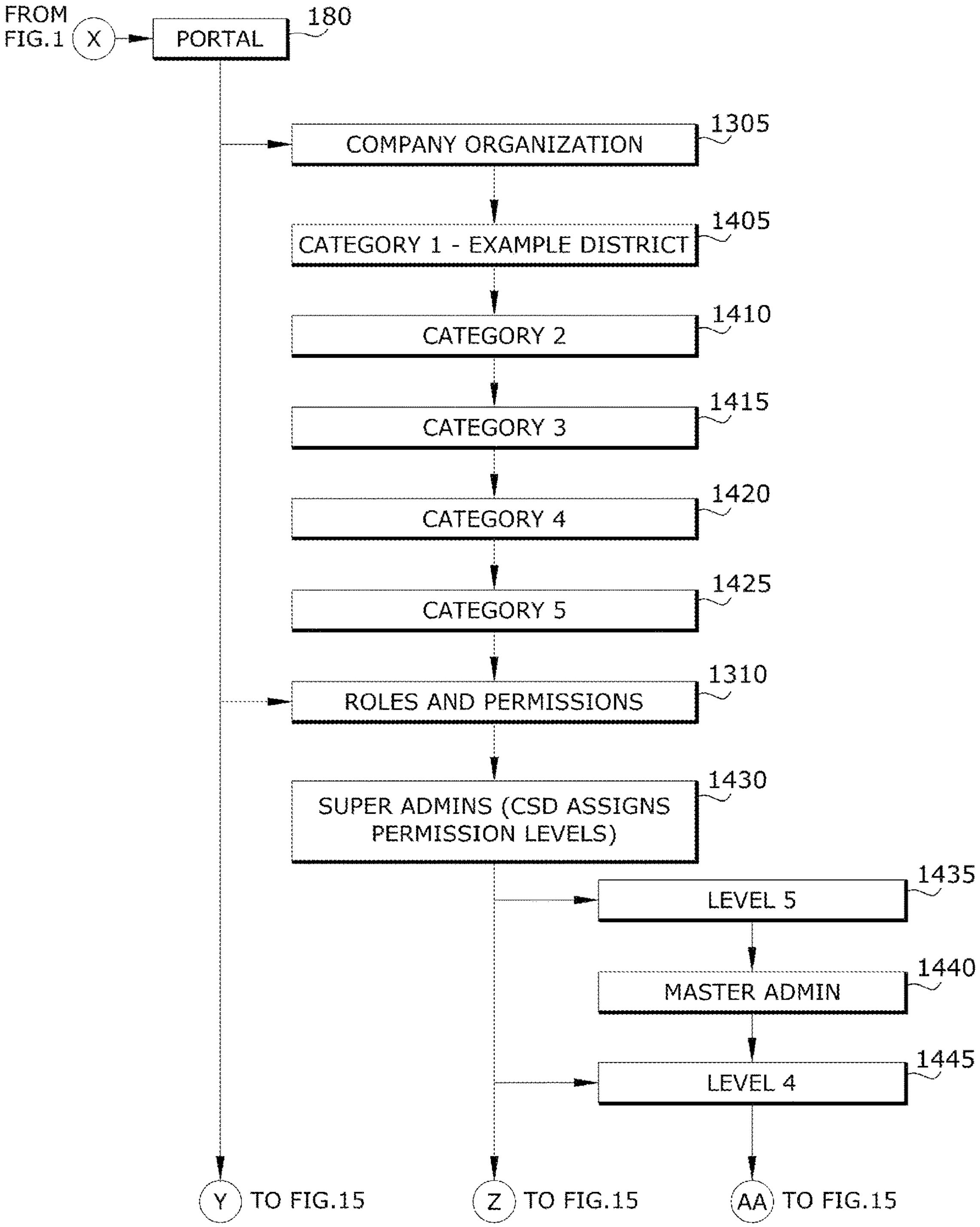

FIG. 14 conceptually illustrates a detailed breakdown of a SEED portal implementation of an incident evaluation, training, and correction system to spot at-risk behavior, explain both the at-risk behavior and correct behavior, enforce the correct behavior, and document the incident that gave rise to the at-risk behavior in some embodiments.

Figure 15:
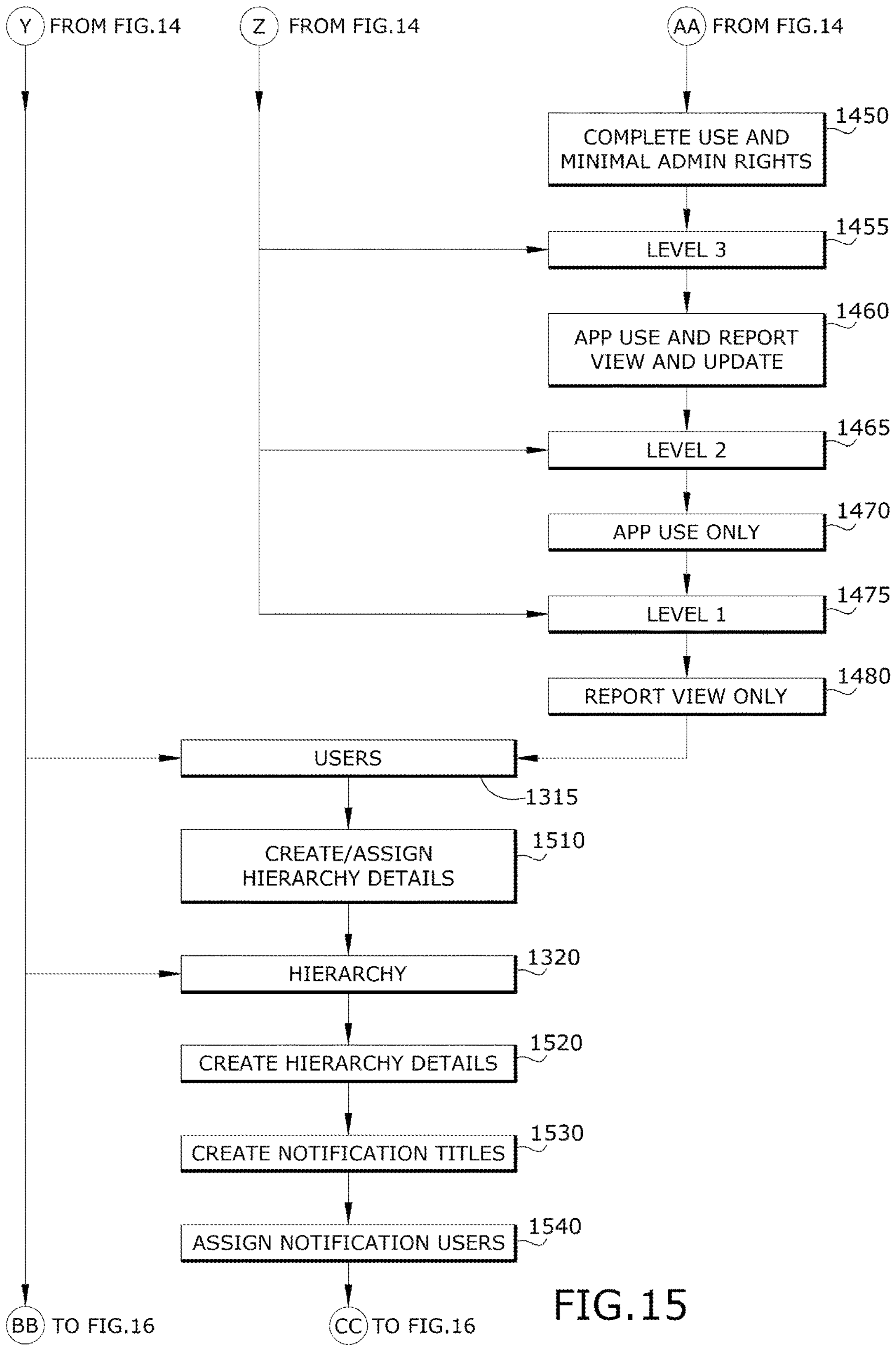

FIG. 15 conceptually illustrates a continuation of the detailed breakdown of the SEED portal implementation of the incident evaluation, training, and correction system of FIG. 14.

Figure 16:
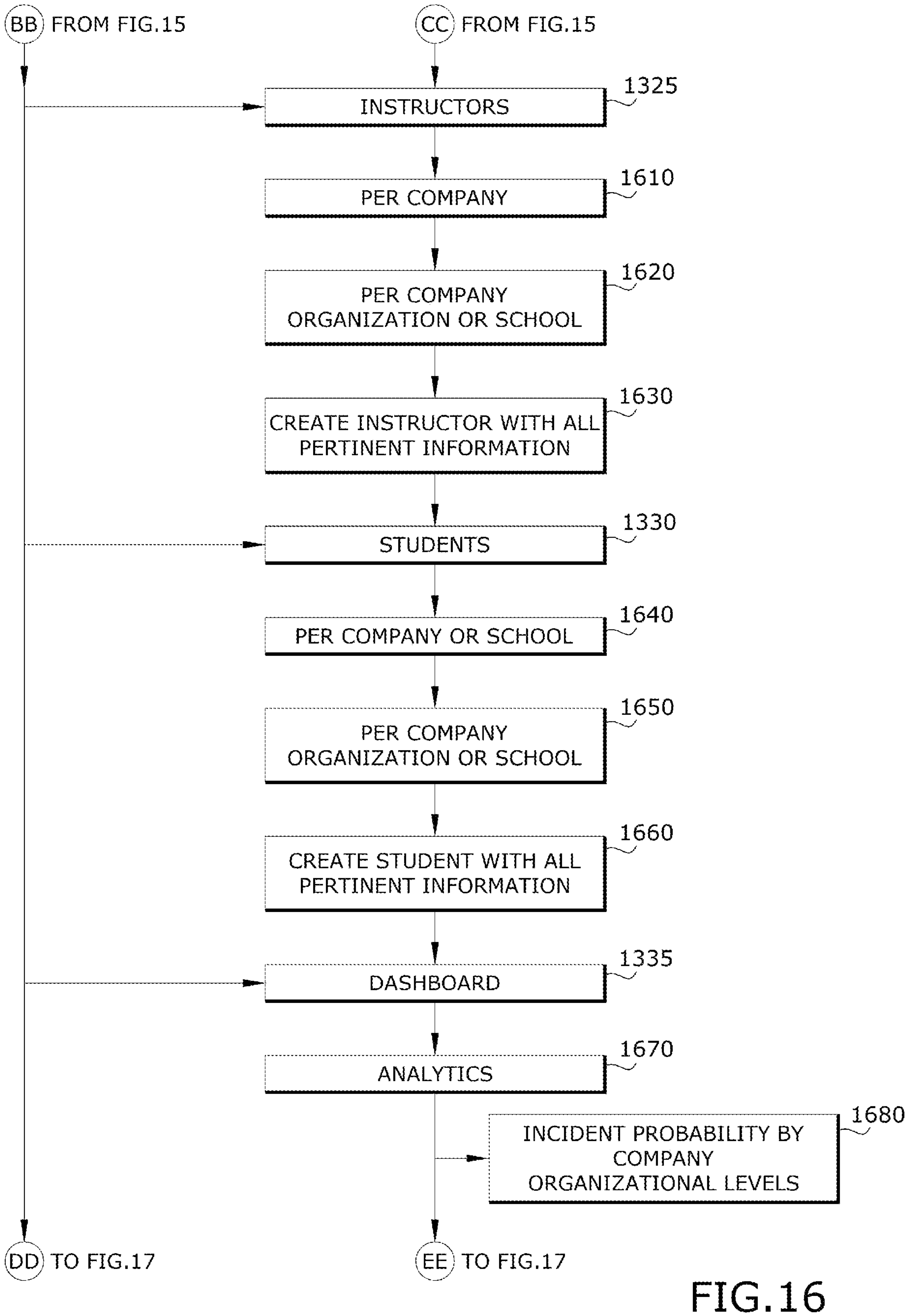

FIG. 16 conceptually illustrates a continuation of the detailed breakdown of the SEED portal implementation of the incident evaluation, training, and correction system of FIG. 15.

Figure 17:
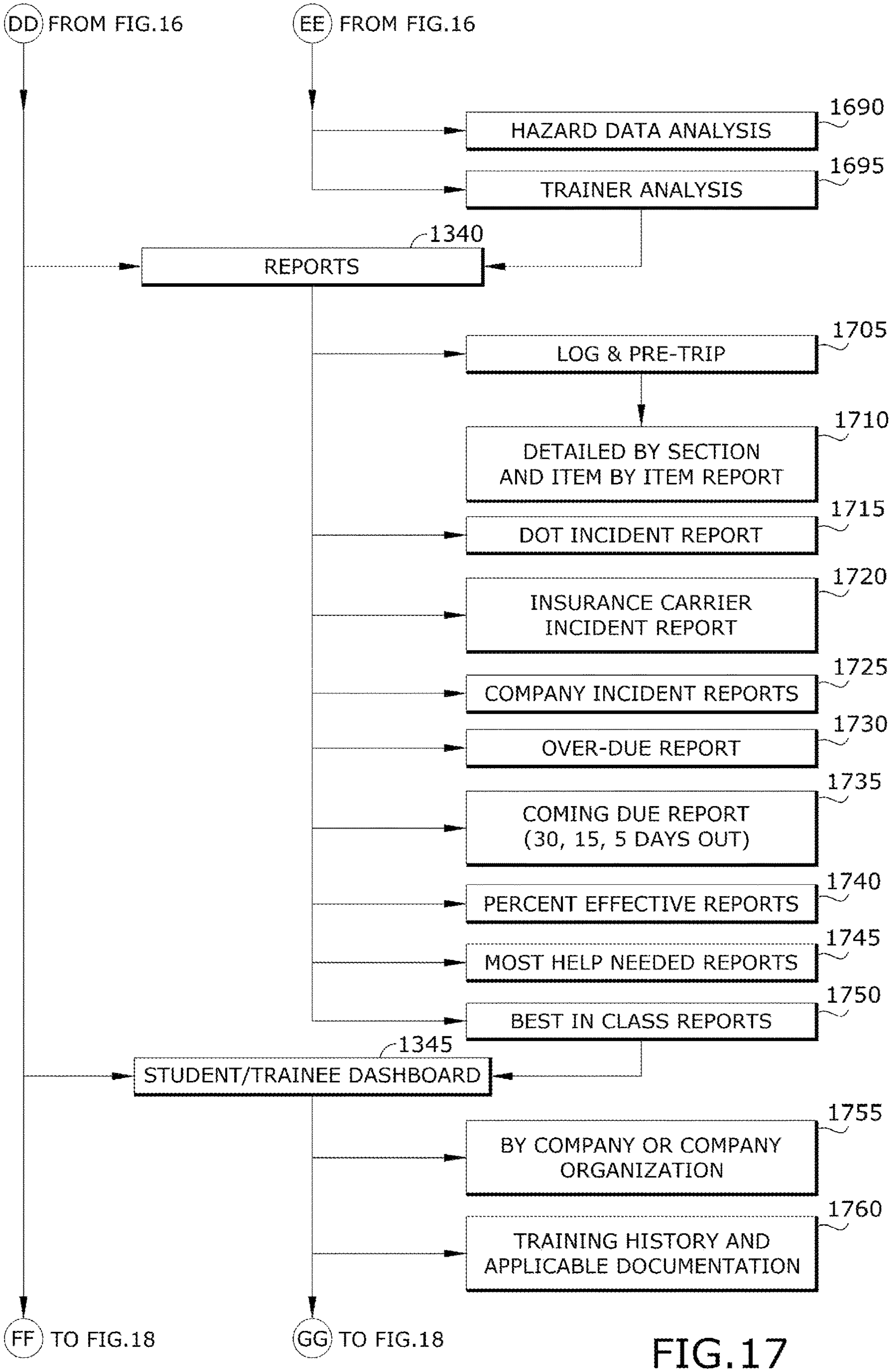

FIG. 17 conceptually illustrates a continuation of the detailed breakdown of the SEED portal implementation of the incident evaluation, training, and correction system of FIG. 16.

Figure 18:
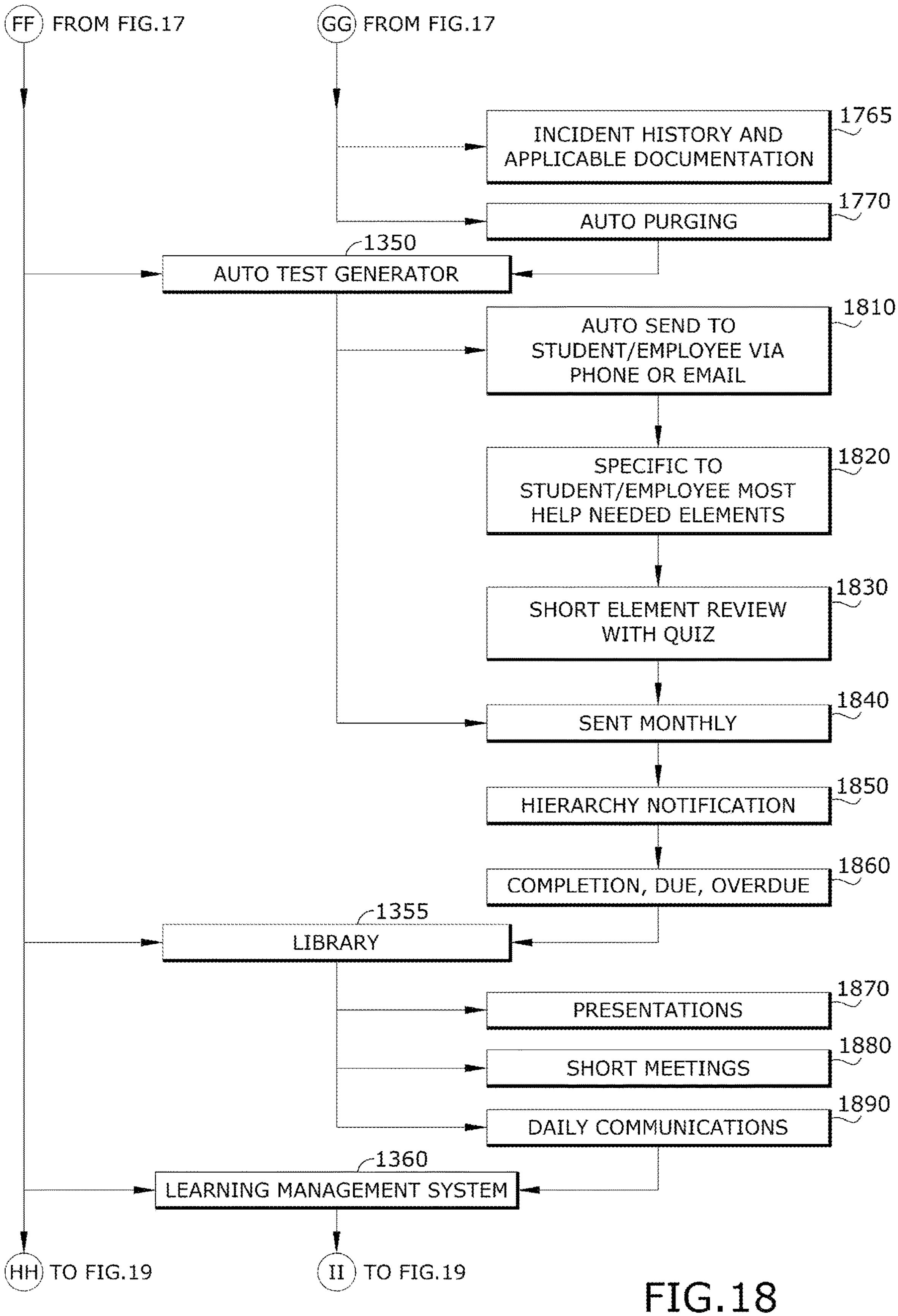

FIG. 18 conceptually illustrates a continuation of the detailed breakdown of the SEED portal implementation of the incident evaluation, training, and correction system of FIG. 17.

Figure 19:
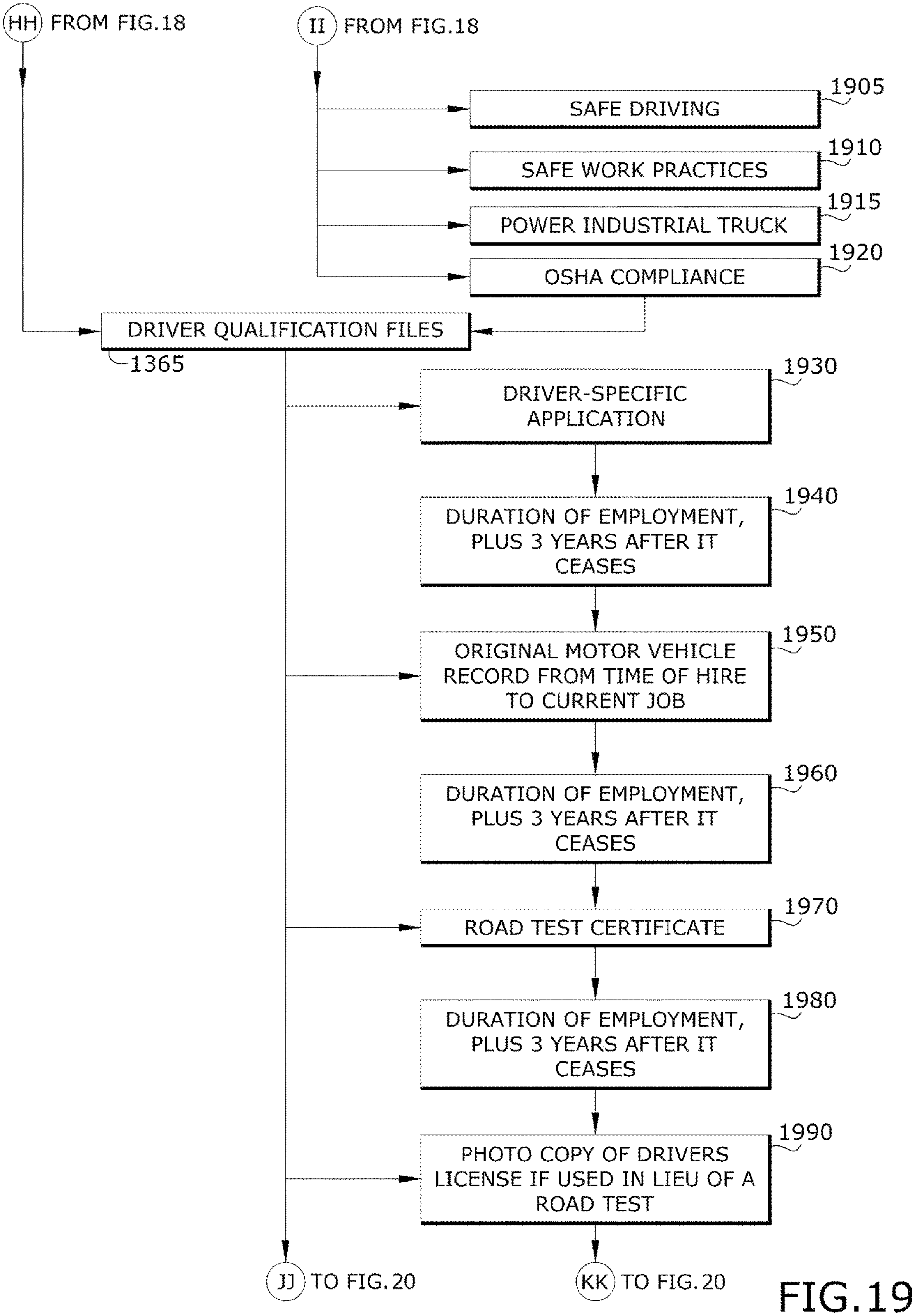

FIG. 19 conceptually illustrates a continuation of the detailed breakdown of the SEED portal implementation of the incident evaluation, training, and correction system of FIG. 18.

Figure 20:
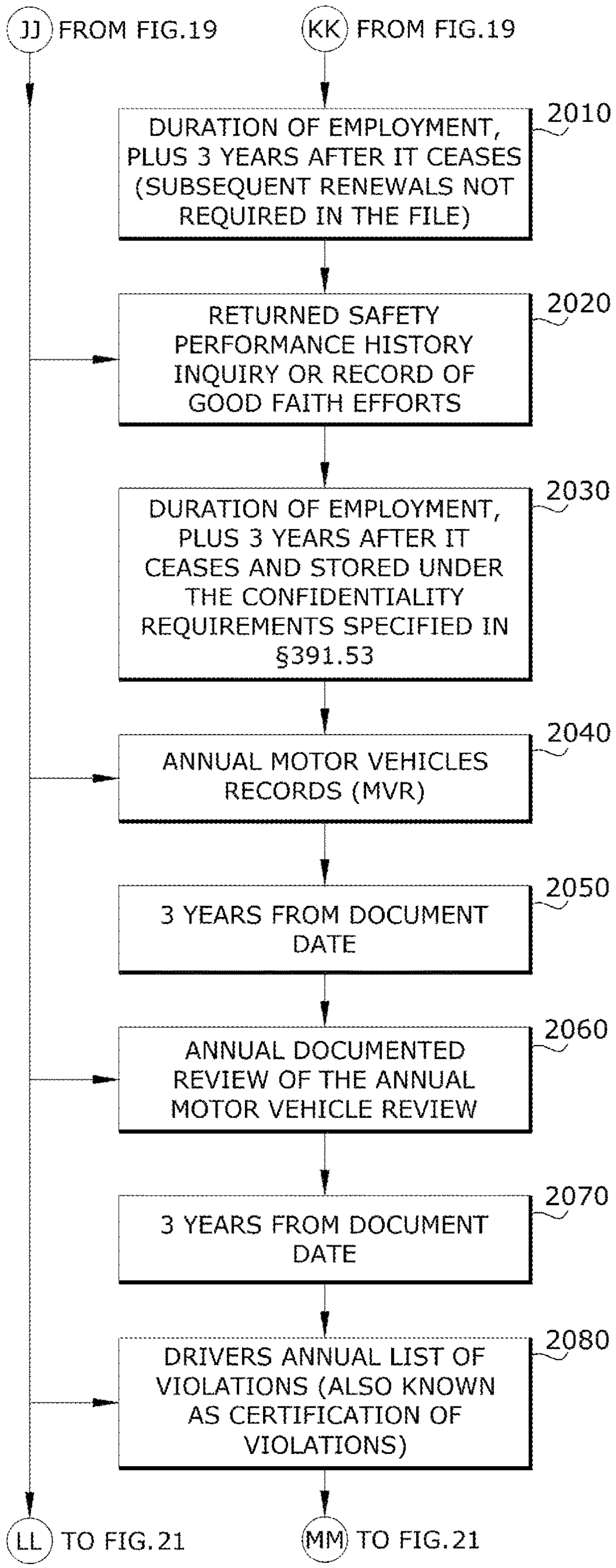

FIG. 20 conceptually illustrates a continuation of the detailed breakdown of the SEED portal implementation of the incident evaluation, training, and correction system of FIG. 19.

Figure 21:
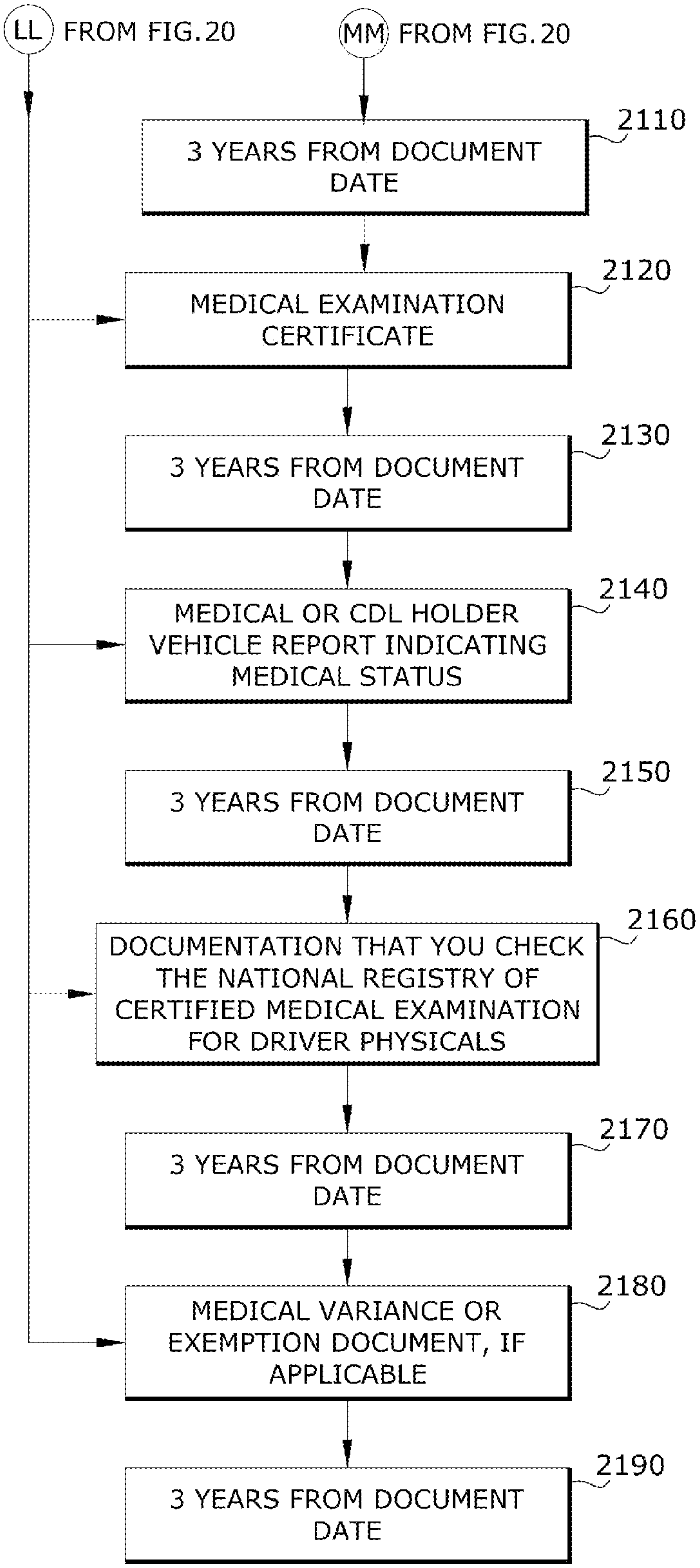

FIG. 21 conceptually illustrates a continuation of the detailed breakdown of the SEED portal implementation of the incident evaluation, training, and correction system of FIG. 20.

Figure 22:
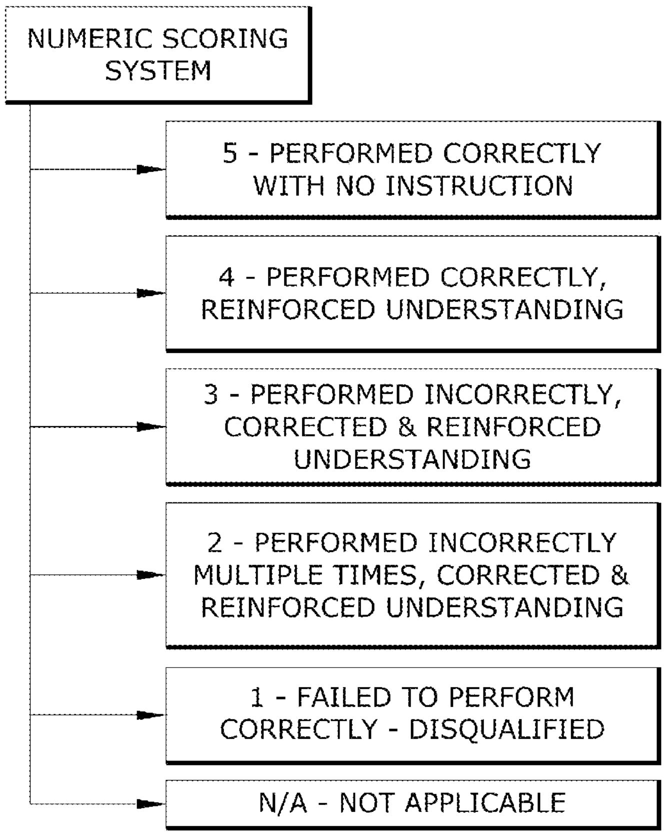

FIG. 22 conceptually illustrates an exemplary numeric scoring system used by the incident evaluation, training, and correction system and process to calculate scores in some embodiments.

Figure 23:
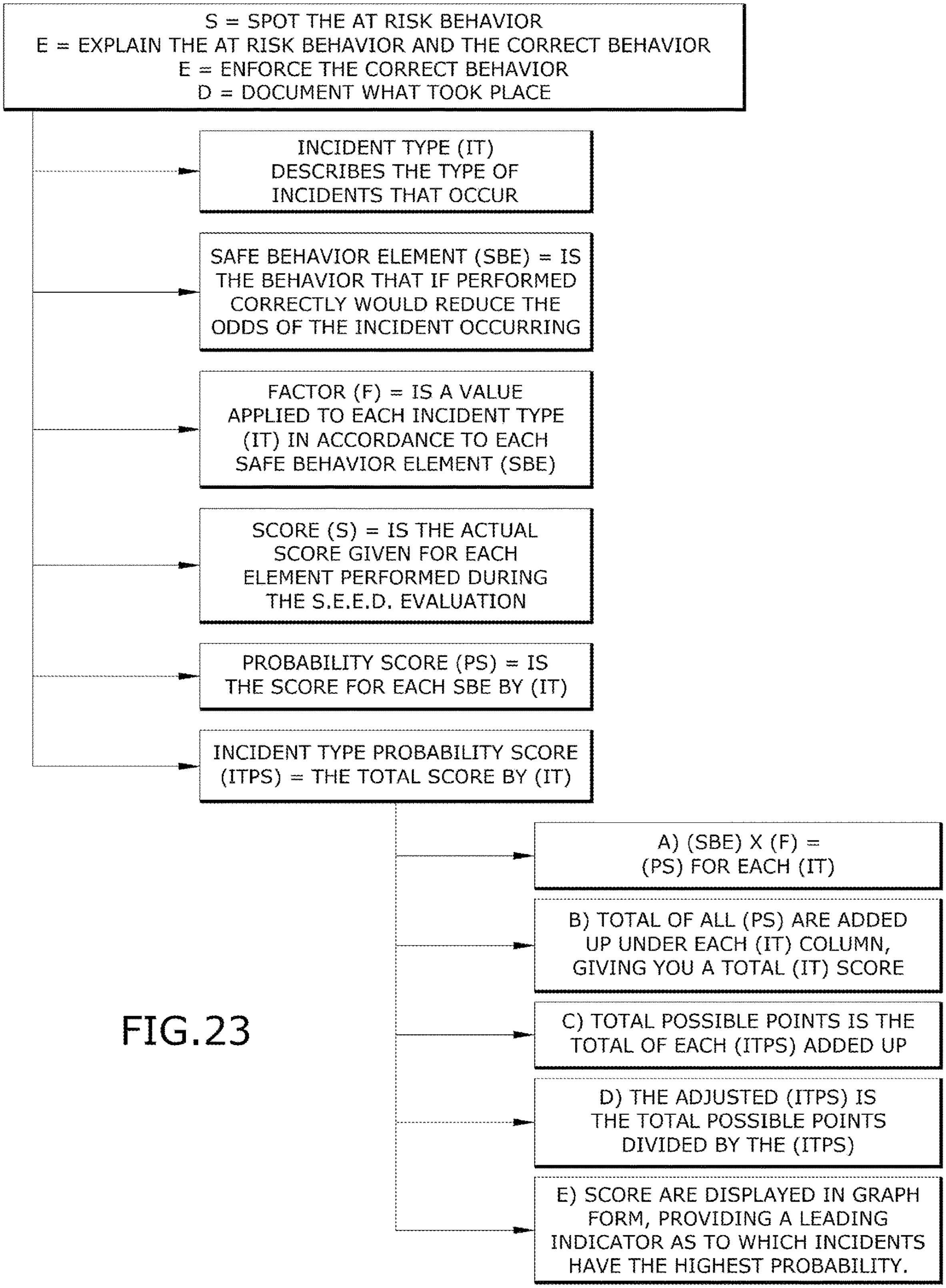

FIG. 23 conceptually illustrates a SEED algorithm implementation used by the incident evaluation, training, and correction system and process in some embodiments.

Figure 24:
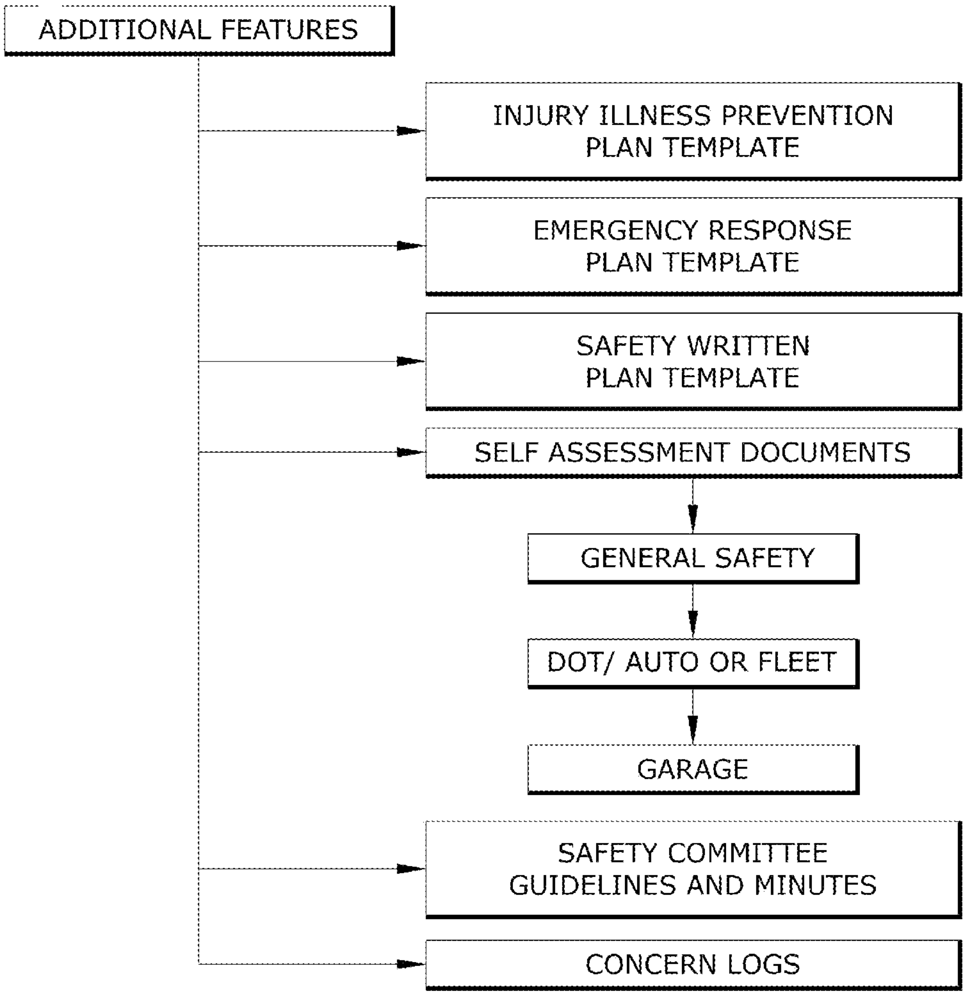

FIG. 24 conceptually illustrates additional features of the incident evaluation, training, and correction system and process in some embodiments.

Figure 25:
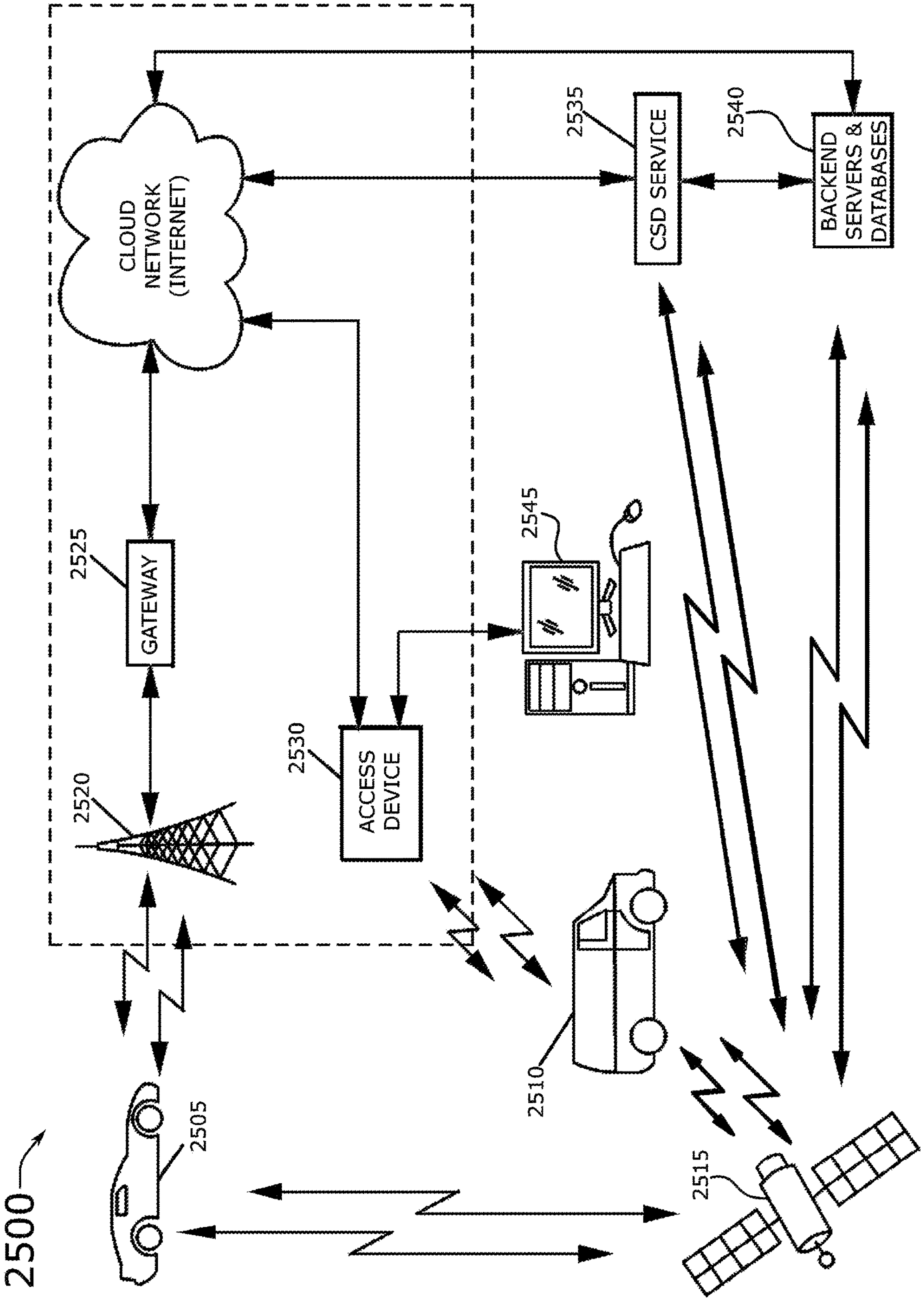

FIG. 25 conceptually illustrates a cloud computing software-as-a-service ("SaaS") cloud-computing network architecture over which an incident evaluation, training, and correction system is deployed in some embodiments.

Figure 26:
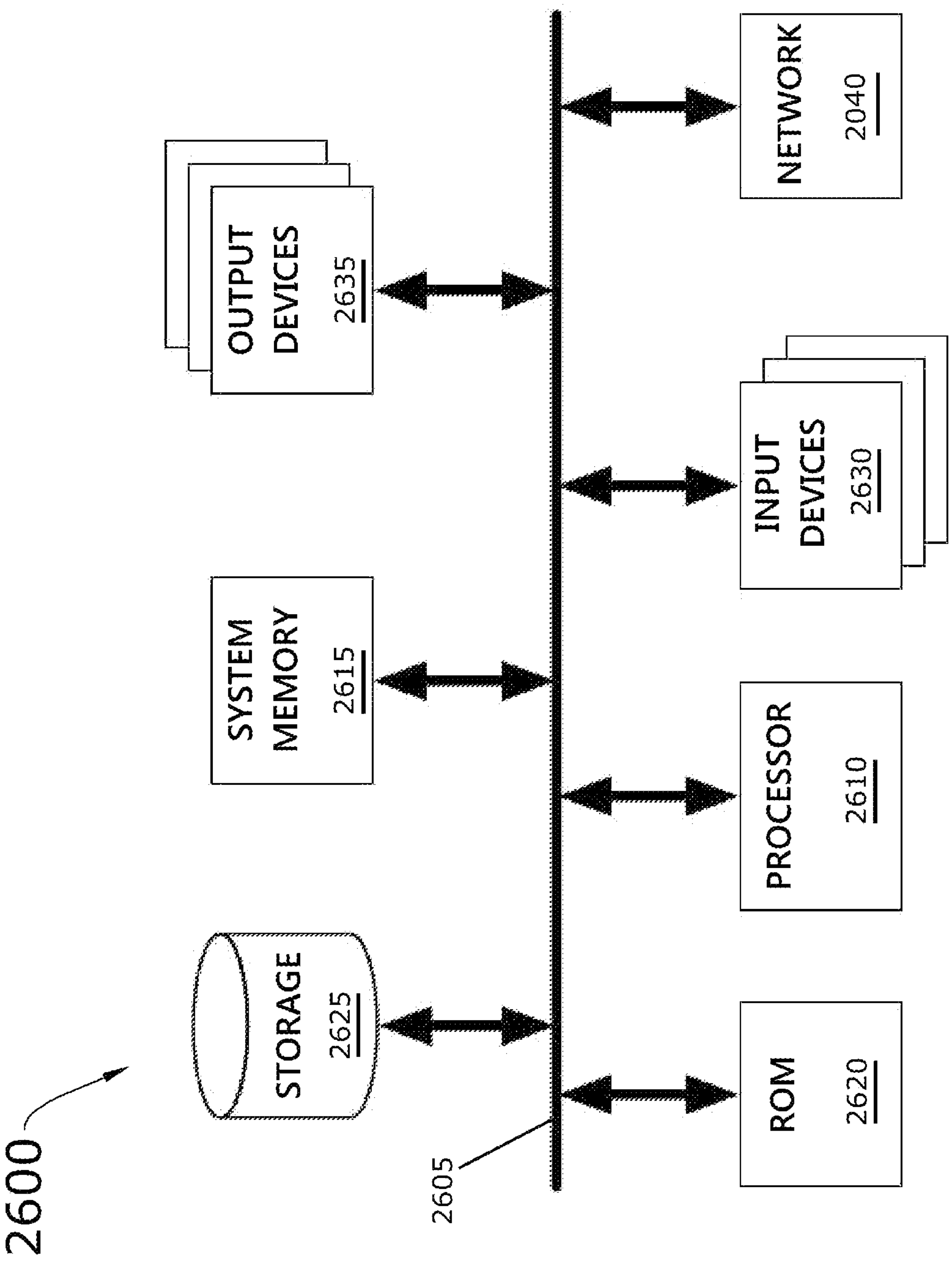

FIG. 26 conceptually illustrates an electronic system with which some embodiments of the invention are implemented.

Figure 27:
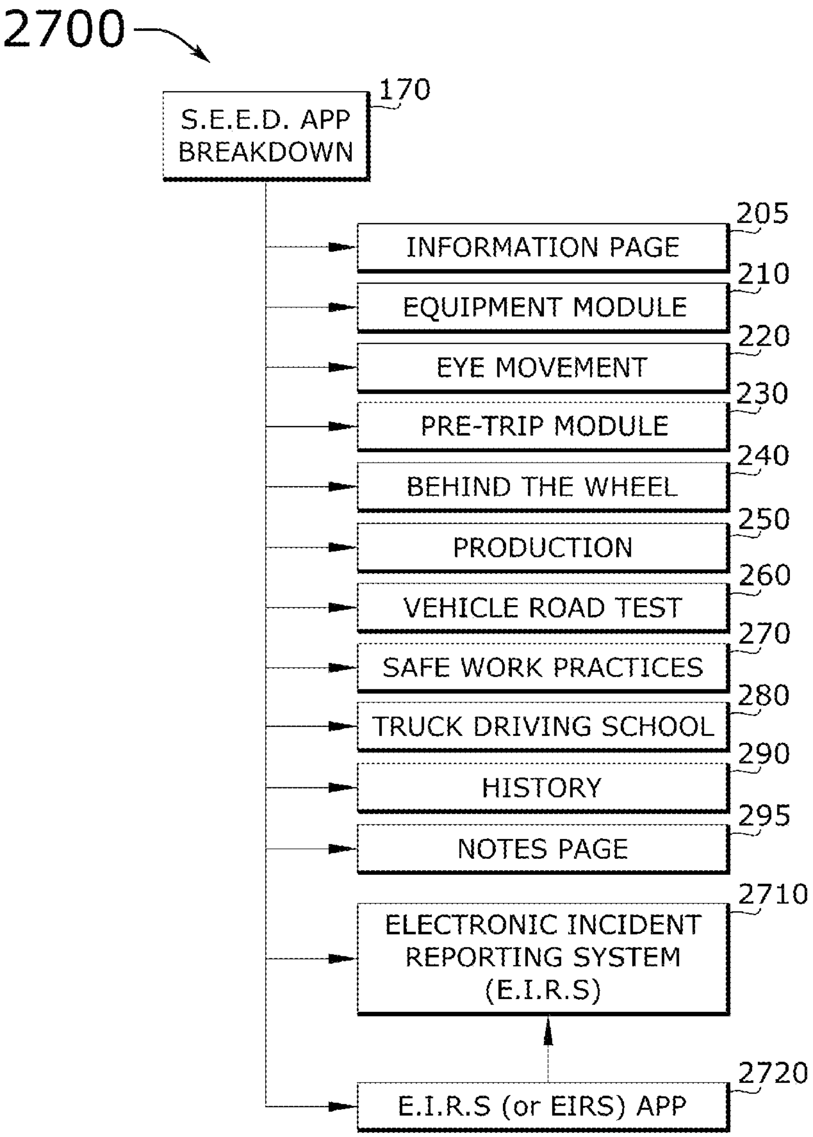

FIG. 27 conceptually illustrates a high-level breakdown of an electronic vehicular incident reporting (EIRS) system and an EIRS app implementation of a plurality of electronic vehicular incident reporting processes in connection with the SEED app in some embodiments.

Figure 28:
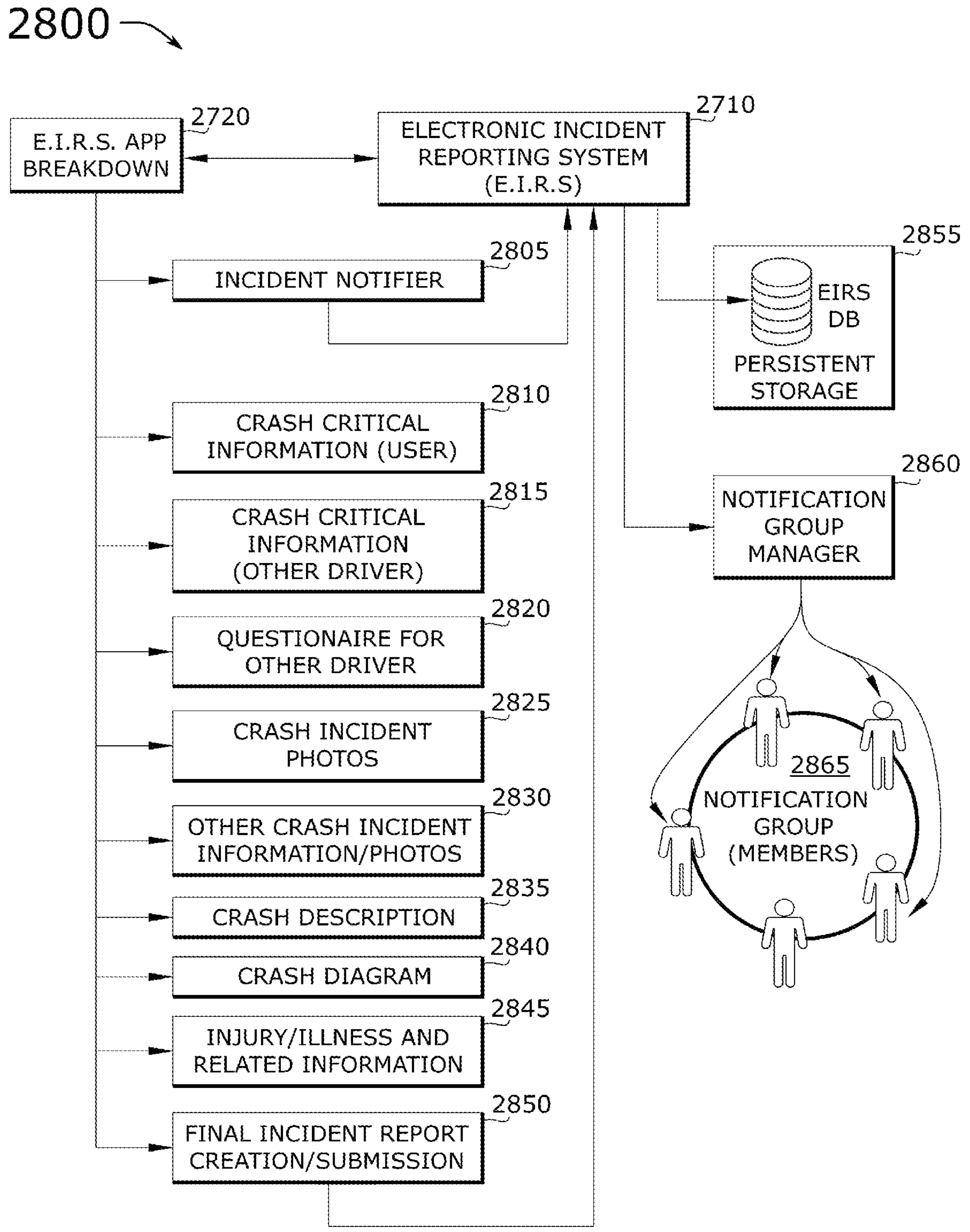

FIG. 28 conceptually illustrates a notification group, a notification group management unit, and a persistent storage of the EIRS system in connection with the EIRS app and a modular breakdown of a plurality of different EIRS app sections that correspond to the plurality of EIRS processes in some embodiments.

Figure 29:
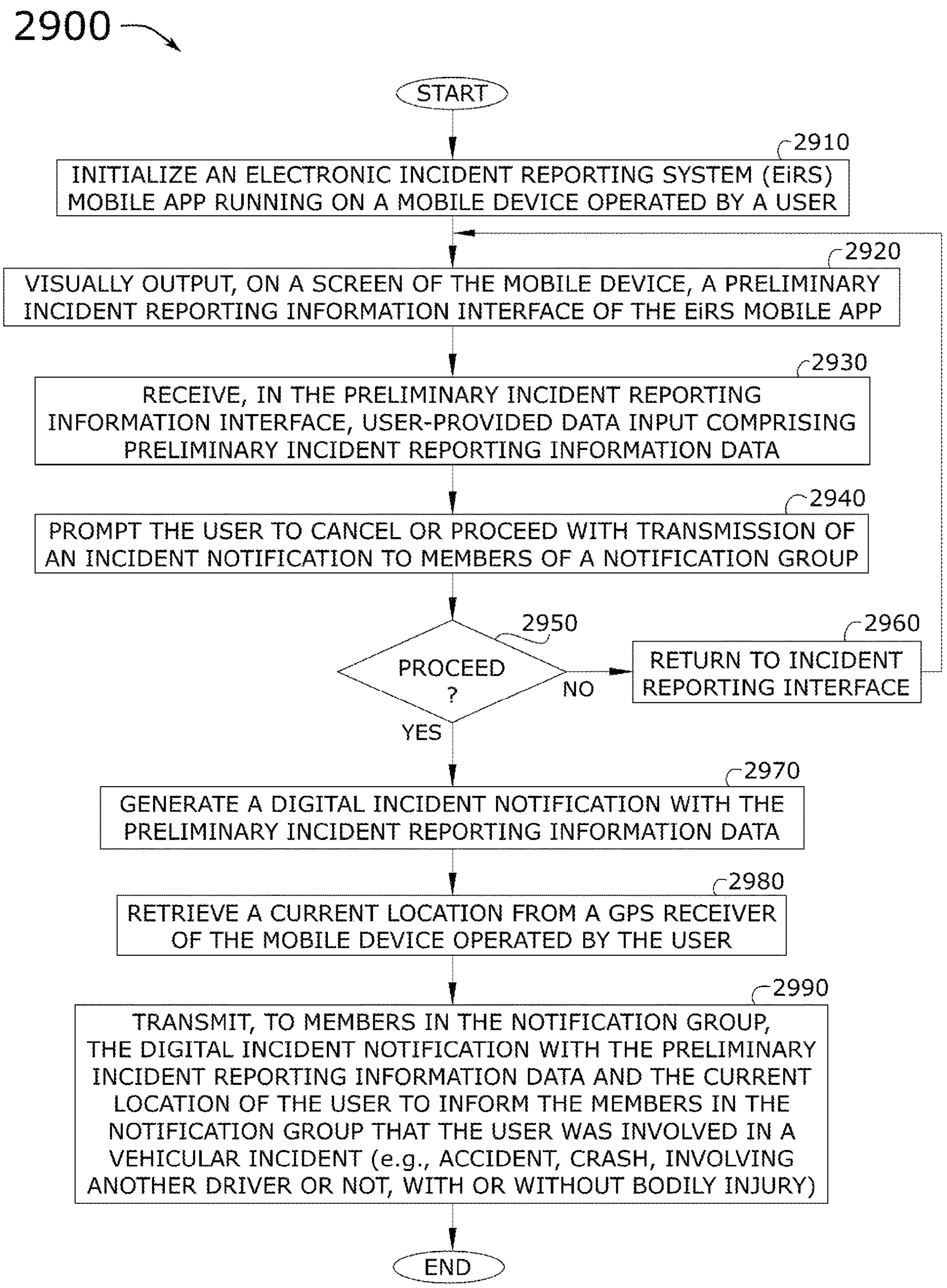

FIG. 29 conceptually illustrates an incident notifier process of the plurality of EIRS processes in some embodiments.

Figure 30:
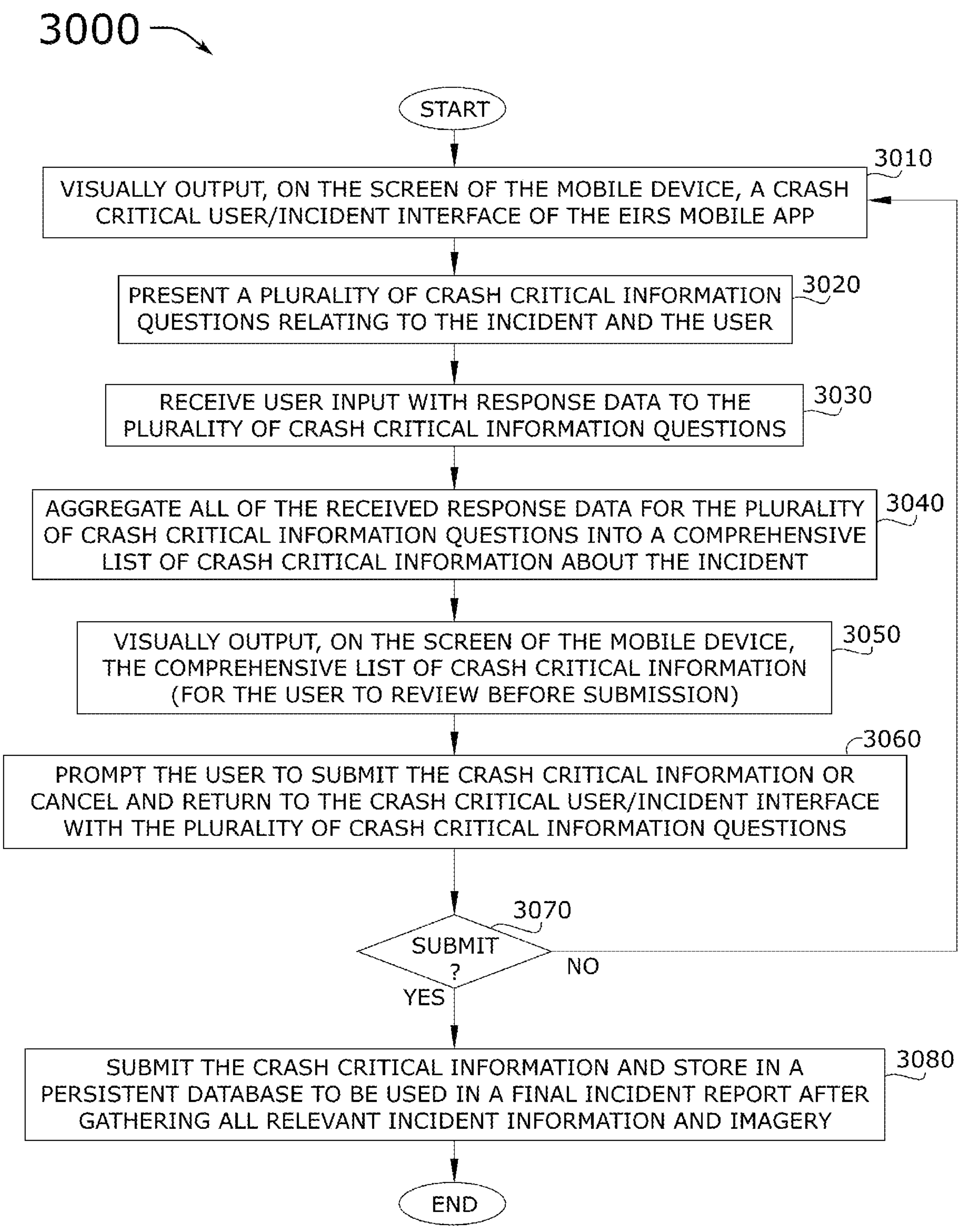

FIG. 30 conceptually illustrates a crash critical user information process of the plurality of EIRS processes in some embodiments.

Figure 31:
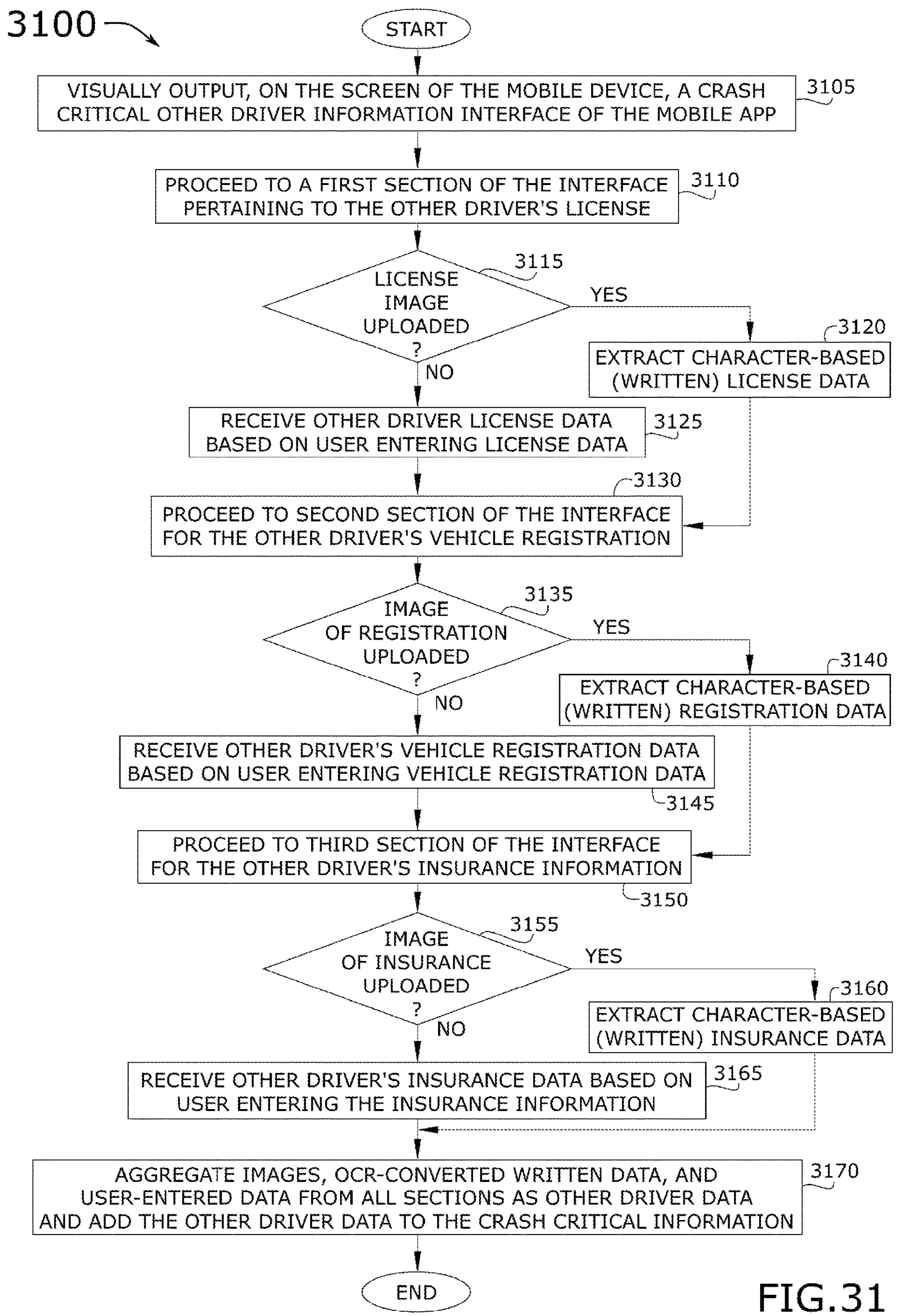

FIG. 31 conceptually illustrates a crash critical other driver information process of the plurality of EIRS processes in some embodiments.

Figure 32:
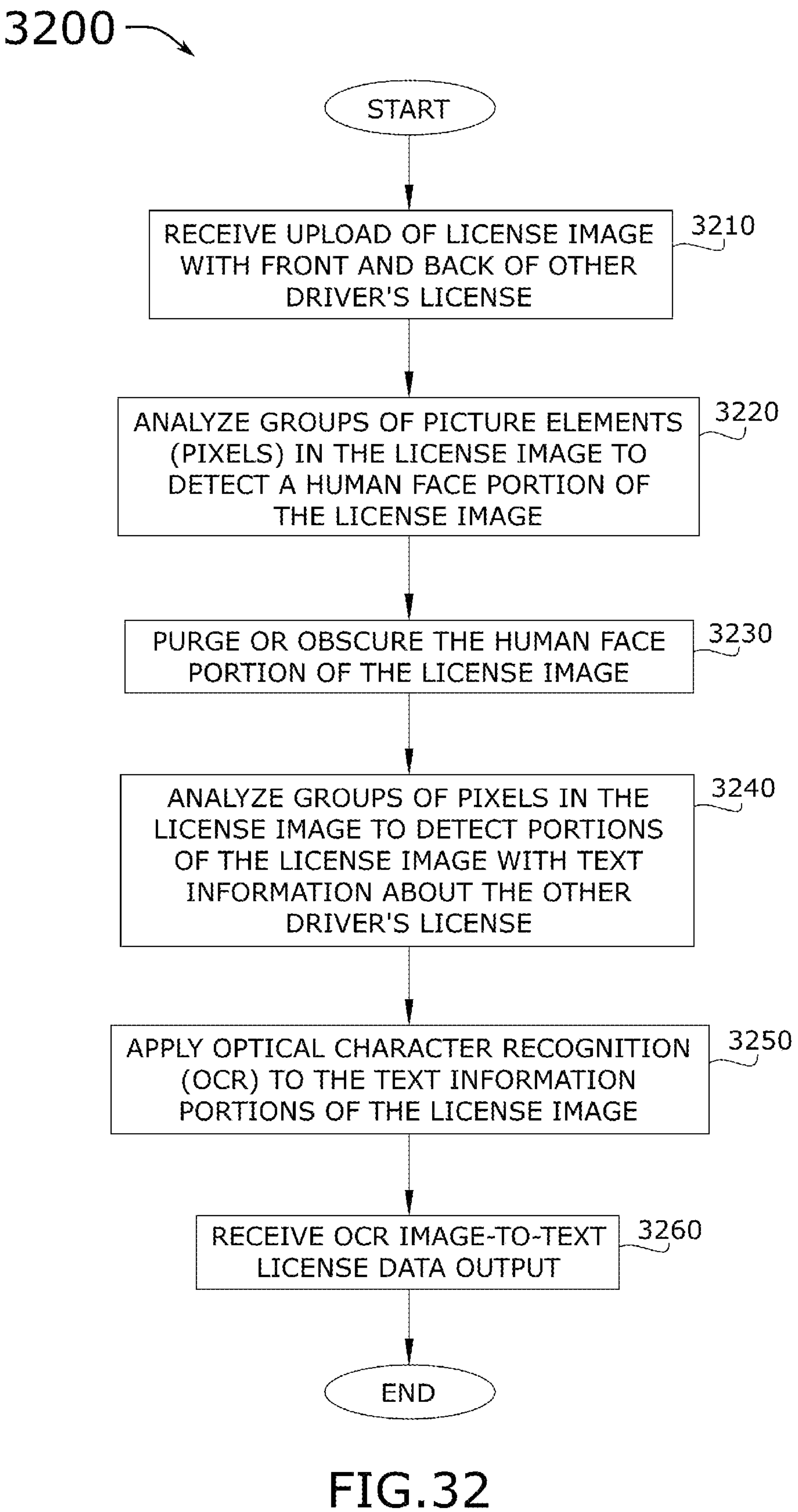

FIG. 32 conceptually illustrates a driver's license information extraction process of the plurality of EIRS processes in some embodiments.

Figure 33:
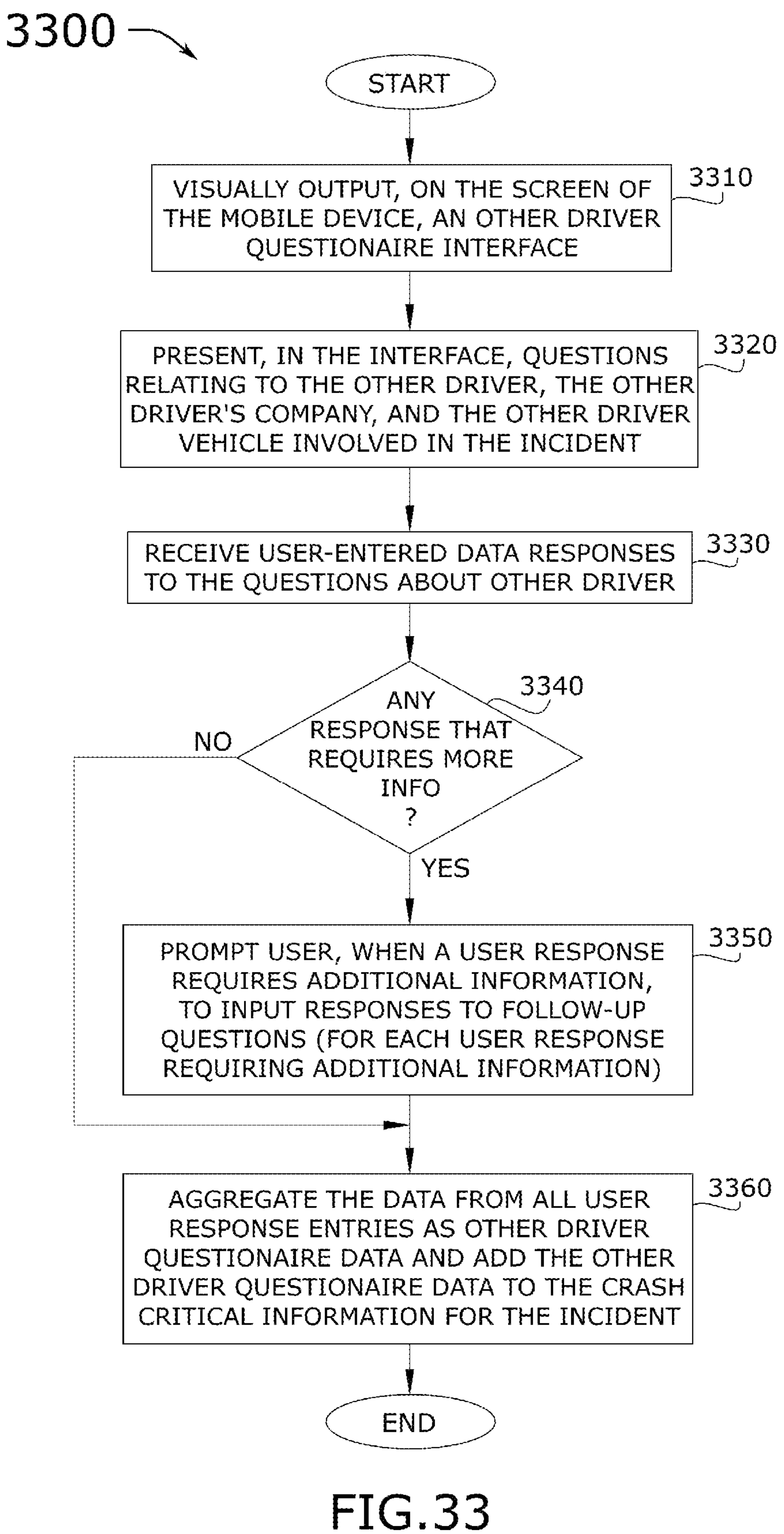

FIG. 33 conceptually illustrates a questionnaire for other driver process of the plurality of EIRS processes in some embodiments.

Figure 34:
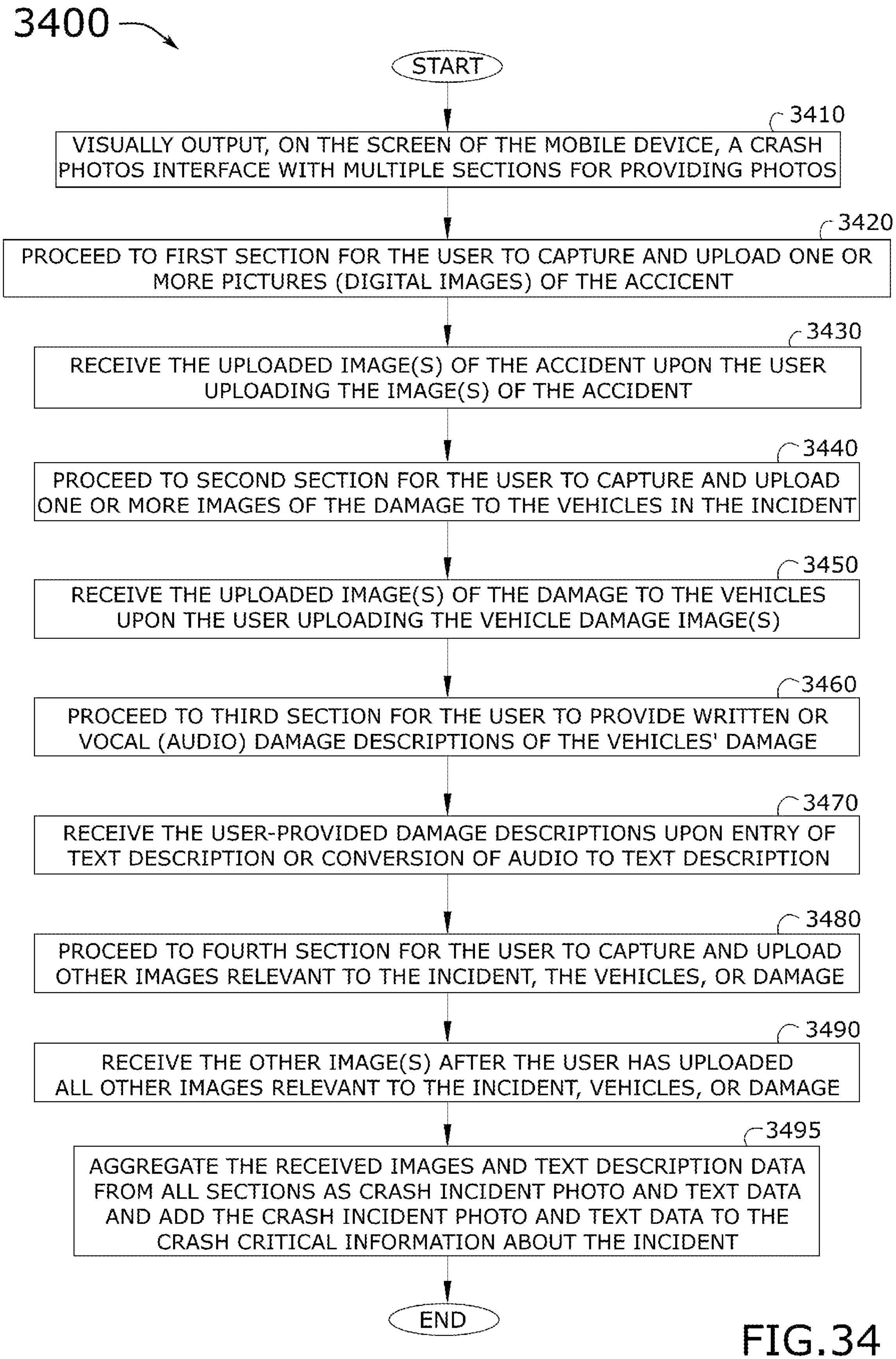

FIG. 34 conceptually illustrates a crash incident photos acquisition process of the plurality of EIRS processes in some embodiments.

Figure 35:
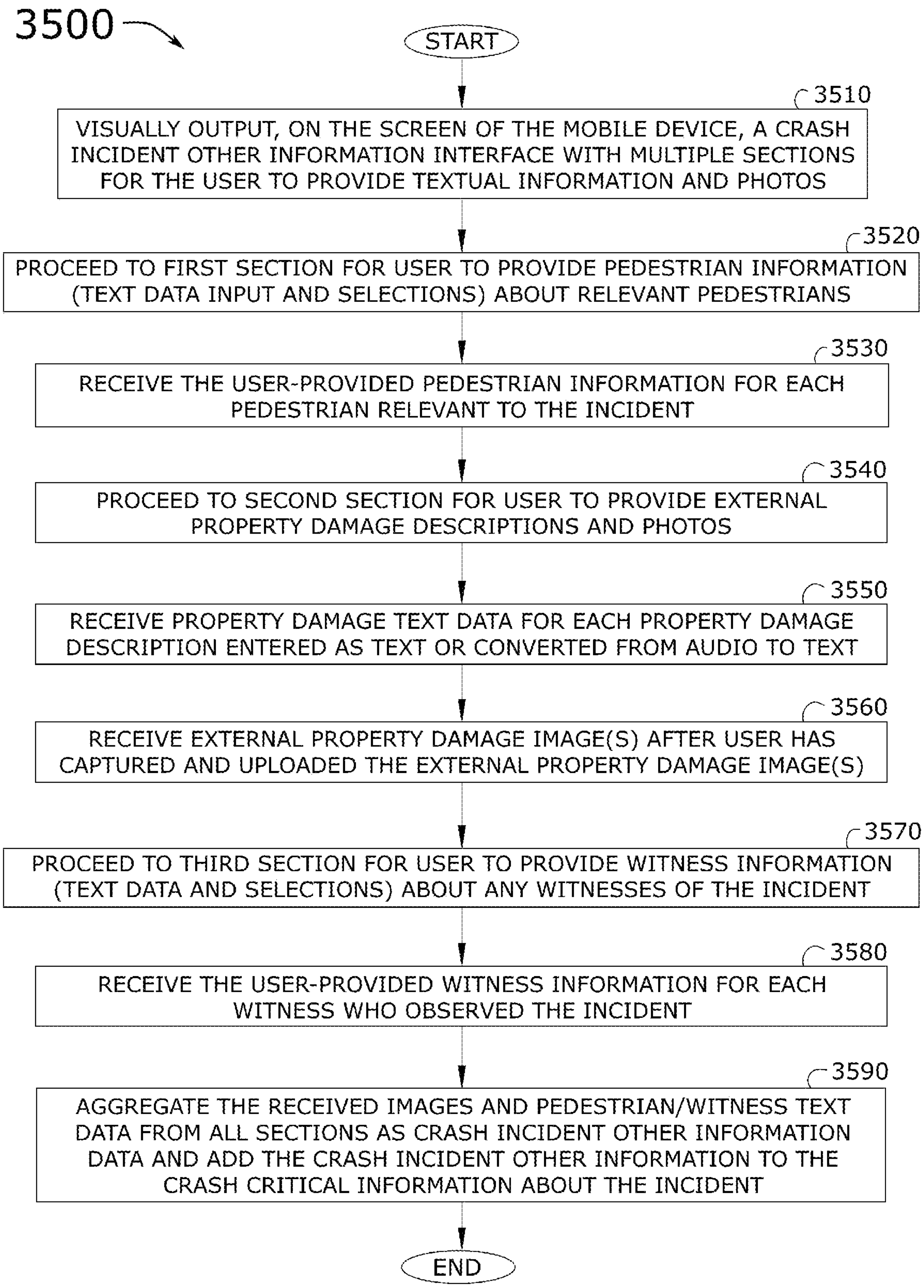

FIG. 35 conceptually illustrates a crash incident other information acquisition process of the plurality of EIRS processes in some embodiments.

Figure 36:
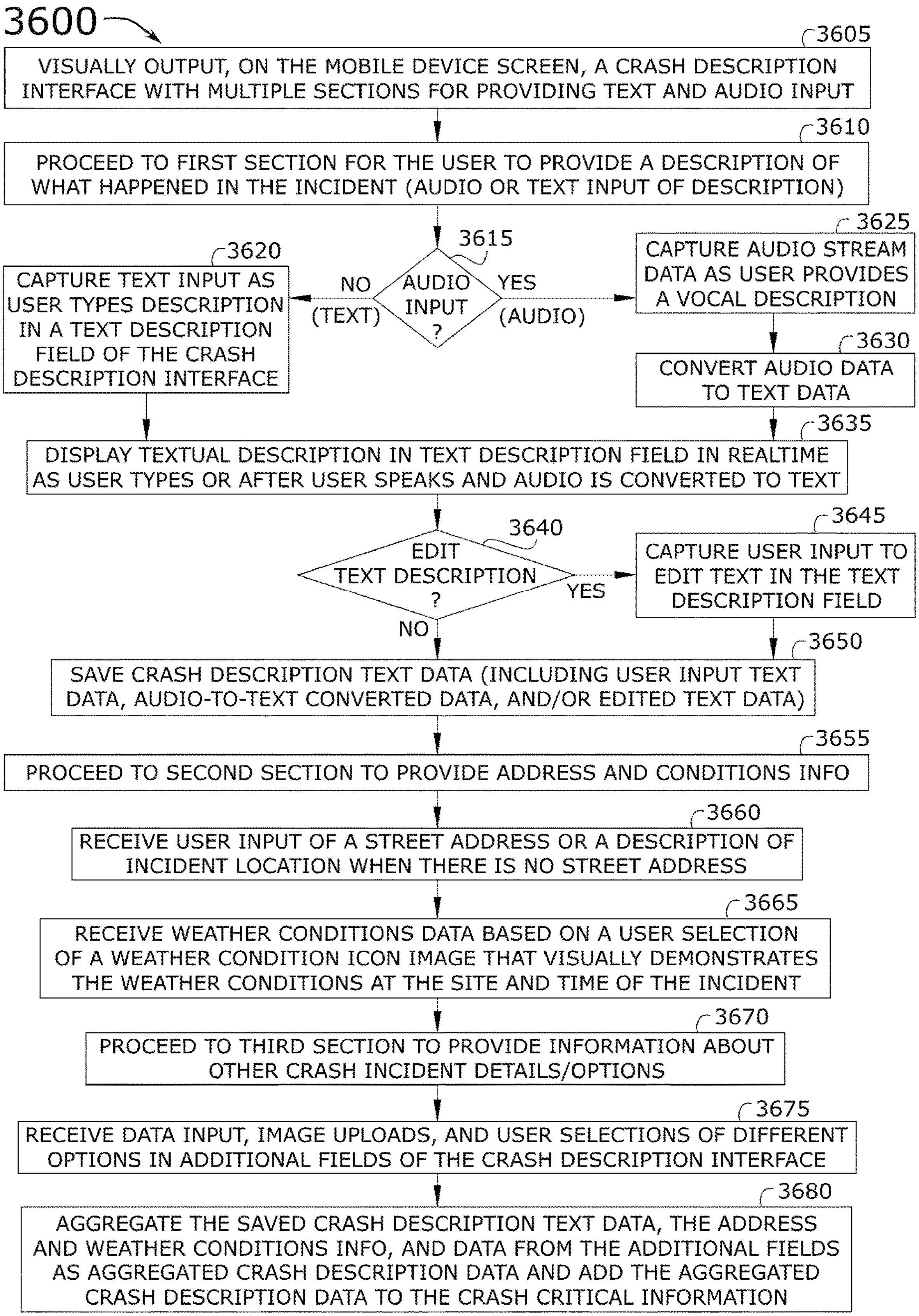

FIG. 36 conceptually illustrates a crash description and other information acquisition process of the plurality of EIRS processes in some embodiments.

Figure 37:
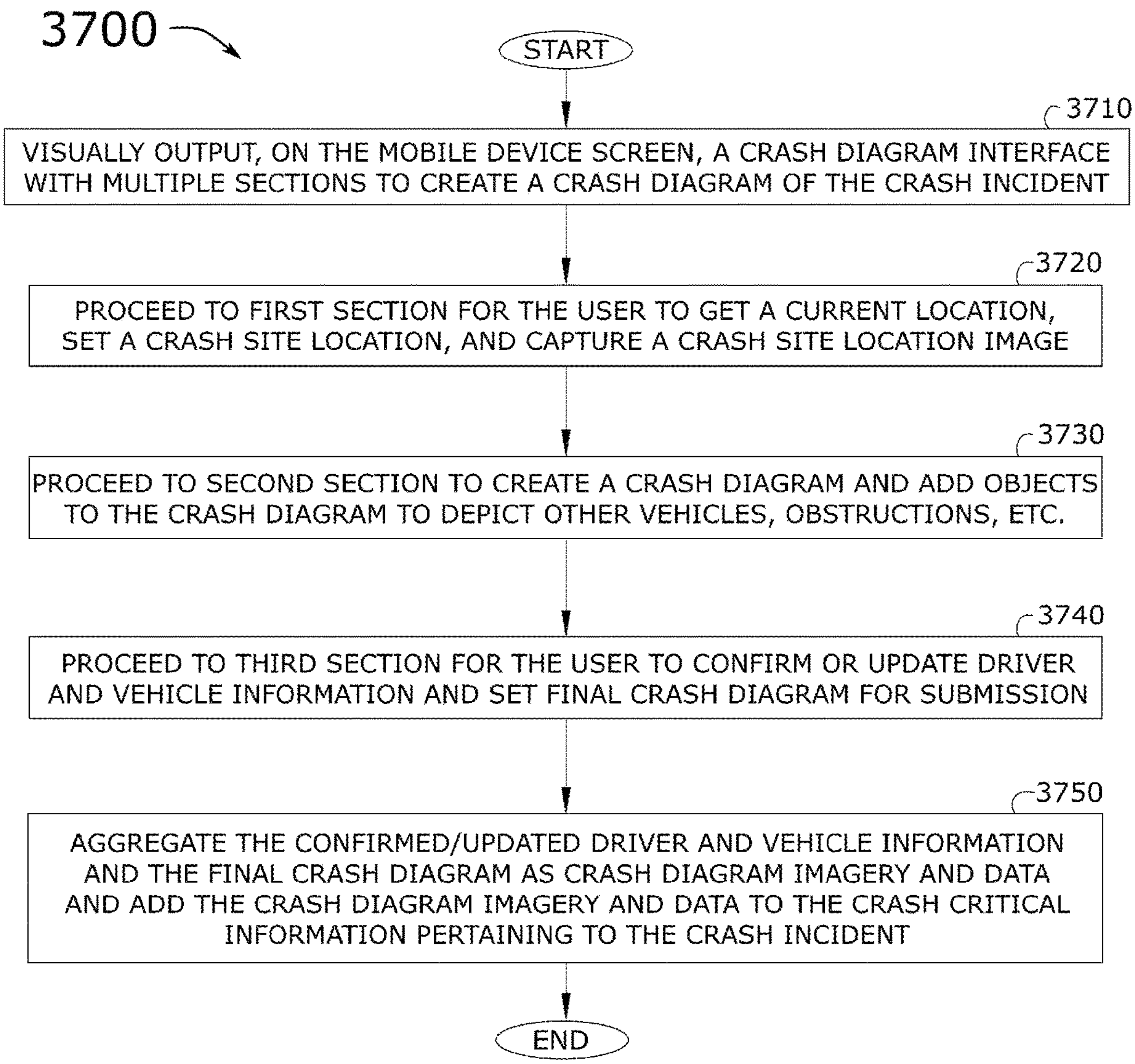

FIG. 37 conceptually illustrates a high-level crash diagram creation process of the plurality of EIRS processes in some embodiments.

Figure 38:
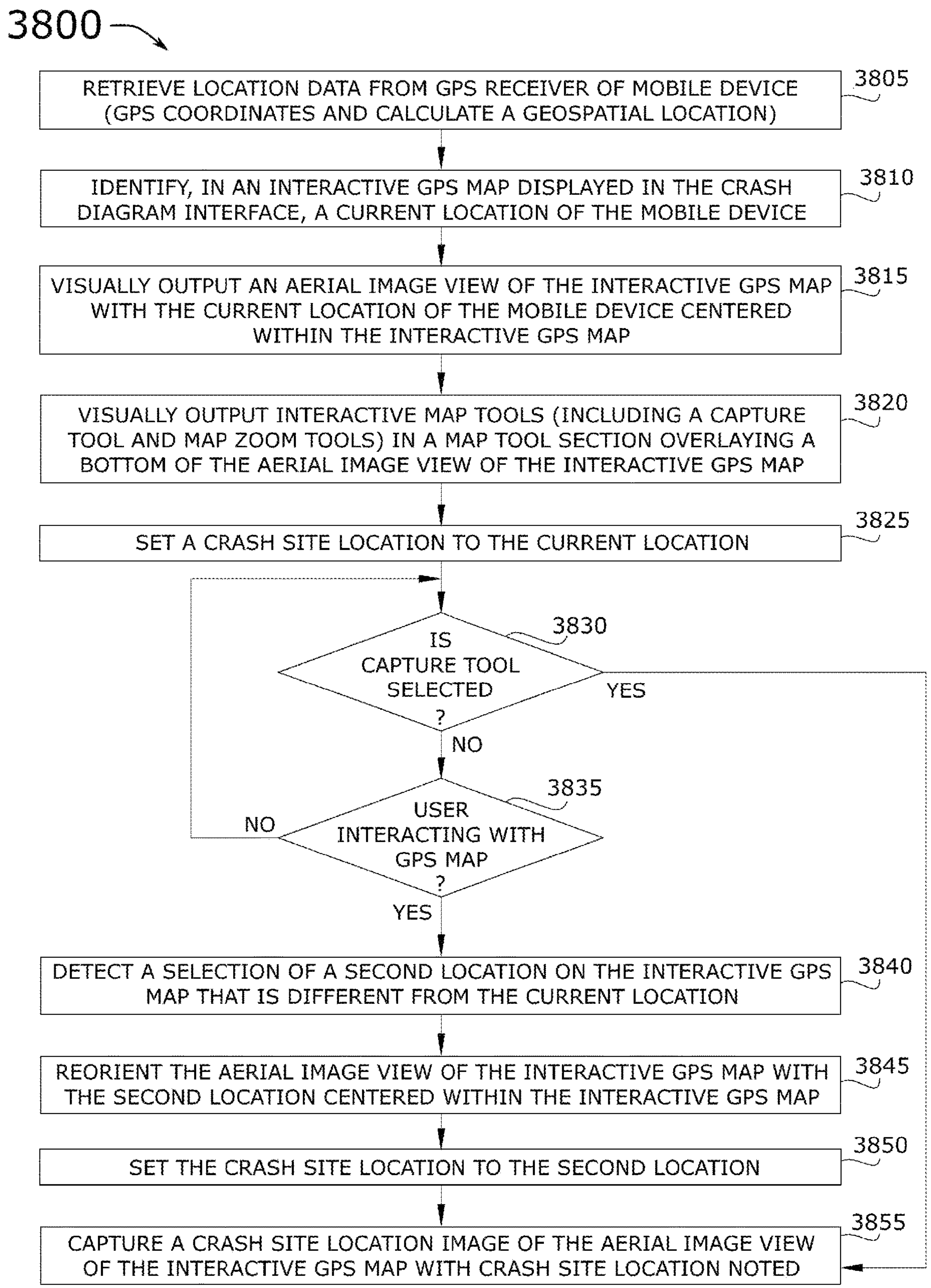

FIG. 38 conceptually illustrates a first detailed crash diagram creation process of the plurality of EIRS processes in some embodiments.

Figure 39:
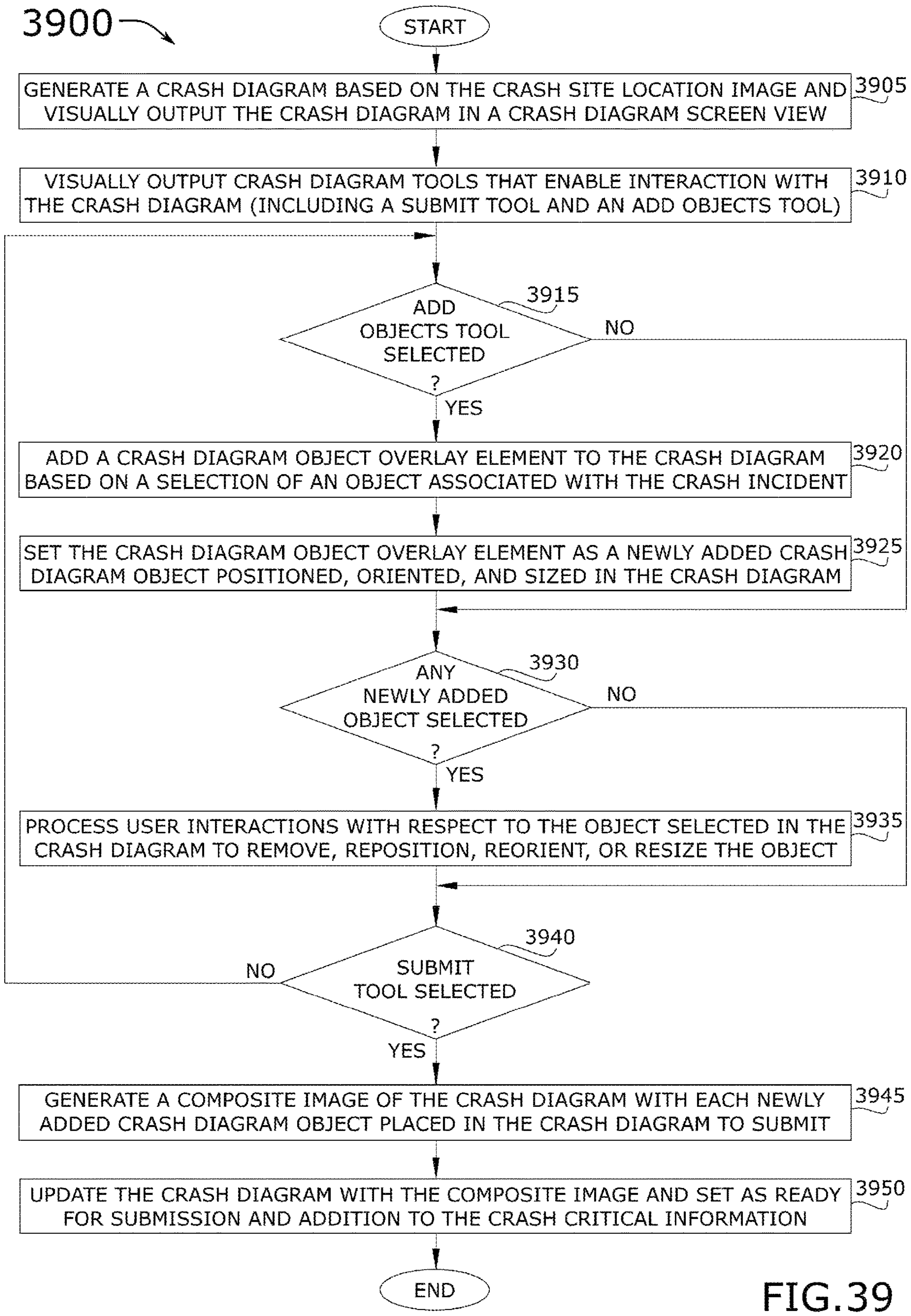

FIG. 39 conceptually illustrates a second detailed crash diagram creation process of the plurality of EIRS processes in some embodiments.

Figure 40:
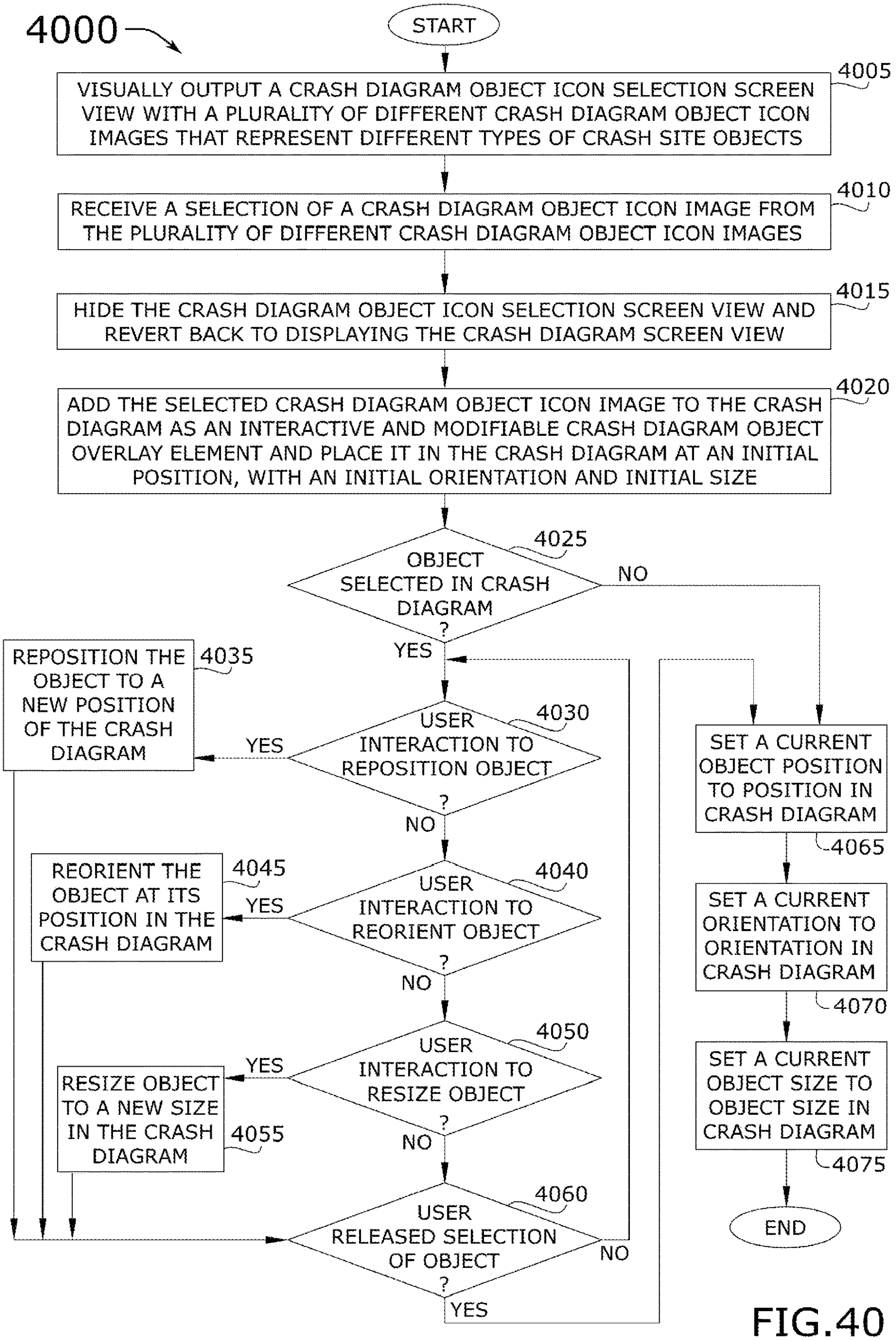

FIG. 40 conceptually illustrates a detailed add object process of the second detailed crash diagram creation process of the plurality of EIRS processes in some embodiments.

Figure 41:
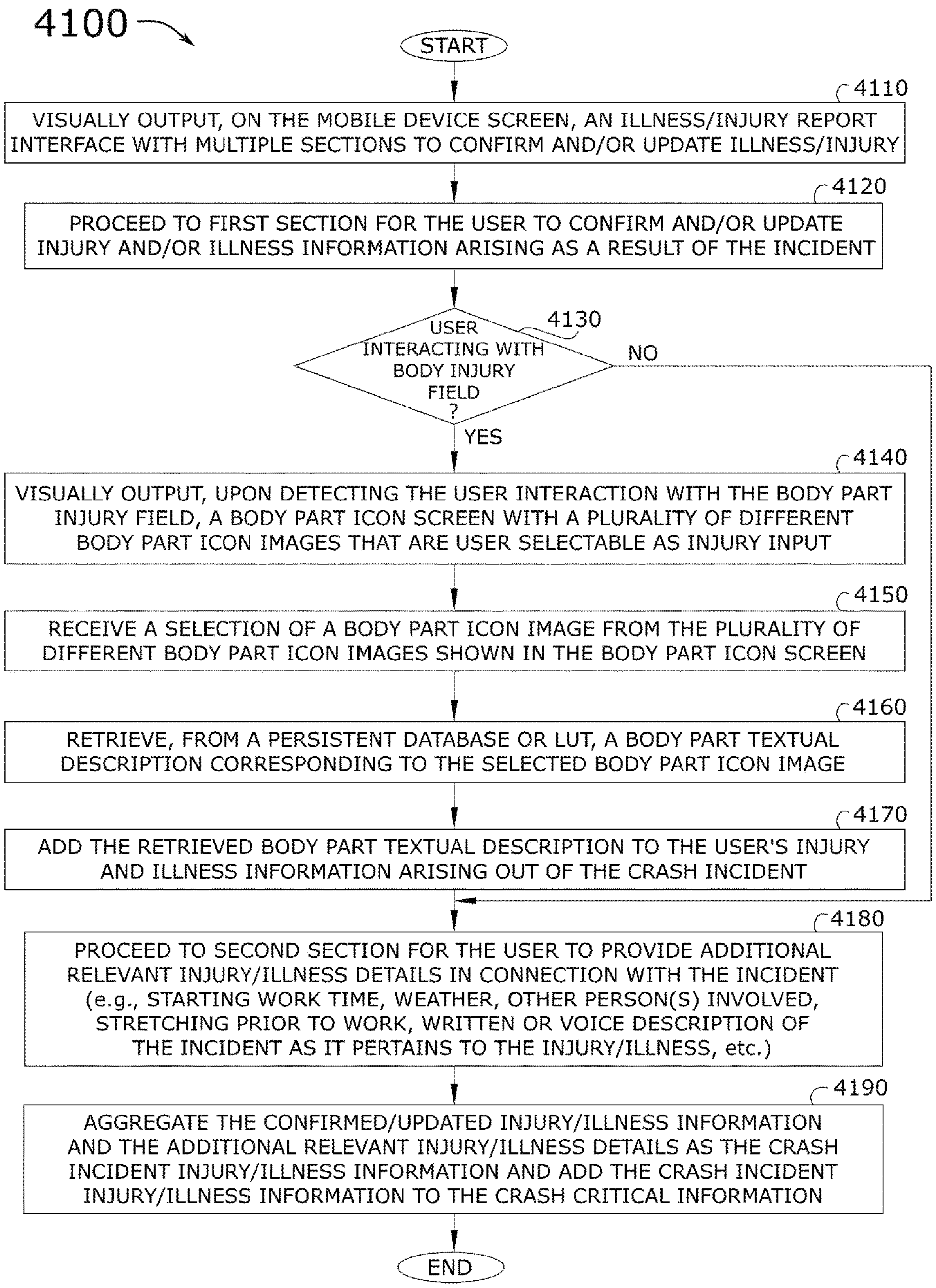

FIG. 41 conceptually illustrates a high-level injury/illness reporting process of the plurality of EIRS processes in some embodiments.

Figure 42:
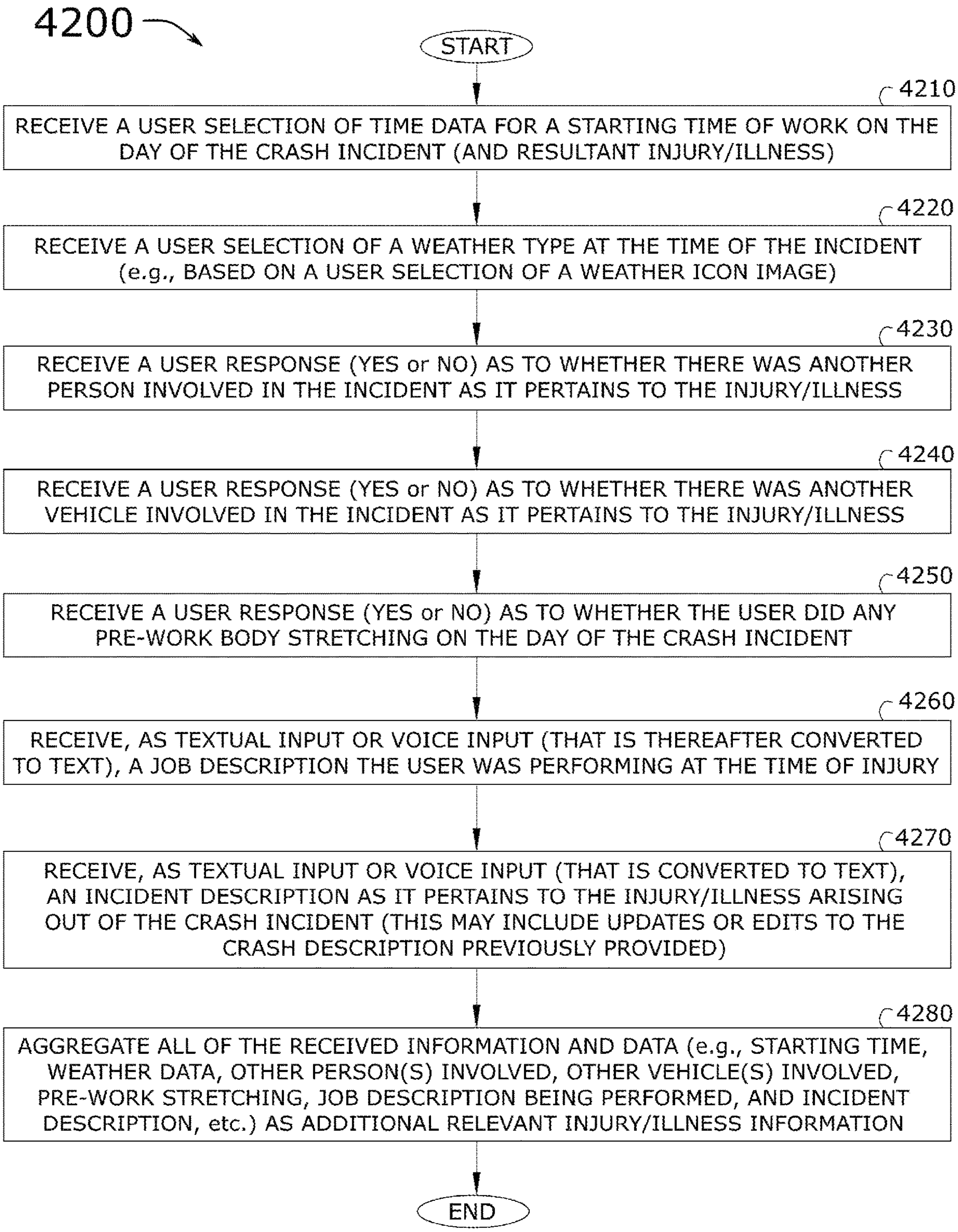

FIG. 42 conceptually illustrates a detailed process, of the plurality of EIRS processes, for acquiring additional relevant injury/illness information in some embodiments.

Figure 43:
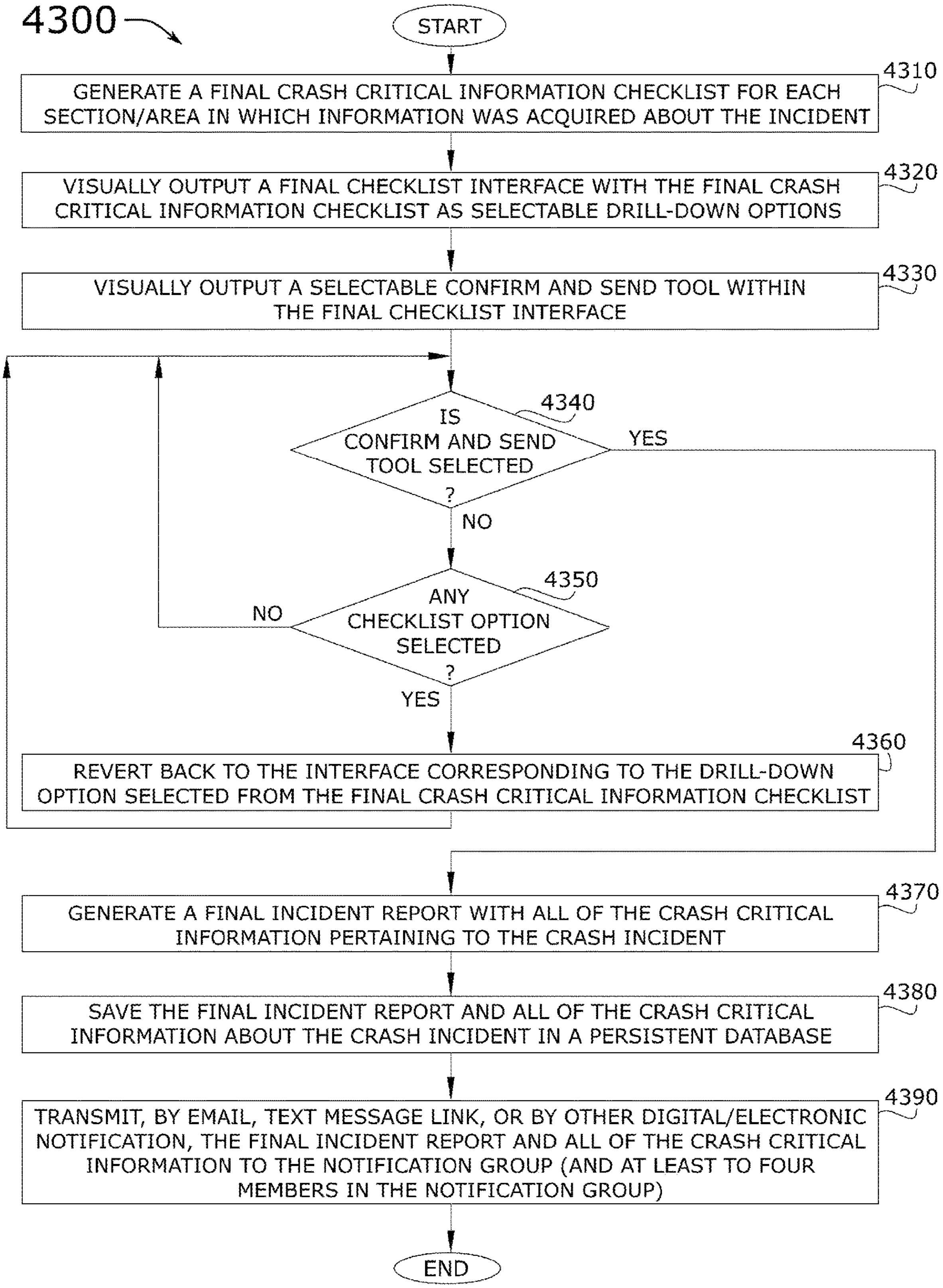

FIG. 43 conceptually illustrates a final incident report creation and submission process of the plurality of EIRS processes in some embodiments.

DETAILED DESCRIPTION

In the following detailed description of the invention, numerous details, examples, and embodiments of the incident evaluation, training, and correction system to spot at-risk behavior, explain both the at-risk behavior and correct behavior, enforce the correct behavior, and document the incident that gave rise to the at-risk behavior are described. However, it will be clear and apparent to one skilled in the art that the invention is not limited to the embodiments set forth and that the invention can be adapted for any of several applications including, without limitation, defensive driving, care and caution in working environments, preventative care in communal environments, etc.

In this specification, the term "SEED" (or "S.E.E.D.") is an acronym that is short for "spotting, explaining, enforcing, and documenting" as used in connection with the phrases "spotting at-risk behavior, explaining both the at-risk behavior and correct behavior, enforcing the correct behavior, and documenting the incident that gave rise to the at-risk behavior" and "spot at-risk behavior, explain both the at-risk behavior and correct behavior, enforce the correct behavior, and document the incident that gave rise to the at-risk behavior".

In this specification, the term "EIRS" (or "E.I.R.S"), is another acronym referenced throughout the description and is short for "electronic incident reporting system". The acronym EIRS (or E.I.R.S is also used generally to refer to the plurality of electronic vehicular incident reporting processes (e.g., "EIRS processes").

In this specification, the term "incident" as used in this description is meant to include vehicular accidents, injuries, damage, citations, infractions, and other critical outcomes arising out of vehicular crashes.

Embodiments of the invention described in this specification include an incident evaluation, training, and correction process for spotting at-risk behavior, explaining the both at-risk behavior and correct behavior, enforcing the correct behavior, and documenting the incident that gave rise to the at-risk behavior (hereinafter also referred to as the "SEED process"), an incident evaluation, training, and correction system to spot at-risk behavior, explain both the at-risk behavior and correct behavior, enforce the correct behavior, and document the incident that gave rise to the at-risk behavior (hereinafter also referred to as the “SEED system”), an electronic vehicular incident reporting system (hereinafter also referred to as the “EIRS system”), a comprehensive EIRS process, and a plurality of EIRS processes. In some embodiments, the comprehensive EIRS process comprises the plurality of EIRS processes.

In some embodiments, the SEED system includes a cloud-based training tool for coaching and reinforcement of defensive driver skills and knowledge. In some embodiments, the cloud-based training tool uses a scoring system that provides accuracy on knowledge and skills. In some embodiments, the cloud-based training tool is implemented as a software application. Examples of the software application implementation of the cloud-based training tool include, without limitation, a mobile app implementation and a web portal implementation.

In this specification, there are several descriptions of process steps of the SEED process that are implemented as software in a single SEED mobile software application (“SEED mobile app”) which runs on any of various computing devices to perform the steps of the SEED process. However, it should be noted that for the purposes of the embodiments described in this specification, the word “process” is used interchangeably with the word “method”. Processes or methods for spotting at-risk behavior, explaining the both at-risk behavior and correct behavior, enforcing the correct behavior, and documenting the incident that gave rise to the at-risk behavior are described, therefore, by reference to example processes or methods that conceptually illustrate process steps for spotting at-risk behavior, explaining the both at-risk behavior and correct behavior, enforcing the correct behavior, and documenting the incident that gave rise to the at-risk behavior.

In some embodiments, the comprehensive EIRS process, the plurality of EIRS processes, and the EIRS system provide comprehensive procedural control and guidance for gathering all critical information related to a vehicular incident. In some embodiments, the EIRS system is communicably connected to the SEED system. In some embodiments, the SEED system comprises embodiments of the EIRS system. In some embodiments, the EIRS system and the SEED system are co-systems of a comprehensive vehicular driver training, safety, and incident recording system.

In some embodiments, the comprehensive electronic vehicular incident reporting process is implemented in software and, when running on a computing device (such as a mobile device or other computing device), provide step-by-step guidance and comprehensive procedural control for gathering all critical information related to a vehicular incident. In some embodiments, the plurality of electronic vehicular incident reporting processes (hereinafter also referred to as the “electronic incident reporting processes”, the “electronic crash incident reporting processes”, or the “EIRS processes”) are implemented in the software-implementation of the comprehensive electronic vehicular incident reporting process. In some embodiments, the plurality of EIRS processes are each implemented as software programs that are integrated into the software-implementation of the comprehensive EIRS process and also configured to run on a computing device independently.

In some embodiments, the software implementation of the plurality of EIRS processes comprises a mobile software application (“mobile app” or “EIRS mobile app”) that is configured to run on a mobile device of a driver (also referred to as a “user”). In some embodiments, the plurality of EIRS processes comprise a plurality of high-level EIRS processes and a plurality of comprehensive detailed EIRS processes. In some embodiments, each of several EIRS processes in the plurality of EIRS processes are implemented in the EIRS mobile app as distinct sections with distinct user interfaces through which to gather various critical information related to a vehicular incident. In some embodiments, the user proceeds through the plurality of EIRS processes by interacting with the distinct user interfaces of the EIRS mobile app in sequence. In some embodiments, the user selectively and non-sequentially proceeds through one or more of the EIRS processes by navigating to and interacting with the user interfaces associated with the selected EIRS processes and their corresponding sections in the EIRS mobile app. In this way, the EIRS mobile app provides a mobile way to capture crash critical information about an incident, thereby ensuring that a driver of a vehicle involved in the incident can easily gather all of the critical information pertaining to the incident by a guided sequence or guided, non-sequential completion of the work involved in gathering all of the crash critical information.

In this specification, there are several descriptions of the comprehensive EIRS process and the plurality of EIRS processes (hereinafter referred to collectively as the “EIRS processes”) that are implemented in software (as parts of the EIRS mobile app or as separate software implementations or software modules or software units functionally accessible to the EIRS system). These software implementations are configured to run on processing units of computing devices. When running on a computing device, the software implementation corresponding to a particular EIRS process performs the steps of the particular EIRS process. Similarly, the software implementation may incorporate software-implemented modules or units that provide corresponding functionality of multiple or all of the EIRS processes. However, it should be noted that for the purposes of the embodiments described in this specification, the word “EIRS process” is used interchangeably with the word “EIRS method”. EIRS processes or EIRS methods for comprehensively guiding a driver through critical information gathering steps are described, therefore, by reference to example EIRS processes or EIRS methods that conceptually illustrate EIRS process steps for comprehensively guiding a driver through critical information gathering steps.

Several more detailed embodiments are described in the sections below. In particular, Section I includes details, descriptions, and examples of the SEED system and SEED process. Section I is described next. However, as described further below, Section II provides details, descriptions, and examples of the EIRS system and the plurality of EIRS processes.

I. Seed System and Process

Embodiments of the SEED process and the SEED system described in this specification solve problems in conventional, existing systems by automatically analyzing hazards based on incidents and behaviors and creating hazard data analysis reports without requiring numerous man hours to analyze incidents and information about an incident or behavior and create the analysis. In this way, the SEED process and the SEED system, along with the cloud-based training tool for coaching and reinforcement of defensive driver skills and knowledge, is able to improve measures used by a company or organization to correct dangerous behaviors and avoid situations that give rise to incidents, train and reinforce alternative better behaviors, and thereby reduce liability of the company or organization in court.

Embodiments of the SEED process and the SEED system, along with the cloud-based training tool for coaching and reinforcement of defensive driver skills and knowledge, described in this specification differ from and improve upon currently existing options. In particular, some embodiments of the SEED process and SEED system use state of the art algorithms that will help create hazard data analysis and probability of when an accident will occur. Furthermore the cloud-based training tool has a scoring system. In some embodiments, the scoring system is scaled from one to five (1-5), with five (5) being the best. In some embodiments, the scoring system is scaled based on a different numeric range, with a highest numeric value being the best. In some embodiments, the SEED process and the SEED system, along with the cloud-based training tool for coaching and reinforcement of defensive driver skills and knowledge, documents all training. In some embodiments, the SEED process and the SEED system, along with the cloud-based training tool for coaching and reinforcement of defensive driver skills and knowledge, documents each driver's vehicle turns and comes equipped with GPS.

The currently existing options do not provide any probability of suffering an accident or provide any indication of the driver's accuracy in or familiarity with driving knowledge and skills. By contrast, the SEED process and the SEED system, along with the cloud-based training tool for coaching and reinforcement of defensive driver skills and knowledge, uses a scoring system that provides accuracy on knowledge and skills. In some embodiments, the SEED process and the SEED system, along with the cloud-based training tool for coaching and reinforcement of defensive driver skills and knowledge, can also produce a record of driver training. In some embodiments, the SEED process and the SEED system, along with the cloud-based training tool for coaching and reinforcement of defensive driver skills and knowledge, provide a plurality of enhancement materials comprising at least a truck driving school agenda, path of life school agenda, distracted driver quizzes, truck school classroom instruction, and yard skills instruction.

The SEED process and the SEED system, along with the cloud-based training tool for coaching and reinforcement of defensive driver skills and knowledge, of the present disclosure may be comprised of the following elements. This list of possible constituent elements is intended to be exemplary only and it is not intended that this list be used to limit the SEED process and SEED system of the present application to just these elements. Persons having ordinary skill in the art relevant to the present disclosure may understand there to be equivalent elements that may be substituted within the present disclosure without changing the essential function or operation of the SEED process and SEED system, or the cloud-based training tool for coaching and reinforcement of defensive driver skills and knowledge.

1. Software application implementations the SEED process and the cloud-based training tool of the SEED system (the software being implemented to perform on any/all systems, but typically at least implementations of mobile app software and web portal software)
2. Computing device including, without limitation, mobile devices (iOS smartphones, Android smartphones, etc.), tablet computing devices, laptop computers, PC or desktop computers, notebook computers, etc.
3. Automated sub-systems and modules (also referred to as "BOTS" or "BOT technology" and/or automated algorithms)
4. Geospatial location devices and systems, including, without limitation, global positioning system (GPS) devices
5. Wireless connectivity (e.g., WiFi, cellular, Bluetooth, etc.) for online connectivity (but able to operate at least some of the software application implementations in offline mode without connectivity, such as the mobile app implementation).

By way of example, FIG. 1 conceptually illustrates a cloud-based training tool of a SEED system that performs a SEED process 100. As shown in this figure, the cloud-based training tool of the SEED system that performs the SEED process 100 generally works by a person interacting with SEED software 110, such as a mobile app, a web portal, desktop computer software application, etc., is able to be deployed to perform on any or all systems 120. The person (or "user") would interact with the cloud-based training tool of the SEED system that performs the SEED process 100 via a computing device 130, such as an iOS mobile device, an Android mobile device, a tablet computing device, a laptop computer, or a desktop computer, etc. While the SEED software 110 includes many aspects that are user-driven and/or require user input or feedback, the SEED software 110, as well as the backend modules, systems, and/or software implemented algorithms of the SEED system, include automated sub-systems and modules or BOT technology 140. Furthermore, the user's computing device 130 would typically include a geospatial location device, such as a GPS receiver 150, in implementations of the app. In this way, a user who is a driver of a vehicle may carry his or her mobile device with GPS in order for the SEED app to capture location information and turn-by-turn route patterns, which are transmitted wirelessly to the SEED system in realtime, or (when offline) captured by the SEED app and uploaded to the SEED system when the mobile device of the driver is connected to the SEED system. This ability to perform in online and offline mode 160 ensures that the cloud-based training tool of a SEED system that performs a SEED process 100 is capable of operating when there is no strong wireless (WiFi or cellular) signal, or otherwise no ability to connect or detect signal connectivity to the SEED system. The SEED software 110 shown in this example includes an example of a SEED app 170 and a SEED portal 180. While the user commonly will use a cell phone (smartphone) to open the SEED app 170 (and may optionally open the SEED portal 180), the other computing devices 130 are possible to connect to the SEED portal 180, so long as the computing device 130 of the user is able to make wireless WiFi connection via a strong wireless connection or a data connection by wire (e.g., Ethernet). In this way, it is possible for the user to instead use a laptop, with internet connection and battery charged. Similarly, it is possible to use a PC as long as there is a power outlet and internet connection (or battery charged), or as another alternative, a tablet computing device with internet connection and battery charged.

As noted above by reference to FIG. 1, the cloud-based training tool for coaching and reinforcement of defensive driver skills and knowledge of the present disclosure generally works by a person interacting with the SEED app 170. A high level breakdown of the SEED app 170 is described below, by reference to FIG. 2. Furthermore, a detailed breakdown with exemplary options in the SEED app 170 is described below, by reference to FIGS. 3-12. Additionally, a high level breakdown of the SEED portal 180 is described below, by reference to FIG. 13 while a detailed breakdown with exemplary options in the SEED portal 180 is described below, by reference to FIGS. 14-21. In some embodiments, the SEED app includes a plurality of selectable and automatically input options covering general information, equipment, eye movement, pre-trip, on-road (or behind the wheel) evaluation, production evaluation, vehicle road test evaluation, safe work practices, truck driving school, history, and notes. Once the device is on and the app is functional, the user may fill out the name of the company and the steps if required to create the different divisions, hubs or offices, supervisor groups and supervisors, as well as other information. The app then goes into the equipment section, eye movement section, and then the pre-trip evaluation and coaching section, followed by behind the wheel evaluation and coaching, production, vehicle road test, and the safe work practices. If needed, truck driving school offers opportunity to be certifications (e.g., Class A, Class B, etc.). For example, the user may be a driver who already completed name of company and other information, as well as equipment, and therefore, starts by interacting with the SEED app with twenty-one (21) selections for pre-trip evaluation and coaching (within which the SEED app may present over 120 selections with instructions), as well as behind the wheel (on-road) evaluation and coaching, in which there are at least twenty-one (21) items (and within that there are over 141 selections and instructions), and an eye triangle movement test, which tracks the eye movements of a driver.

By way of example, FIG. 2 conceptually illustrates a high level breakdown of a SEED app implementation 200 of an incident evaluation, training, and correction process for spotting at-risk behavior, explaining the both at-risk behavior and correct behavior, enforcing the correct behavior, and documenting the incident that gave rise to the at-risk behavior in some embodiments. In describing the high level breakdown of the SEED app implementation 200, reference is made to FIGS. 3-12, which illustrate a detailed breakdown of the SEED implementation. Starting with the SEED app 170 as shown in this figure, the high level breakdown of the SEED app implementation 200 includes an information page 205, an equipment module 210, an eye movement module 220, a pre-trip evaluation and coaching module 230, a behind the wheel evaluation and coaching module 240, a production module 250, a vehicle road test module 260, a safe work practices module 270, a truck driving school module 280, a history module 290, and a notes page 295.

In some embodiments, the information page 205 is a section of the SEED app implementation 200 that allows the user to make several selections pertaining to company/organization and employees or students involved in training, evaluation, and/or coaching. This is demonstrated in greater detail by reference to FIG. 3, which conceptually illustrates a detailed breakdown of a SEED app implementation of an incident evaluation, training, and correction process for spotting at-risk behavior, explaining the both at-risk behavior and correct behavior, enforcing the correct behavior, and documenting the incident that gave rise to the at-risk behavior in some embodiments. As shown in FIG. 3, the user interacts with the information page 205 to select a company (at 305), select a subject status as one of a student or an employee (at 310), make a selection of either a single student or employee (at 315) or a group of students or employees (at 320), input pertinent information about each student or employee (at 325), enter driver credentials (at 330) such as license number, expiration data, state, license class, and any applicable endorsements, provide medical examination card information (at 335) by scanning and uploading image of card and entering associated information, such as department of transportation (DOT) card expiration if applicable, select corrective lens requirement (at 340) if so required, and enter corrective lens requirement values and restrictions (at 345) when corrective lens requirement is selected.

In some embodiments, when the user logs into the system and accesses the information page 205, the SEED app may automatically populate an instructor or trainer field associated with the user's logon (at 350). In other cases, the user manually enters or selects an instructor or trainer (at 350). When the instructor or trainer is manually selected or automatically populated (at 350), the SEED app may allow the user to select a type of training, evaluation, or coaching (at 355). The result of selecting the type of training, evaluation, or coaching is described by reference to FIG. 4, which conceptually illustrates a continuation of the detailed breakdown of the SEED app implementation of the incident evaluation, training, and correction process of FIG. 3. As shown, the SEED app may auto populate previously known information from the user including equipment, pre/post trip information, behind the wheel, eye movement (test and tracking), safe work practices, production, vehicle road test, and history (at 360). Next, the user interacts with the information page 205 to select a reason for training, evaluation, or coaching (at 365), which can be made from a set of options including 'new hire', 'near miss' (near accident), 'incident follow-up', 'change of job', 'change of equipment', and 'annual certification' (at 370). The user is prompted to include dates for any injury/illness, accident/crash, light duty/TAW, and/or lost time/DART (at 375).

Turning back to FIG. 2, the equipment module 210 runs within the SEED app implementation 200 to allow the user to specify equipment information. This is demonstrated in greater detail by reference to FIG. 4, under equipment 210, where the user can specify a power unit (at 405), a unit number, type, and manufacturer (at 410), a combination of vehicles, train, or chain (at 415), a trailer length and gear type (at 420), and equipment number or numbers (at 425).

Referring again to FIG. 2, the eye movement 220 runs within the SEED app implementation 200 to allow the user to activate eye movement tracking. This is demonstrated in greater detail by reference to FIG. 4, under eye movement 220, and by reference to FIG. 5, which conceptually illustrates a continuation of the detailed breakdown of the SEED app implementation of the incident evaluation, training, and correction process of FIG. 4. As shown in FIG. 4, when the user selects eye movement 220 from the SEED app implementation 200, the user can start easy touch screen tracking 430. Turning to FIG. 5, the user can then start and stop time tracking (at 435). The SEED app implementation 200 of some embodiments will identify a number of priority items during tracking (at 440) and track the number of mirror and gauge checks (at 445), followed by eye movement tracing (at 450). The results are sent in an instant email (at 455) that is automatically generated and sent to key personnel. Specifically, the instant email is sent to "relevant parties" which is determined on a company-by-company or school-by-school basis, so that the instant email will be sent to key personnel or instructors such as, without limitation, a driving instructor, a supervisor, a compliance director, internal personnel who communicate with insurance adjusters, in-house or external legal counsel, business executives, school directors or board members, etc.

Now back to FIG. 2, the pre-trip evaluation and coaching module 230 runs within the SEED app implementation 200 to allow for user interaction with pre-trip evaluation and coaching. This is demonstrated in greater detail by reference to FIG. 5, under pre-trip 230, which is detailed by section and item by item (at 505) and is specific to a vehicle type (at 510). There is an icon to view instructions for each item (at 515), and includes scoring by way of a numeric scoring system 520.

An example of the numeric scoring system is demonstrated in FIG. 22. As shown in this figure, the numeric scoring system includes a range of values 1-5 which relate to scores for driving behavior compliance, used during evaluation or coaching, and being applied to one or more items of a potential group of driving behaviors for a driver. Specifically, the range of values 1-5 for the numeric scoring system shown in this figure includes a value of '5' when an item is performed correctly with no instruction. The numeric scoring system also includes a value of '4' when an item is performed correctly, but includes reinforcement of understanding. The value of '3' is included in the numeric scoring system of this figure when an item is evaluated to be performed incorrectly, and when corrected and reinforced understanding is applied or instructed. The numeric scoring system also includes a value of '2' when an item is performed incorrectly on multiple occasions, and corrected and reinforced understanding has been applied. A lowest value for the numeric scoring system in this figure is the value of '1', which is the score as evaluated when an item is failed to be performed correctly, is not performed at all, or is disqualified in some way (such as an effort to cheat, obscure, or render the item in a state that cannot be evaluated). Finally, the numeric scoring system in this example includes a default catch-all when none of the values in the range of values 1-5 is appropriate or needed, shown as a 'not applicable' or 'N/A' option. While the numeric scoring system shown in FIG. 22 is isolated from other steps of other processes and separated from particular modules of other systems, it is noted here that the numeric scoring system shown in FIG. 22 can be incorporated into any such process that needs scoring of driver, student, or employee behavior over a range of values 1-5 that relate to a level of behavior compliance (such as driving behavior compliance). Furthermore, in many instances, a specific scoring system that is different from the numeric scoring system shown in FIG. 22 may be incorporated or used. In some cases, the numeric scoring system is used as shown in this figure, but is updated, adapted, or reconfigured after being incorporated into a process, app, portal, software, or system.

Turning back to FIG. 5, the numeric scoring system 520 includes the range of values 1-5 that relate to scores of a driver, student, or employee based on driver behavior as evaluated. The pre-trip 230 evaluation and/or coaching scores each item in each section with a value from the range of values 1-5, or enters the default catch-all 'N/A'. Specifically, the range of values 1-5 for the numeric scoring system 520 shown here include the value of '5' when an item is performed correctly with no instruction (at 525), the value of '4' when an item is performed correctly, but includes reinforcement of understanding (at 530).

Now, turning to FIG. 6, which conceptually illustrates a continuation of the detailed breakdown of the SEED app implementation of the incident evaluation, training, and correction process of FIG. 5, the numeric scoring system 520 includes the value of '3' when an item is performed incorrectly, with corrected and reinforced understanding applied (at 535). Next in the range of values 1-5 for the numeric scoring system 520 is the value of '2' when an item is performed incorrectly on multiple occasions, and corrected and reinforced understanding has been applied (at 540). At the bottom of the range of values 1-5 for the numeric scoring system 520 is the value of '1' when an item is failed to be performed correctly, not performed, or disqualified, as described above by reference to FIG. 22. Finally, the numeric scoring system 520 in this pre-trip section includes the default catch-all when none of the values in the range of values 1-5 is appropriate or needed, shown as the 'not applicable' or 'N/A' option (at 550).

After processing or completing values in the numeric scoring system 520 (or bypassing them as 'N/A'), the pre-trip 230 section of the SEED app implementation 200 includes a user-selectable document preview option (at 555). When document preview 555 is started, the user is taken through a preview of section scoring by item (at 560), a preview of total score and percent effective (565), electronic signature and initializing per page of the document (at 570), instructions and notes per item that is specific to the student/employee (at 575), a preview of a critical item graph (580), and a graph of score by each section (at 585). After document preview 555, the pre-trip 230 section of the SEED app implementation 200 includes automated preparation and sending of the instant email (at 590) to the relevant parties (as described above).

Referring back to FIG. 2, the behind the wheel evaluation and coaching module 240 runs within the SEED app implementation 200 to spot, explain, educate, and document driver behavior while driving (e.g., "behind the wheel" of a service car, company van, delivery truck, etc.). Documenting "behind the wheel" driver behavior is described in further detail by reference to FIG. 7, which conceptually illustrates a continuation of the detailed breakdown of the SEED app implementation of the incident evaluation, training, and correction process of FIG. 6, and by further reference to FIG. 8, which conceptually illustrates a continuation of the detailed breakdown of the SEED app implementation of the incident evaluation, training, and correction process of FIG. 7.

Several aspects of driver behavior while driving are delineated and documented by the behind the wheel evaluation and coaching module 240 of the SEED app implementation 200. Referring first to FIG. 7, the behind the wheel evaluation and coaching module 240 methodically completes all items in detail on a section by section and item by item basis (at 705) and also covers safe driving elements on an item by item basis (at 710). Critical information captured by the behind the wheel evaluation and coaching module 240 for a particular driver includes the specific vehicle type used by the driver, the driver's license class, and identity of passengers (if any) accompanying the driver (at 715) on the present trip. The behind the wheel evaluation and coaching module 240 also presents an icon on a behind the wheel view/page of the SEED app implementation, which when selected, allows the user to view instructions for each item (at 720). Again, the numeric scoring system 520 is employed to score each "behind the wheel" item, with the range of values 1-5 and a default catch-all 'N/A' option 550, when a score is inapplicable. In this case, the numeric scoring system 520 is similar to the numeric scoring system described above, by reference to FIG. 22. However, in some embodiments, the numeric scoring system is updated, adapted, changed, or reconfigured in some manner but remains incorporated in the process, system, software, app, or portal.

Now referring to FIG. 8, the behind the wheel evaluation and coaching module 240 evaluates and marks all turns on a turn-by-turn basis throughout the trip, with each turn plotted and numbered on a map generated based on location information determined by an onboard GPS device and corresponding remarks about each numbered turn being documented (at 725) by the behind the wheel evaluation and coaching module 240. For instance, a driver of a truck may follow a delivery route that includes several turns between an origin (starting point) and a destination (delivery point), and the driver's smartphone with a SEED mobile app may be running and capturing GPS location data during the entire delivery route trip, and may determine whether each turn is 'OK', 'WIDE', or 'SHORT' based on a known map route and the realtime GPS location data captured while engaging the vehicle to turn—the SEED mobile app of some embodiments calculates a turn path based on several GPS data points for each turn, and compares the calculated turn path of each turn with a corresponding model turn based on the route, the vehicle type, known road conditions (uphill turn, downhill turn, turning onto a multi-lane road, uneven road or potholes in road along turn path, etc.). The corresponding model turn is considered an ideal turn for the vehicle type and other known road conditions, and approximate compliance of the driver's actual turn path (as calculated) to the corresponding model turn is marked as 'OK'. In some embodiments, approximate compliance includes exact matching of the actual turn path and the corresponding model turn with an allowed deviation from the corresponding model turn of a certain percentage that is configurable by an administrator or other authorized user. For instance, the percentage may be configured to allow for ten percent deviation between the driver's actual, GPS-based calculated turn path and the corresponding model turn. Similarly, the driver's actual turn path may be considered 'WIDE' or 'SHORT' when the actual turn path deviates too loosely (for 'WIDE' turns) or too sharply (for 'SHORT' turns)—exceeding the permitted deviation percentage as configured.

Continuing with FIG. 8, the behind the wheel evaluation and coaching module 240 includes a section menu (at 730) for each "behind the wheel" section, and an option for document preview (at 735) as a user-selectable tool or menu option. When document preview (at 735) is selected, the behind the wheel evaluation and coaching module 240 takes the user through document preview according to section scoring by item (at 740), total score and percent effective (745), electronic signature and initializing per page of the document (at 750), instructions and notes per item which depends on who the student or employee is (at 755), a preview of an incident probability graph (760) that is based on the turn-by-turn results and overall GPS route as mapped during the driver's journey, and a graph of score by each section (at 765). After "behind the wheel" document preview 735 is completed, the behind the wheel evaluation and coaching module 240 of the SEED app implementation 200 includes automated preparation and sending of instant email (at 770) to the "relevant parties" defined above.

Referring back to FIG. 2, the production module 250 runs within the SEED app implementation 200 to spot, explain, educate, and document other aspects of driver behavior beyond pre-trip behavior and behind the wheel behavior. Production is described by reference to FIG. 8, and in further detail by reference to FIG. 9, which conceptually illustrates a continuation of the detailed breakdown of the SEED app implementation of the incident evaluation, training, and correction process of FIG. 8. Referring first to FIG. 8, the production module 250 evaluates and documents timeliness and performs a start day evaluation (at 810). The production module 250 also performs mileage tracing (at 820) based on GPS location data and resulting maps that are generated of the routes driven by a given driver. Also, the production module 250 completes the evaluation on a step-by-step basis (at 830).

Now turning to FIG. 9, the production module 250 moves on to document preview (at 840) and electronic signature and initialing of each page of the document (at 850). Upon completion of the production section, the production module 250 automatically generates and sends an instant email (at 860) to the relevant parties (as described above).

Referring back to FIG. 2, the vehicle road test module 260 runs within the SEED app implementation 200 to spot, explain, educate, and document other aspects of driver behavior beyond pre-trip behavior, behind the wheel behavior, and production details. Aspects of the vehicle road test module 260 are described by reference to FIG. 9. Specifically, the vehicle road test module 260 performs evaluation on a detailed section-by-section and item-by-item basis (at 910). The vehicle road test module 260 first captures the critical information about the road test, including the specific vehicle type, the driver's license class (A, B, or C), and any passenger information (at 920) when a passenger is accompanying the driver in the vehicle during the actual vehicle road test. For instance, a driving instructor may be a passenger of an employee driver performing an actual vehicle road test of a new truck intended to be used for deliveries by a company. The vehicle road test module 260 also presents an icon for each item to view instructions for each item (at 930). The vehicle road test module 260 then performs scoring by way of a specific scoring system (at 940). In this example, the vehicle road test module 260 includes the specific scoring system 940 which is different from the numeric scoring system 520 (and as shown in FIG. 22) by being tailored to the requirements of a State Department of Motor Vehicles ("DMV"). As described above, by reference to FIG. 22, a specific scoring system may be used which is different from the numeric scoring system 520 or the numeric scoring system shown in FIG. 22. However, in some embodiments, the vehicle road test module 260 is configured to use the numeric scoring system 520, which is subsequently changed or adapted in some way to render a difference, thereby noted as a 'specific scoring system'.

After scoring is completed, the vehicle road test module 260 determines whether the driver passes/fails or is otherwise qualified/unqualified (at 950) which is based on the scores from the specific scoring system 940 as evaluated during the actual vehicle road test. The scores and the determination of passing/failing or qualified/unqualified are transmitted to the DMV for acceptance (at 960). After the DMV accepts the results, the vehicle road test module 260 moves ahead to document review (at 970), followed by electronic signature and initializing as needed (at 980), and finally, automatic generation and transmission of the instant email (at 990) to the relevant parties.

Again, in reference to FIG. 2, the safe work practices module 270 runs within the SEED app implementation 200 to spot, explain, educate, and document aspects of safe work practices by and for employees. Aspects of the safe work practices module 270 are described by reference to FIG. 10, which conceptually illustrates a continuation of the detailed breakdown of the SEED app implementation of the incident evaluation, training, and correction process of FIG. 9. Specifically, the safe work practices module 270 performs evaluation on a detailed section-by-section and item-by-item basis (at 1005). The safe work practices module 270 first covers general safety elements (at 1010) and includes an icon for each item to view instructions (at 1015). In evaluating each item in each section of safe work practices, the safe work practices module 270 uses a specific scoring system (at 1020) to score each item. The specific scoring system 1020 includes values in a range of 1-5, including the value '5' for correct performance of item with no instruction (at 1025), the value of '4' for correct performance of item with reinforced understanding (at 1030), the value of '3' for incorrect performance of item that is corrected and includes reinforced understanding (at 1035), a value of '2' for incorrect performance of the item on multiple occasions with correction and reinforced understanding (at 1040), and the value of '1' for failure to perform the item correctly and disqualification (at 1045).

In this case, the specific scoring system 1020 is nearly the same as the numeric scoring system 520, described above by reference to FIGS. 5 and 6, and shown in FIG. 22, with a single difference being that the specific scoring system 1020 does not include a default catch-all option 550 in which the score of an item can be marked in the document as 'N/A' or 'not applicable'. Thus, the specific scoring system 1020 has likely be adapted from the numeric scoring system 520, by removal of the default catch-all option for 'N/A' 550.

Moving on, the safe work practices module 270 includes document review (at 1050), which includes section scoring by item (at 1055) and several other sub-sections which are described by reference to FIG. 11. Specifically, FIG. 11 conceptually illustrates a continuation of the detailed breakdown of the SEED app implementation of the incident evaluation, training, and correction process of FIG. 10. As shown in this figure, the document review (at 1050) includes total score and percent effective (at 1060), electronic signature and initializing per page of the document (at 1065), interaction noted per item which is specific to the student or employee (at 1070), an incident probability graph (1075) based on the safe work practices scoring of items, and score by section graph (at 1080).

Now turning back to FIG. 2, the truck driving school module 280 runs within the SEED app implementation 200 to spot, explain, educate, and document truck driving school aspects. The truck driving school module 280 includes several sub-sections, some of which are described by reference to FIG. 11, and others which are described by reference to FIG. 12, which conceptually illustrates a continuation of the detailed breakdown of the SEED app implementation of the incident evaluation, training, and correction process of FIG. 11. As shown in FIG. 11, the truck driving school module 280 includes driver's license class type sub-sections, including "Class A" license (at 1105) and "Class B" license (at 1110). The truck driving school module 280 includes options for school duration including a first option for truck driving school that is completed in five to seven days (at 1115), a second option for truck driving school that is completed in seven to ten days (at 1120), and a third option for truck driving school that is completed in ten to fifteen days (at 1125). The truck driving school module 280 includes a selectable record of training documentation (at 1130), and information regarding a classroom (at 1135) in which classroom instruction is scheduled to take place, as well as a section covering theory (at 1140) for the instruction to take place. In reference to FIG. 12, the truck driving school module 280 also includes a sub-section to perform testing and knowledge check (at 1145). The truck driving school module 280 also includes a link to vehicle inspection documentation (at 1150), a link to yard skills documentation (at 1155), and a link to behind the wheel documentation (at 1160) that includes documentation of real world driving. The behind the wheel documentation 1160 includes links to both skills (at 1165) and defensive driving (at 1170). Finally, the truck driving school module 280 includes a DMV quality road test section (at 1175).

In FIG. 2, the history module 290 and the notes page 295 run within the SEED app implementation 200 to spot, explain, educate, and document historical records and notes. The history module 290 and the notes page 295 are described by reference to FIG. 12. As shown in this figure, when the history module 290 is selected from the SEED app implementation 200, student training evaluation and review is shown which highlights weak areas and strong areas (at 1210). When the notes page 295 is selected from the SEED app implementation 200, the user is provided the ability to make specific notations (at 1220).

While the examples described above by reference to FIGS. 3-12 refer to detailed information about and aspects of the high level breakdown of the SEED app implementation 200 of the incident evaluation, training, and correction process for spotting at-risk behavior, explaining the at-risk behavior and educating about the correct behavior, enforcing the correct behavior, and documenting the incident that gave rise to the at-risk behavior, other implementations and options are possible, including implementations of the incident evaluation, training, and correction process in software, web apps, mobile apps, cloud-based application services (e.g., software-as-a-service or "SaaS" cloud-computing implementations), portals, and other such implementations, some of which are deployed as systems. An example of a SaaS cloud-computing implementation of the incident evaluation, training, and correction system is described further below, by reference to FIG. 25.

In the next section, which is described by reference to FIGS. 13-21, a portal implementation is described. By way of example, FIG. 13 conceptually illustrates a high level breakdown of a SEED portal implementation of an incident evaluation, training, and correction system 1300 to spot at-risk behavior, explain both the at-risk behavior and correct behavior, enforce the correct behavior, and document the incident that gave rise to the at-risk behavior. As shown in this figure, the SEED portal implementation of an incident evaluation, training, and correction system 1300 includes a user selection of the SEED portal 180. When the SEED portal 180 is selected by the user, as described above by reference to FIG. 1, several sections of the SEED portal can be accessed, including a company organization section 1305, a roles and permissions section 1310, a users section 1315, a hierarchy section 1320, an instructors section 1325, a students section 1330, an interactive dashboard 1335, a reports section 1340, a student/trainee dashboard 1345, an auto test generator tool 1350, a library 1355, a learning management system 1360, and a section for driver qualification files 1365.

Turning to a detailed description of the portal implementation, FIG. 14 conceptually illustrates a detailed breakdown of a SEED portal implementation of the incident evaluation, training, and correction system 1300 to spot at-risk behavior, explain both the at-risk behavior and correct behavior, enforce the correct behavior, and document the incident that gave rise to the at-risk behavior. As shown in this figure, when the SEED portal 180 is selected by the user, the company organization section 1305 can be expanded to show multiple categories, such as CATEGORY 1—Example District (at 1405), CATEGORY 2 (at 1410), CATEGORY 3 (at 1415), CATEGORY 4 (at 1420), and CATEGORY 5 (at 1425). While CATEGORY 1-5 are non-descriptive examples of possible company organization categories, it is noted that the categories can be configured by an authorized user, such that categories are added, deleted, modified, etc., as needed according to the company organization.

Similarly, the roles and permissions section 1310, referenced in FIG. 2 and further described here, expands to super admins (at 1430) in which a certified safe driver ("CSD") assigns permission levels. Specifically, a level five designation (at 1435) confers master admin (at 1440) privileges to the user. A level four designation (at 1445) is different from the level five designation (at 1435), and therefore, has different types of user permissions. The level four permissions are described by reference to FIG. 15, which conceptually illustrates a continuation of the detailed breakdown of the SEED portal implementation of the incident evaluation, training, and correction system of FIG. 14. Specifically, the level four permissions include complete usage rights and minimal admin rights (at 1450). At a level three designation (at 1455), the assigned user would have app usage rights and report viewing and updating rights (at 1460). When a level two designation (at 1465) is made, the user is granted only app usage rights (at 1470). Finally, a level one designation (at 1475) only provides the user with report viewing rights (at 1480).

Next, the users section 1315, referenced in FIG. 2 and further described here, expands to an option to create/assign hierarchy details (at 1510). The hierarchy section 1320, referenced in FIG. 2 and further described here, follows the users section 1315 and expands to several options to create hierarchy details (at 1520), create notification titles (at 1530), and assign notification users (at 1540).

Now turning to FIG. 16, which conceptually illustrates a continuation of the detailed breakdown of the SEED portal implementation of the incident evaluation, training, and correction system of FIG. 15, the instructors section 1325, referenced in FIG. 2 and further described here, expands to an option to list instructors per company (at 1610) and an option to list instructors per company organization or school (at 1620). Another item under the instructors section 1325 is to create an instructor with all pertinent information (at 1630).

The next section in this figure is the students section 1330, which is referenced in FIG. 2 and further described here. Specifically, the students section 1330 expands to an option to list students per company or school (at 1640) and an option to list students per company organization or school (at 1650). Another item under the students section 1330 is to create a student with all pertinent information (at 1660).

Another aspect of the portal breakdown 1300 shown in FIG. 16 is the interactive dashboard 1335, which expands to several items, some of which are described by reference to FIG. 16 and others that are described by reference to FIG. 17. As shown in FIG. 16, the interactive dashboard 1335 includes an item for analytics (at 1670) in which a user can select to see an analysis of incident probability by company organization levels (at 1680). Turning now to FIG. 17, which conceptually illustrates a continuation of the detailed breakdown of the SEED portal implementation of the incident evaluation, training, and correction system of FIG. 16, the interactive dashboard 1335 under analytics (at 1670) further includes an option for the user to review an analysis of hazard data (at 1690) and another option to review trainer analysis (at 1695).

Moving forward, the reports section 1340, referenced in FIG. 2 and further described here, expands to a selectable report option for log & pre-trip (at 1705) which is detailed by section and includes item-by-item report details/scoring (at 1710). The reports section 1340 also includes options to select a department of transportation ("DOT") incident report (at 1715), an insurance carrier incident report (at 1720), company incident reports (at 1725), over-due report(s) (at 1730), a list of reports coming due in specific (e.g., 30, 15, 5, etc., days out) time period (at 1735), an option to show percentage of effective reports (at 1740), an option to show reports in which the most help is needed (at 1745), and an option to show best in class reports (at 1750).

Another item is the student/trainee dashboard 1345, referenced in FIG. 2 and further described here in FIG. 17 and by reference to FIG. 18. As shown, the student/trainee dashboard 1345 expands provide a filtering option by company or by company organization (at 1755) and an option to show training history and applicable documentation (at 1760). In FIG. 18, which conceptually illustrates a continuation of the detailed breakdown of the SEED portal implementation of the incident evaluation, training, and correction system of FIG. 17, the student/trainee dashboard 1345 further expands to an option to show incident history and applicable documentation (at 1765) and an auto purging option (at 1770).

Next in FIG. 18 is the auto test generator tool 1350, which is referenced in FIG. 2 and further described here. The auto test generator tool 1350 includes an option to automatically send a test to a student or employee via phone or email (at 1810). The auto test generator tool 1350 also generates tests that are specific to the elements which are in most need of help by the student or employee (at 1820). Furthermore, the auto test generator tool 1350 can create shown element reviews that include quizzes for the student or employee (at 1830). The auto test generator tool 1350 includes a configuration option to generate and send out monthly tests, element reviews, and quizzes (at 1840) which are generated each month based on continuously updated information about the elements in which the student or employee needs the most help and other such information. The auto test generator tool 1350 provides hierarchy notifications (at 1850) to inform relevant parties and personnel on the improvements or status of the student or employee. The auto test generator tool 1350 also generates reports of completed tests, reviews, quizzes, etc., with upcoming due dates and overdue tests, reviews, and quizzes (at 1860). In some embodiments, the auto test generator tool 1350 is configured to include the completed, due, and overdue tests, reviews, and quizzes of each employee or student in the notifications sent to the relevant parties or personnel in the hierarchy.

The library 1355, which is referenced in FIG. 2 and further described here, expands to safe driver/safe work practices presentations (at 1870), short meeting templates (at 1880), and daily communications (at 1890).

Another item is the learning management system 1360, which is referenced in FIG. 2 and is further described in this figure and by reference to FIG. 19, which conceptually illustrates a continuation of the detailed breakdown of the SEED portal implementation of the incident evaluation, training, and correction system of FIG. 18. The learning management system 1360 expands (as shown in FIG. 19) to options for safe driving records (at 1905), safe work practices (at 1910), power industrial truck learning/education (at 1915), and OSHA compliance (at 1920) records.

Similarly, the driver qualification files 1365, referenced in FIG. 2 and further described here and by reference to FIGS. 20 and 21, expands to a selectable option for a driver-specific application (at 1930) which, for each driver, includes information about the driver for the duration of employment plus three additional years after cessation (at 1940). The driver qualification files 1365 also expands to a selectable option for an original motor vehicle record from the time of hire for the current job (at 1950) which is on file for the duration of employment plus three extra years after employment ceases (at 1960). The driver qualification files 1365 also expands to a selectable option for a road test certificate (at 1970) which remains on file for the duration of employment plus three extra years after employment ceases (at 1980). The driver qualification files 1365 also expands to a selectable option for a photocopy of the driver's license of the driver if used in lieu of a road test (at 1980).

Turning to FIG. 20, conceptually illustrates a continuation of the detailed breakdown of the SEED portal implementation of the incident evaluation, training, and correction system of FIG. 19, the photocopy of the driver's license of the driver, when selected from the driver qualification files 1365, remains on file for the duration of employment plus three extra years after employment ceases (at 2010). However, subsequent driver's license renewals do not trigger a need for a new photocopy of the license after renewal—the driver qualification files 1365 only maintain the photocopy of the driver's license from the moment of employment. Next, the driver qualification files 1365 also expands to a selectable option for returned safety performance history inquiry or records of good faith efforts (at 2020), which is only for the duration of employment plus three extra years and stored in accordance with confidentiality requirements specified in the Code of Federal Regulations, under 49 CFR § 391.53 (at 2030). Next, the driver qualification files 1365 also expands to a selectable option for annual motor vehicles records ("MVR") of the employed driver (at 2040), which is stored in the driver qualification files 1365 for three years from the document date (at 2050). Additionally, the driver qualification files 1365 expands to another selectable option for annual documented review of the annual MVR of the driver (at 2060), which is stored in the driver qualification files 1365 for three years from the document date (at 2070). The driver qualification files 1365 further expands to another selectable option for driver's annual list of violations (at 2080) which is also known as a certificate of violations.

Now referring to FIG. 21, which conceptually illustrates a continuation of the detailed breakdown of the SEED portal implementation of the incident evaluation, training, and correction system of FIG. 20, the certificate of violations 2080 for the driver is stored in the driver qualification files 1365 for only three years from the document date (at 2110). Next, the driver qualification files 1365 expands to a further selectable option for medical examination certificate (at 2120), which is stored in the driver qualification files 1365 for three years from the document date (at 2130). The driver qualification files 1365 again expands to a further selectable option for medical or CDL holder vehicle report indicating medical status (at 2140), which is stored in the driver qualification files 1365 for three years from the document date (at 2150). Next, the driver qualification files 1365 expands to another selectable option for documentation that the national registry of certified medical examination for driver physicals has been checked (at 2160), which is stored in the driver qualification files 1365 for three years from the document date (at 2170). Finally, the driver qualification files 1365 expands to yet another selectable option for medical variance or exemption document (at 2180), if applicable, which is stored in the driver qualification files 1365 for three years from the document date (at 2190).

While the numeric scoring system shown in FIG. 22 is described above, reference is now made to FIG. 23 and FIG. 24. Specifically, FIG. 23 demonstrates an example of a SEED algorithm implementation used by an incident evaluation, training, and correction system and process or incorporated into another system. Also, FIG. 24 conceptually illustrates additional features of the incident evaluation, training, and correction system and process, and such features that may be added to aspects of the SEED app or SEED portal described above by reference to FIGS. 2-21.

By way of example, FIG. 25 conceptually illustrates a cloud computing software-as-a-service ("SaaS") cloud-computing network architecture over which an incident evaluation, training, and correction system is deployed (hereinafter referred to as the "SaaS cloud-based incident evaluation, training, and correction system 2500"). As shown in this figure, the SaaS cloud-based incident evaluation, training, and correction system 2500 includes a first vehicle associated with a first driver 2505, a second vehicle associated with a second driver 2510, a global positioning system (GPS) satellite 2515, a communication tower 2520, a gateway 2525, an access device 2530, a certified safe driver ("CSD") service 2535, backend servers and databases 2540, and a computer 2545 for portal access. The first vehicle associated with a first driver 2505 includes a GPS device that allows for turn-by-turn tracking and mapping of the route over which the first vehicle associated with a first driver 2505 travels in connection with deliveries, driver instruction or testing, etc. The second vehicle associated with a second driver 2510 is a delivery van operated by a driver with a driver's license in the appropriate class. The second vehicle associated with a second driver 2510 also includes a GPS device. The GPS devices in the first vehicle associated with a first driver 2505 and the second vehicle associated with a second driver 2510 may be embedded GPS chips in the smartphones of the first driver and the second driver. When the devices of the first driver and the second driver are running, the mobile app is able to query the onboard embedded GPS chip for location information and calculate or determine a present location. When route mapping is configured, the location information is used to calculate or determine present location continuously as long as the respective vehicle is being driven.

to make the cloud-based training tool for coaching and reinforcement of defensive driver skills and knowledge of the present disclosure, a person would need to implement and deploy the SaaS cloud-based incident evaluation, training, and correction system 2500. The person would likely need (or would need to obtain) knowledge and experience on how a company should conduct training in order to generate a mobile SEED app, SEED portal, and other such implementations to use by clients connecting to the CSD service 2535 hosted by the SaaS cloud-based incident evaluation, training, and correction system 2500. The SEED app presents questions to a user in which each question prompts an answer from the driver in a scoring case, from 1-5, with five (5) being best-along the lines of the numeric scoring system 520 described above, by reference to FIGS. 5 and 6, and shown in isolation in FIG. 22. If the user receives less than a score of five (5), instructions are given to validate that training took place. In this way, the training is validated and documented, thereby providing a valuable enhancement to the overall system. Also, each particular item is coded in CSD service 2535 and the SEED app (and other implementations) and by a developer into line items and written codes to make this as unique as possible. There are thousands of algorithms the drive the logical framework of the SaaS cloud-based incident evaluation, training, and correction system 2500 and the CSD service 2535, putting the entire SaaS cloud-based incident evaluation, training, and correction system 2500 into a state of intelligent analysis to help ensure results that would benefit a particular driver, such as by helping them to make the right choice among multiple possible life altering choices. In a preferred embodiment, the cloud-based training tool is accessible to drivers who use the SEED app (or software) to connect to the CSD service 2535 hosted by the SaaS cloud-based incident evaluation, training, and correction system 2500. In this way, users are able to obtain coaching and reinforcement of defensive driver skills and knowledge which trains people in commercial vehicle environments to be risk averse (and to not be risk tolerant). In this way, the cloud-based training tool helps those people to become more defensive drivers, protecting them as well as the general public so that people can go home to their families safely each day. Also, as regulations change, the cloud-based training tool of the SaaS cloud-based incident evaluation, training, and correction system 2500 is routinely updated to reflect the changes in regulations in a way to that further assists users to be more risk averse, in view of the updated/new/changed regulations.

To use the cloud-based training tool for coaching and reinforcement of defensive driver skills and knowledge of the present disclosure, someone would train and educate a cadre of trainers on how to use the cloud-based training tool for coaching and reinforcement of defensive driver skills and knowledge to make them more proficient than they ever have been. They can simply connect to the CSD service 2535 which runs on the backend servers 2540 and is hosted by the SaaS cloud-based incident evaluation, training, and correction system 2500. Alternatively, some companies, organizations, or driving schools may deploy in-house locally-installed incident evaluation, training, and correction systems on their private in-house networks.

As such, the SaaS cloud-based incident evaluation, training, and correction system 2500, the SEED app implementation, the SEED portal implementation, and other software system implementations ensure that the cloud-based training tool for coaching and reinforcement of defensive driver skills and knowledge is at the disposal of users to create comprehensive pre-trip evaluation and coaching and post-trip data analysis, behind the wheel evaluation and coaching, and hazard data analysis that will provide the client with reports that they can utilize, to better manage their processes, create training process, focus on reducing at risk behaviors, quizzes to help the driver to focus on constant and consistent training, where each trainer, manager and divisional manager can excel at his or her job.

The above-described embodiments of the invention are presented for purposes of illustration and not of limitation. Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 26 conceptually illustrates an electronic system 2600 with which some embodiments of the invention are implemented. The electronic system 2600 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 2600 includes a bus 2605, processing unit(s) 2610, a system memory 2615, a read-only memory 2620, a permanent storage device 2625, input devices 2630, output devices 2635, and a network 2640.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2620, the system memory 2615, and the permanent storage device 2625.

From these various memory units, the processing unit(s) 2610 retrieves instructions to execute and data to process in order to execute the processes of the invention. The processing unit(s) may be a single processor or a multi-core processor in different embodiments.

The read-only-memory (ROM) 2620 stores static data and instructions that are needed by the processing unit(s) 2610 and other modules of the electronic system. The permanent storage device 2625, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2625.

Other embodiments use a removable storage device (such as a flash drive) as the permanent storage device 2625. Like the permanent storage device 2625, the system memory 2615 is a read-and-write memory device. However, unlike storage device 2625, the system memory 2615 is a volatile read-and-write memory, such as a random access memory. The system memory 2615 stores some of the instructions and data that the processor needs at runtime. In some embodiments, the invention's processes are stored in the system memory 2615, the permanent storage device 2625, and/or the read-only memory 2620. For example, the various memory units include instructions for processing appearance alterations of displayable characters in accordance with some embodiments. From these various memory units, the processing unit(s) 2610 retrieves instructions to execute and data to process in order to execute the processes of some embodiments.

The bus 2605 also connects to the input and output devices 2630 and 2635. The input devices enable the user to communicate information and select commands to the electronic system. The input devices 2630 include alphanumeric keyboards and pointing devices (also called "cursor control devices"). The output devices 2635 display images generated by the electronic system 2600. The output devices 2635 include printers and display devices, such as cathode ray tubes (CRT), liquid crystal displays (LCD), and organic light emitting diode (OLED) displays. Some embodiments include devices such as a touchscreen (e.g., of a mobile device, such as a smartphone or a tablet computing device) that functions as both input and output devices.

Finally, as shown in FIG. 26, bus 2605 also couples electronic system 2600 to a network 2640 through a network adapter (not shown). In this manner, the computer can be a part of a network of computers (such as a local area network ("LAN"), a wide area network ("WAN"), or an intranet), or a network of networks (such as the Internet). Any or all components of electronic system 2600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 3-12 and 14-21 conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

II. EIRS System and Processes

As noted above, in some embodiments, the SEED system operates in connection with, or is incorporated with, an electronic vehicular incident reporting system (referred to as the "EIRS system" or "EIRS"). Furthermore, embodiments of a plurality of electronic vehicular incident reporting processes are also provided. The EIRS system and the EIRS processes provide comprehensive procedural control and guidance for gathering all critical information related to a vehicular incident.

In some embodiments, the electronic vehicular incident reporting processes (referred to as the "EIRS processes") provide step-by-step guidance and comprehensive procedural control for gathering all critical information related to a vehicular incident. In some embodiments, the EIRS processes comprise a high-level EIRS process and a comprehensive EIRS process. In some embodiments, the comprehensive EIRS process is implemented as a software application that runs on a computing device. In some embodiments, the software application comprises an EIRS mobile app that runs on a mobile device of a user.

In some embodiments, the EIRS system is configured to receive incident data from a mobile device of a driver (or of a co-worker user) involved in a vehicular incident and to create an initial report based on the received incident data. In some embodiments, the initial report includes crash critical information about the vehicular incident, the date, day of week, time stamp, list and degree of severity of injuries for drivers and others, the location, the degree of accident, the type of incident (vehicle collision, injury, etc.), relation to property/premises of an entity employing the driver (e.g., whether on or off the property of the driver's company), information about anyone transported from scene, crash pictures and/or videos taken at the scene while fresh and from all angles and for all types or objects involved, as well as a crash description from the driver (first-hand account), information about other drivers involved, witness information, driver and company/entity information, crash diagram(s), incident follow up report(s), and crash incident workforce notification(s). In some embodiments, the EIRS system also creates crash analytics reports (to be viewed by parties), triggers alerts and sends alert notifications, and produces other reports, including a plurality of injury reports comprising injury/illness alert report(s), injury/illness follow-up report(s), injury/illness incident report for OSHA standards, and injury/illness analytics corrective behaviors report(s). Furthermore, the EIRS mobile app is configured to run on mobile devices of drivers (or related personnel, including vehicle passenger co-workers) of a company to be able to capture all data surrounding a vehicular incident. Specifically, the EIRS mobile app steps through all stages of data collection related to the incident. The data captured and collected by the EIRS mobile app includes pictures and videos, descriptions, factual data, etc. By capturing all pertinent information upfront, the EIRS mobile app provides all the data of an incident/injury to the EIRS system to generate relevant reports, inform relevant company personnel, and take actions as needed, thereby allowing the driver and the driver's company to paint a solid picture of what occurred before, during, and after the vehicular incident.

Embodiments of the EIRS system and EIRS mobile app-implemented processes described in this specification differ from and improve upon currently existing options. In particular, no company has one continuous system or mobile app that gathers all required data, analytics, hazard data, department of transportation (DOT) information, insurance information, etc. Instead, the conventional systems that exist are a mishmash of multiple separate platforms and systems that are disjointed and nearly impossible to work together in order to get to the root cause of an accident or incident. In contrast to the existing conventional systems, the EIRS system and EIRS mobile app-implemented processes of the present disclosure is a complete system built from back to front in a way that guides the user to capture the vital information and details at the site of the accident or incident and, therefore, is able to get to the root cause of any incident/accident/injury/illness. In addition to being comprehensive and complete, the EIRS system and EIRS mobile app-implemented processes provide measurable time savings through the step-by-step guided process which removes doubt from the mind of the driver or other user involved in or witnessing an accident or incident. Furthermore, the EIRS system and EIRS mobile app-implemented processes create and provide reports and cross-reports to assist a company to help them drive change and improved outcomes for drivers, as well as better output of a claim or an accident/illness or injury.

The EIRS system and EIRS mobile app-implemented processes of the present disclosure may be comprised of the following elements. This list of possible constituent elements is intended to be exemplary only and it is not intended that this list be used to limit the EIRS system and EIRS mobile app-implemented processes of the present application to just these elements. Persons having ordinary skill in the art relevant to the present disclosure may understand there to be equivalent elements that may be substituted within the present disclosure without changing the essential function or operation of the EIRS system and EIRS mobile app-implemented processes.

1. PRELIMINARY ACCIDENT REPORTING INFORMATION: As soon as the mobile app is initiated by the user (say, on the user's mobile device, whether the user is a driver or passenger or witness) it notifies parties in the hierarchy (or members in a notification group) and provides GPS coordinates of the location (of the accident or incident site). The mobile app also displays an "Incident Notifier Disclaimer" informing the user does not to place himself or herself in harm's way. The mobile app then displays an "Initialize Incident Report" message, whereby the user is prompted to select (i) an accident, an illness, or both an accident and an illness, (ii) a department, and (iii) a vehicle number. The "Initialize Incident Report" screen continues to prompt the user to determine "Are you able to fill in details of accident/injury?", and prompting the user to select either "Yes" or "No" in response, followed by proceeding or canceling. Then the mobile app prompts the user that it will now seek the location via GPS as calculated by the mobile device operated by the user, and upon getting the GPS coordinates, sends the location to the EIRS system as a notification inquiry (this may be distributed by the ERIS system to the notification group members). The mobile app goes on to the next question, asking the user "Are you injured?" and prompting the user to select either "Yes" or "No", before moving on to the next procedural information category (or section).

2. ACCIDENT SEVERITY INFORMATION: The mobile app presents a "Degree of Accident" screen and prompts the user to select "Minor", "Moderate", or "Major". Then the mobile app asks: "Is the accident location secured, not placing you or others in harm's way?" and prompts the user to select either "Yes" or "No", before moving on to the next procedural information category (or section).

3. INJURIES INFORMATION: The mobile app presents a question: "Is Anyone Injured?" and prompts the user to choose "Yes" or "No". If the user selects "Yes", then the mobile app inquiries about the "Degree of Injury (Others)" and "Is anyone being transported?" (e.g., by medical service vehicles, ambulances, etc.), prompting the user to select either "Yes" or "No". If the user indicates anyone is being transported away from the accident/incident site, the mobile app then asks where they are being transported, to which the user may input a response, before moving on to the next procedural information category (or section).

4. FATALITIES INFORMATION: The mobile app prompts the user: "Are there any fatalities?". The user responds by selecting either "Yes" or "No", before moving on to the next procedural information category (or section).

5. ON-SITE EMERGENCY PERSONNEL INFORMATION: The mobile app inquires "Are there Emergency Personnel on site?", prompting the user to choose "Yes" or "No". When "Yes" is selected by the user, then the mobile app populates and displays a selectable drop down list, with selectable options for "Fire", "Police", "Paramedics", "Ambulance", "Coroner", "Media", "Tow Service", "Hazmat Company", "Others", before moving on to the next procedural information category (or section).

6. FIRE INFORMATION: The mobile app then asks, "Is there a fire?" and has the user select either "Yes" or "No", before moving on to the next procedural information category (or section).

7. SPILL INFORMATION: The mobile app inquires "Is there a spill?" and has the user select either "Yes" or "No". When the user selects "Yes" for spill, the mobile app inquiries about the size of the spill, either "Minor", "Moderate", or "Major", followed by prompting the user to select a type of spill from a drop-down list with "Cement", "Dairy Products", "Fuel", "Grain", "Gravel", "Hazardous", "Paint", "Produce", "Oil", "Water", "Sand", or "Other", and further inquiring "Is spill contained?" to which the user selects either "Yes" or "No", before moving on to the next procedural information category (or section).

8. OTHER VEHICLE INVOLVEMENT INFORMATION: The mobile app now asks "Is there another vehicle involved?" and has the user select either "Yes" or "No". If "Yes" is the response, then the mobile app inquires as to how many other vehicles were involved, and for any or each, whether a vehicle needs to be towed or not. The user is prompted to select "Yes" or "No" as to whether other vehicle(s) need towing, and if "Yes" is selected, then prompted to provide identification of the other vehicle (i.e., "Whose vehicle needs to be towed?). The mobile app then moves on to the next procedural information category (or section).

9. CITATION INFORMATION: The mobile app asks "Did anyone receive a citation?" and "Did anyone receive a citation for other vehicles?", prompting the user to select "Yes", "No", or "Unknown". To each question, if "Yes", then the mobile app indicates that the user must verify information, to which the user can select and verify (selecting "OK") either information verification area among "Critical Information", "Department Notification", and "States Crash Critical Information Summary of all 10 questions", and then select to "Submit" or go back by pressing "Previous". The mobile app then moves ahead to the next procedural information category (or section).

10. OTHER DRIVER INFORMATION: The mobile app asks "Is there another driver involved?", prompting the user to select "Yes" or "No". When "Yes", the mobile app provides a place for the user to take pictures, front and back, of the other driver's license, a picture of the driver's vehicle registration, and vehicle insurance. The mobile app allows the user to provide additional information for the other driver or drivers, such as the other driver's phone number or other contact information, name, address, city, zip code, license class, etc. The mobile app further allows the user to input updated registration information for other driver(s), fill-up if unable to take pictures of missing information, vehicle make, vehicle model, license plate number, expiration date, year, name address registered by driver, city, zip, etc. The mobile app then moves ahead to the next procedural information category (or section).

11. OTHER DRIVER QUESTIONNAIRE: The mobile app then presents a "Questionnaire for Other Driver", asking "Is the other driver on company time? Yes/No" If "Yes" is the response, then the mobile app prompts the user to provide information for "Other driver employed by", "Other driver's assigned location", "Other driver's address", "Other driver's phone number", and "Other driver's name and title", then prompts the user "Is the other driver using a company vehicle?" allowing the user to answer "Yes" or "No". If "Yes" is the response, then the mobile app inquires "Is it a combination vehicle (trailer or trailers)?" followed by prompting the user to answer "Yes" or "No", before moving forward to the next procedural category of information.

12. STILL IMAGE AND VIDEO CAPTURE: The mobile app prompts the user to obtain crash pictures and videos (or just still images of accident). The user is directed to capture pictures showing the position of the vehicles (post-accident) which, if any vehicle is already moved from the scene, would be the position in which the vehicle ended up before the vehicle was moved from the scene, and the to do the same for each other vehicles (the position each vehicle ended up in as a result of the accident, before those vehicles were moved from the scene). The user is also directed to capture photos of damage to each vehicle involved in the accident, in sequence. Thus, the user is directed to take a picture of all sides of the (first) damaged vehicle, and then directed to take more pictures of the main damage areas/portions of the vehicle, as well as other relevant photos pertaining to the (first) vehicle (e.g., item(s) found in vehicle, picture for each item if there are several items, etc.). Then the user is directed through the image and video capture steps for each other vehicle involved in the accident. After this section is completed by the user, the mobile app continues onward to the next procedural information category (or section).

13. PEDESTRIAN INFORMATION: In this section, the mobile app inquires: "Is there a pedestrian involved?" to which the mobile app requires the user to respond with either "Yes" or "No". When "Yes" is the response, the mobile app prompts the user to input the pedestrian information. The mobile app allows the user to add pedestrian information for each (if multiple) pedestrian. The mobile app then moves ahead to the next procedural information category (or section).

14. PROPERTY DAMAGE INFORMATION: The mobile app inquires as to whether property was damaged as a result of the accident. When "Yes" is the response, the mobile app prompts the user to provide information for "Damaged Property Company, Name, or Location", "Address", "Phone Number", "Contact Name, and "Contact Title". Then the mobile app allows the user to input a "Damaged Description". The mobile app inquires whether there were any witnesses and prompts the user to respond with "Yes" or "No". If "Yes", the mobile app allows the user to add witness information, including at least "Full name", "Address", and "Phone Number". Then the mobile app continues forward to the next procedural information category (or section).

15. CRASH DESCRIPTION INFORMATION: The mobile app prompts the user to provide a "Crash Description of What Happened" in which the user can input a response by typing out a description (alpha-numeric input) or capture a voice description as an audio file (e.g., speaking into a microphone of a smartphone). The user also is prompted to input or verbalize the address or approximate location of the incident (e.g., address, roadway, such as a highway, a two way street, etc.) and whether the location of the incident is residential, commercial, mixed, or other. The user may provide additional descriptive details, such as the weather at the time of the incident (e.g., foggy, rainy, snowing, clear and sunny, etc.), the time of day (e.g., nighttime, dusk, dawn, mid-day, etc.), the day of week, the road conditions (e.g., busy traffic, icy roads, rainy/wet roads, etc.), etc. The mobile app prompts the user as to whether there is an Office or Investigator associated with the accident/incident and to respond with a selection of either "Yes" or "No". When "Yes" for Officer/Investigator, the user is prompted by the mobile app to take a picture of a card or ID of the Officer/Investigator, to get his or her name, to select an "Officer Type" from a drop-down list, enter a "Badge Number", a "Location", a "Report Number", a "Phone Number", and to input (voice or text) information to "Describe the damage to the vehicle and to the other vehicle(s)". The mobile app also prompts the user to provide driver and company information, including at least (a) a driver's license, (b) an expiration date, (c) a DOT expiration date if the driver is registered as a Class A driver, (d) a start time of the driver for the current day (that is, the day of the accident/incident), (e) a finish time at which the driver previously worked on the last occasion (e.g., finish time of 9:00 PM day before accident), and (f) a HOS, if applicable. The mobile app then moves ahead to the next procedural information category (or section).

16. CRASH INCIDENT WORKFORCE NOTIFICATION: The mobile app automatically (a) sends immediate notification to the identified set-up hierarchy (e.g., members of a notification group) once the "Complete" button on the "Incident Report" has been activated, and identifies root causes and prevention activities. The mobile app also builds a communication to pass onto the entire network for enhanced awareness and to better avoid such accidents/incidents. The system, after receiving all information from the mobile app, creates a company incident log with (i) DOT Incidents (Major Crashes), (ii) Insurance Incidents (Moderate & Major Crashes), and (iii) Company Incidents (All Incidents). Then the mobile app moves on to the next procedural information category (or section).

17. CRASH ANALYTICS REPORTS: The EIRS system creates crash analytics reports, while the EIRS mobile app provides automatic alerts when a report (either a crash analytics report or other report, see below) is not completed within an established time duration. The crash analytics reports are created for viewing and are focused in several ways, including by (a) company, (b) region, (c) district, (d) division, (e) operation, (f) driver group, (g) total crashes by quarter, by month, by day of week, by time of day, etc., (h) crash type, (i) crash severity, (j) presence on or off property (of company, group, entity, etc.), (k) culpability (e.g., at fault, partial fault, not at fault), (l) ability to prevent (e.g., avoidable or unavoidable), (m) experience of driver measured in years in position (e.g., 0-1 years, 1-3 years, 3-5 years, 5-10 years, 11-15 years, 15-20 years, 20+ years), (n) commonality, such as by most common by raw number with generated observations to complete, (o) severity, such as by most severe by raw number with generated observations to complete noting root causes for incident, and (p) possible corrective behaviors, such as by a drop down list of corrective behaviors by category and exceptions noting root causes for incident. Also, the mobile app provides automatic alerts when a report is not completed within an established time duration. The crash analytics reports (and other reports, see below) are produced at several different repeating times, including annually, quarterly, monthly, for specific holidays, and most at-risk times based on the system utilizing bots to pull and determine, e.g., the five most at risk along with what is trending up or down. The mobile app then moves ahead to the next procedural information category (or section).

18. INJURY OR ILLNESS ALERT REPORT: The EIRS system creates injury or illness alert reports at the request of an employee or other authorized personnel (e.g., HR personnel, managers, etc.). The EIRS mobile app prompts the user to provide details of injuries and/or illnesses arising as a result of the crash incident. The EIRS mobile app aggregates the injury/illness information provided by the user and submits the aggregated data (in some embodiments as part of the crash critical information data aggregated through all sections) to the EIRS system to generate injury and illness alert reports. Each injury and illness alert report includes (a) an employee name (employee subject to the injury or illness in relation to the accident or incident), (b) subject employee ID, (c) employee's department, (d) employee's division, (e) operation (if any operation has been or will be performed on the employee), (f) a date of injury or illness, which includes a day of week, and a time of day stamp, (g) an indication of which body part is or which body parts are injured, (h) a task being performed at the time the injury occurred, (i) a start time for the day, (j) the weather conditions at the time of injury, (k) whether anyone else was involved in the incident (whether also injured or not), (l) identification of any vehicle involved, (m) whether employee stretched before starting (or did other pre-task required physical preparation conditioning), and (n) a description of the incident. Examples of injury/illness processes are described below, by reference to FIGS. 41 and 42. The mobile app then moves ahead to the next procedural information category (or section).

19. INJURY OR ILLNESS FOLLOW UP REPORT: The system creates an injury or illness follow up report, which includes (a) an employee name (employee subject to the injury or illness in relation to the accident or incident), (b) subject employee ID, (c) employee's department, (d) employee's division, (e) operation (if any operation has been or will be performed on the employee), (f) a date of injury or illness, which includes a day of week, and a time of day stamp, (g) an indication of which body part is or which body parts are injured, (h) a task being performed at the time the injury occurred, (i) a start time for the day, (j) hours worked during the day of the injury, (k) weather conditions on the day of the injury, (l) whether anyone else was involved in the incident (whether also injured or not), (m) identification of any vehicle involved, (n) whether employee stretched before starting (or did other pre-task required physical preparation conditioning), (o) a description of the incident, (p) type of injury reported, (q) whether the injury was avoidable or unavoidable, (r) medical attention OSHA Type (Info Only (0), Medical Only (1), TAW (3), Days Away (4)), (s) type of restrictions given (t) TAW start date, (u) TAW finish date, (v) RTRD date, (w) date on which RTRD training completed, (x) days away start date, (y) disciplinary action taken, (z) type of discipline. The injury/illness follow up report also includes information indicating whether the incident report was completed within two working days. And in some cases, it is necessary to add—to both TAW (OSHA Type (3)) and days away (OSHA Type (4))—the following: next doctor's appointment date, estimated return to regular duty date, and monthly contact made with employee (Y/N). The injury/illness follow up report further includes (aa) employment date, (bb) employee injury/accident history, (cc) date of last safety review discussion with the employee, (dd) date of follow up training and name of personnel who directed and performed the training, (ee) the last observation findings, (ff) summary of the operations work group safety history over the previous twelve month period, (gg) name of mentor, if any, assigned to employee, (hh) an indication (Y/N) of whether workforce was notified, (ii) any identified root causes of the injury, and (jj) any prevention activities identified for each root cause. The mobile app then moves ahead to the next procedural information category (or section).

20. INJURY OR ILLNESS ROOT CAUSE CHECKLIST: The EIRS system aggregates and assembles an injury/illness root cause checklist, which is populated by selections from a BOT and/or pull-down list of root causes from which to choose. The root causes are pulled over and populated in the OSHA sections, the injury alert report, the injury/illness follow up report, the injury/incident workforce notification. The system uses the root causes to automatically generate OSHA logs for OSHA 0, OSHA 1, OSHA 2, OSHA 3, OSHA 4, OSHA 5, and the OSHA 300 log using the actual OSHA form. The system also automatically generates OSHA 300A Form (using actual OSHA form), OSHA 301 Incident Report, an Insurance Incident Log (DART and non-DART), a company incident log (DART, non-DART, and First Aid only). The mobile app then moves ahead to the next procedural information category (or section).

21. INJURY OR ILLNESS WORKFORCE NOTIFICATION: The EIRS system provides an injury or illness workforce notification that includes information for (a) the location of the incident that gave rise to the injury or illness, (b) the type of incident, (c) the severity level of the incident and injury, (d) the date of the incident, (e) a time stamp associated with a time the incident occurred, (f) the day of week on which the incident happened, and (g) an incident description. The mobile app then moves ahead to the next procedural information category (or section).

22. INJURY OR ILLNESS ANALYTICS CORRECTIVE BEHAVIORS: During creation of the crash analytics report (17), the EIRS system identifies and populates a list of corrective behaviors. Reports can be viewed by all based on areas of responsibilities and covers (a) total injuries; (b) total injuries by severity, classification, and type; (c) total avoidable injuries; (d) total unavoidable injuries; (e) the most common injuries, tabulated in totals for (e.i) drivers with less than one year of experience, (e.ii) drivers with 1-5 years of experience, (e.iii) drivers with 5-10 years of experience, (e.iv) drivers with 10-15 years of experience, (e.v) drivers with 15-20 years of experience, and (e.vi) drivers with over 20 years of experience; (f) the most severe injuries, tabulated in totals for (f.i) drivers with less than one year of experience, (f.ii) drivers with 1-5 years of experience, (f.iii) drivers with 5-10 years of experience, (f.iv) drivers with 10-15 years of experience, (f.v) drivers with 15-20 years of experience, and (f.vi) drivers with over 20 years of experience; and (g) observations and analysis for the most common and most sever, as automatically generated by the system and populated into the crash analytics report. The mobile app then moves ahead to the next procedural information category (or section).

23. REPORT PRODUCTION: The EIRS system automatically produces reports according to several triggering situations, including: (a) injury/illness follow up reports not completed within forty-eight hour time period, (b) injury/ illness follow up reports not completed at alert stages, and (c) injury/illness follow up reports not completed on the first day back, with addition report production for (d) late reports generated by district, division, manager, operation, etc., (e) open incidents reports, (f) access to all injury/illness reports for specific employee permitted by Employee ID number of the specific employee (generation being permitted to authorized personnel), which (g) tracks total TAW incidents and OSHA frequency, (h) average number of TAW days by district, division, operation, etc., (i) current people on TAW and total number of days on TAW, (j) days away (same as above), (k) raw number of injuries/illnesses by the following: (k.i) injuries from 00:00 to 06:00, (k.ii) injuries from 06:01 to 12:00, (k.iii) injuries from 12:01 to 18:00, (k.iv) injuries from 18:01 to 00:00, (k.v) injuries on property versus off property, (k.vi) injuries during particular employee's first, second, or (final) third of their workday, (k.vii) number of reported injures converting to TAW, (k.viii) number of injuries converting to days away, (k.ix) number of injuries resulting in fatality, (k.x) number of injury-free days by district, division, operation, etc., with (l) BOT to produce the five most at risk levels by district, division, operation, etc., (m) BOT to produce the five most at risk trending up by district, division, operation, etc., and with (n) BOT to produce the five most at risk trending down by district, division, operation, etc.

The steps of a high-level EIRS process of the present disclosure may be implemented in software, incorporated into and/or used in connection with the EIRS mobile app. An example of the steps of the high-level EIRS process follows next. It is not intended to limit the scope or nature of the relationships between the various steps of the high-level EIRS process and the following steps are presented as illustrative examples only.

1. Obtain critical information (addresses, vehicles involved, injuries, etc.).

2. Capture photo images/videos, and post all pictures/videos while the scene is fresh.

3. Obtain the driver's account of what took place (e.g., a crash description).

This is documentation at the time of the incident and will aid in any liability.

4. Obtain driver's license, registration, insurance, contact information (phone number) of all parties.

5. Obtain contact information of any/all witnesses.

6. Obtain drivers license of employee driver (the "user" of the EIRS mobile app), as well as the driver's license expiration date, DOT expiration date if Class A, start time of the employee driver for the current day, finish time of the employee driver for the last time worked, and, if applicable, HOS.

7. Create a crash diagram and/or create a crash animation recreating user's recollection of what took place, utilizing cloud-based mapping services (e.g., Google Maps, etc.) and EIRS mobile app tools and interface options.

8. Provide immediate notifications to identified parties set up in the hierarchy, such as members of a notification group associated with the driver.

9. Aggregate and assemble reporting data for company, region, district, division, operation, driver group, total crashes by quarter, month, day of week, and time of day.

10. Determine whether there are any outstanding reports (i.e., any reports not completed within established timelines) and send alerts accordingly.

11. Schedule the production of reports annually, quarterly, monthly, specific holidays, etc., with the EIRS system allowing automated retrieval (e.g., BOTS to pull data) and determination of the five most at risk times, along with what is trending up or down, which are continuously updated via an automatic process and in realtime (no prior schedule).

The EIRS system and mobile app-implemented EIRS processes of the present disclosure generally works by following the steps of the high-level EIRS process. However, the EIRS system and the mobile app-implemented EIRS processes of some embodiments performs the steps in a different sequence or performs fewer of the steps or performs additional steps or sub-processes not mentioned in the description of the high-level EIRS process above. Nevertheless, the high-level EIRS process generally works by acquiring crash critical information at each step. Also, merely obtaining the crash critical information is insufficient for completing the high-level EIRS process or any of the EIRS processes in the plurality of EIRS processes. Specifically, the acquired crash critical information is gathered and analyzed at each step and, when the analysis of the information proves to suffice, the high-level EIRS process moves on to the next field, step, or section. In this way, the high-level EIRS process is able to build a case with facts and details about the crash incident. Additionally, the case is built not only from the employee's aspect, but with the company's interest maintained. For instance, the high-level EIRS process ensures that the company does not miss a step to gather all of the required data for (i) department of transportation (DOT) incidents (major crashes), (ii) insurance incidents (moderate and major crashes), and (iii) company incidents (all incidents). The Crash Analytics Reports (described above at #17) are to be created and viewed per (a) company, (b) region, (c) district, (d) division, (e) operation, (f) driver group, and for (g) total crashes by quarter, month, day of week, and time of day, (h) crash type, (i) crash severity, (j) avoidable/unavoidable crash, and by (m) years in position (e.g., 0-1 years, 1-3 years, 3-5 years, 5-10 years, 11-15 years, 15-20 years, 20+ years), (n) most common by raw number with generated observations to complete, (o) most severe by raw number with generated observations to complete noting root causes for incident, further providing (p) drop down list of selectable corrective behaviors by category and exceptions noting root causes for incident.

In some embodiments, the steps of the mobile app-implemented high-level EIRS process provides alert notifications when reports not completed within established timelines. In some embodiments, the steps of the mobile app-implemented high-level EIRS process produce reports on time-scheduled moments throughout the year, including annually, quarterly, monthly, and specific holidays, and the system allows BOTS to pull and determine the five most at risk along with what is trending up or down. The injury/illness report would be generated to include (a) employee name, (b) employee ID, (c) department, (d) division, (e) operation, (f) date, day of week, time of day, etc., (g) body part(s) injured (h) task performed/completed when injury occurred, (i) start time for the day of injury, (j) weather conditions, (k) anyone else involved in incident, (l) vehicle involved, (m) whether employee stretched before starting, and (n) description of incident. The injury/illness follow up report would be created in a way that includes (a) employee name, (b) employee ID, (c) department, (d) division, (e) operation, (f) date, day of week, time of day, etc., (g) body part(s) injured (h) task performed/completed when injury occurred, (i) start time for the day of injury, (k) hours worked on the day of injury, (l) weather conditions, (m) anyone else involved in the incident, (n) vehicle involved, (o) whether employee stretched prior to starting work, (p) description of injury, (q) type of injury reported, (r) avoidable/unavoidable, (s) medical attention OSHA type (Info Only (0), Medical Only (1), TAW (3), Days Away (4)), (t) type of restrictions given, (u) TAW start date, (v) TAW finish date, (w) RTRD date, and (x) date RTRD training completed. The initial incident report would be generated to include (a) crash critical information, (b) date, day of week, time of day, etc., and need to add time stamp once incident report is activated, (c) injuries to driver and others, (d) location, (e) degree of accident/crash, (f) type of crash (selected from a drop-down menu with list of crash types), (g) on or off property/premises, (h) degree of injuries, (i) transported away status (selected from a drop down list, e.g., ambulance, Med-a-Vac, other), (j) details of scene, such as who is present, media with drop down of type of media, and (k) emergency personal and/or tow services, names and numbers. The crash pictures and videos are to be automatically added to the reports, requiring that someone (a) take and post all pictures while the scene is fresh and (b) capture images for all angles, all types of vehicles/objects involved. The crash description is created to include information in reports such as traffic conditions and the driver's account of what took place (this is documentation at the time of the incident and will aid in any liability). For all other drivers involved, the procurement of and inclusion in reports of the other drivers' (a) driver's license, (b) vehicle registration, (c) insurance, and (d) contact information, such as phone number. For all identified witnesses, the procurement of and inclusion in reports of witness information includes (a) contact information of all witnesses, (b) names of witnesses, and (c) additional witness information.

The reports are further generated to include driver and company information, such as (a) driver's license, (b) expiration date, (c) DOT expiration date if class A driver, (d) start time current day, (e) finish time last time worked, and (f) HOS, if applicable. The reports are further generated to include a crash diagram that recreates (on paper) what took place, directions of travel, types of vehicles, etc., and utilizes cloud-based mapping services (e.g., Google Maps), when available. The reports are further generated to include incident follow up reports in which white areas will populate and gray areas need to be input unless possible to merge this with company database and can populate over crash incident workforce notification. The EIRS system further triggers immediate notification to identified parties in set up hierarchy. Typically, the EIRS system notifies once the "Complete" button on the incident report has been activated, and includes root causes, prevention activities, and a communication structure to pass onto the entire network for awareness and accident avoidance, and further creates company incident log, DOT incidents, etc.

Details of FIGS. 27-43 are described next. Specifically, FIGS. 27-43 describe various embodiments of the EIRS system and the plurality of EIRS processes. First, an EIRS system and associated EIRS mobile app are described, by reference to FIG. 27, along with a demonstration of how the EIRS system and the EIRS mobile app are interconnected, in some embodiments, with the SEED app and SEED system described above, in Section I.

Specifically, FIG. 27 conceptually illustrates a high-level breakdown of an EIRS system and an EIRS app implementation of a plurality of electronic vehicular incident reporting processes in connection with the SEED app 2700. Several items are shown in this figure include the SEED app breakdown 170 with the information page 205, the equipment module 210, the eye movement module 220, the pre-trip evaluation and coaching module 230, the behind the wheel evaluation and coaching module 240, the production module 250, the vehicle road test module 260, the safe work practices module 270, the truck driving school module 280, the history module 290, and the notes page 295, all of which are described above, by reference to FIG. 2. In addition, this figure demonstrates how the SEED app breakdown 170 is interconnected with an electronic incident reporting (EIRS) system 2710 and an EIRS app 2720. Furthermore, this figure illustrates how the EIRS app 2720 is communicably connected to the EIRS system 2710. Thus, the EIRS system 2710 may be deployed as a cloud application service (with SaaS architecture or other network architecture). A more detailed breakdown of the EIRS app 2720 and the EIRS system 2710 is described next, by reference to FIG. 28.

Specifically, FIG. 28 conceptually illustrates a detailed breakdown of a plurality of different EIRS app sections of the EIRS app 2720 and the EIRS system 2710, along with a notification group, a notification group management unit, and a persistent storage of the EIRS system 2710.

As shown in this figure, the plurality of different EIRS app sections of the EIRS app 2720 include an incident notifier section 2805, a crash critical user information section 2810, a crash critical other driver information section 2815, a questionnaire for other driver section 2820, a crash incident photos section 2825, another crash incident information/photos section 2830, a crash description section 2835, a crash diagram section 2840, an injury/illness and relation information section 2845, and a final incident report creation/submission section 2850. In some embodiments, the plurality of different EIRS app sections 2805-2850 correspond to the plurality of EIRS processes. The plurality of EIRS processes are described in detail below, by reference to FIGS. 29-43.

In addition to the plurality of different EIRS app sections of the EIRS app 2720, this figure illustrates a persistent storage 2855 (or "EIRS database"), a notification group manager 2860, and a notification group 2865 with a plurality of members.

The persistent storage 2855 is communicably connected to the EIRS system 2710 and provides persistent data storage of crash critical information in both character-based (text) data form and image form (e.g., digital photos, videos, animations, etc.). In some embodiments, the persistent storage 2855 is also configured to permanently store audio data and associated text data after converting an audio stream to a text description of the same. In some embodiments, the EIRS system 2710 includes a database management system that is configured to manage the permanent storage, retrieval, and deletion of all data in the persistent storage 2855.

The notification group manager 2860 is communicably connected to the EIRS system 2710 and is configured to automatically handle incident reports, alerts, and other notifications to the members of the notification group 2865. In some embodiments, the notification group 2865 comprises at least four members. In some embodiments, the notification group 2865 is one of several notification groups of a company or organization. In some embodiments, each notification group comprises a different set of at least four members.

While an example of an incident notifier process, associated with the incident notifier section 2805, is described below, by reference to FIG. 29, it is mentioned here by way of example that the EIRS app breakdown 2720 is organized in a manner that facilitates near-immediate notification of a crash incident to the members of the notification group 2865. This is accomplished easily by the driver ("user") of the vehicle involved in the crash incident launching the EIRS app on his or her mobile device and proceeding directly to the first section-namely, the incident notifier section 2805. By filling in some key details of the crash incident, the EIRS app 2720 automatically aggregates the incident details (provided by the user), generates a notification with the aggregated incident details, and transmits the notification to the EIRS system 2710. The EIRS system 2710, upon receiving the notification, the EIRS system 2710 automatically forwards the notification to the notification group manager 2860. In some embodiments, the notification group manager 2860 is a system that implements a functional BOT program to automate processing of the received notification, determine a corresponding notification group 2865 to which to send the notification, and specifically identifies members of the notification group 2865 and their preferred manner of digital communication (e.g., email, text message, etc.). After determining the appropriate notification group 2865 and identifying its members and their preferred communication type, the notification group manager 2860 transmits the received notification to the members of the notification group 2865. Since the notification group manager 2860 performs all of these operations (and other operations) as an automated program (similar to a BOT), the delay involved in forwarding the notification to the members of the notification group 2865 is almost nil. In other words, the time from the notification being transmitted by the EIRS mobile app 2720 and received by members of the notification group 2865 is nearly instantaneous. In this way, the transmission of notifications is characterized in this specification as being in "realtime" or "near realtime" transmissions. Note that the details input by the user in the EIRS mobile app 2720 running on the user's mobile device are not as comprehensive as the comprehensive crash critical details acquired by completing the entire sequence of different sections of the EIRS mobile app 2720. Nevertheless, the preliminary details obtained at this stage are sufficient to at least notify the members of the notification group 2865 of the occurrence of the crash incident and the location at which the crash incident occurred.

As mentioned above, and by way of example, FIG. 29 conceptually illustrates an incident notifier process 2900. The incident notifier process 2900 is one of the processes of the plurality of EIRS processes. The incident notifier process 2900 corresponds to the incident notifier section 2805, described above by reference to FIG. 28. Typically, the incident notifier process 2900 happens before any of the other processes in the plurality of EIRS processes. However, some embodiments of the EIRS system may alter a sequence in which the various sections are covered and the corresponding EIRS processes are performed.

The incident notifier process 2900 shown in this figure starts with an initialization of the EIRS mobile app (at 2910), which is launched and runs on a mobile device operated by a user. This is a prerequisite step for accessing any of the sections corresponding to the plurality of EIRS processes. Nevertheless, after the EIRS mobile app is launched and is running on the mobile device, the incident notifier process 2900 visually outputs, on a screen of the user's mobile device, a preliminary incident reporting information interface (at 2920). By displaying the preliminary incident reporting information interface, the user may interact with the EIRS mobile app to provide various information. Thus, the incident notifier process 2900 proceeds to a step for receiving, in the preliminary incident reporting information interface, user-provided (or user-entered) data input (at 2930). The user-provided data input received by the incident notifier process 2900 in the preliminary incident reporting information interface includes preliminary incident reporting information data. In some embodiments, the preliminary incident reporting information data comprises a name of the user, an indication of a crash incident that occurred in which the user was involved, and a location of the crash incident or a location of the user, based on the EIRS mobile app triggering a GPS receiver of the user's mobile device to provide a GPS location of the mobile device itself.

After receiving the preliminary incident reporting information data, the incident notifier process 2900 proceeds to a step to prompt the user, within the preliminary incident reporting information interface displayed for the EIRS mobile app, to cancel or proceed with transmission of an incident notification to members of a notification group (at 2940). As described above, the notification group is a group with at least four members. After prompting the user to make a decision on whether to proceed or cancel the incident notification transmission, the incident notifier process 2900 determines (at 2950) whether the user decided to proceed with transmission of the incident notification. For example, the user may select a 'PROCEED' button on a prompt dialog appearing in the preliminary incident reporting information interface or, alternatively, the user may select a 'CANCEL' button on the prompt dialog. When the user does not wish to proceed ('NO'), the incident notifier process 2900 transitions to a step for returning (at 2960) to the preliminary incident reporting information interface, which then flows through the visual output step (at 2920) and continues forward as noted above.

On the other hand, when the user affirmatively indicates a desire to proceed ('YES'), the incident notifier process 2900 continues on to the next step for generating (at 2970) a digital incident notification with the preliminary incident reporting information data (as provided by the user). Then the incident notifier process 2900 of some embodiments retrieves a current location (at 2980). As noted above, the current location is retrieved (at 2980) from the GPS receiver of the mobile device operated by the user. Thus, if the user has stepped away from the crash incident site, the current location will not be the same as the exact location of the crash incident. Despite this uncertainty in knowing the exact location of the crash incident, the current location of the user provides the members of the notification group sufficient information to identify an approximate location of the crash incident and, in some cases more importantly, the exact location of the user (to send a company vehicle, an ambulance, a fire truck, etc., to the site of the user).

After retrieving the current location (at 2980), the incident notifier process 2900 transmits, to the members of the notification group, the digital incident notification with the preliminary incident reporting information data and the current location of the user (at 2990). This step, of course, is a key action to inform the members of the notification group that the user was involved in a vehicle crash incident and also to provide the approximate location. After the digital incident notification is successfully transmitted (e.g., to a server of the ERIS system), the incident notifier process 2900 ends.

In real-world practice, however, after the incident notifier process 2900 ends, the EIRS mobile app of some embodiments automatically proceeds forward to the next section, which in this case is the crash critical user information section 2810 described above by reference to FIG. 28. Specifically, the crash critical user information section 2810 corresponds to a crash critical user information process in the plurality of EIRS processes. An example of the steps and actions performed as part of a crash critical user information process is described next, by reference to FIG. 30.

Specifically, FIG. 30 conceptually illustrates a crash critical user information process 3000. The crash critical user information process 3000 corresponds to the crash critical user information section 2810, described above by reference to FIG. 28. As shown in this figure, the crash critical user information process 3000 starts by visually outputting, on the screen of the mobile device, a crash critical user/incident interface of the EIRS mobile app (at 3010). Unlike the incident notifier process 2900, described above by reference to FIG. 29, the crash critical user information process 3000 does not start with a step for launching or initializing the EIRS mobile app. Typically, the user would have already completed the incident notifier section and, after transmission of the digital incident notification to the members of the notification group, the EIRS mobile app would have automatically proceeded forward to the crash critical user information section. Thus, the step for visually outputting the crash critical user/incident interface of the EIRS mobile app (at 3010) occurs at the onset of the crash critical user information process 3000. As other processes among the plurality of EIRS processes are described below, by reference to FIGS. 31-43, it is noted here that such automatic transitioning from one section to the next section is to be understood as operating in a similar manner as described here, unless otherwise noted.

After visually outputting the crash critical user/incident interface (at 3010), the crash critical user information process 3000 performs a step for presenting a plurality of crash critical information questions relating to the crash incident and the user involved in the crash incident (at 3020). After presenting the questions, the crash critical user information process 3000 receives user input with response data to each of the plurality of crash critical information questions (at 3030). After receiving the user's response data (answers to the questions), the crash critical user information process 3000 aggregates all of the received response data for the plurality of crash critical information questions (at 3040). In some embodiments, the crash critical user information process 3000 aggregates all of the response data into a comprehensive list of crash critical information about the crash incident.

Next, the crash critical user information process 3000 of some embodiments visually outputs, on the screen of the mobile device, the aggregated response data including the comprehensive list of crash critical information (at 3050). By visually outputting the aggregated data as a comprehensive list of crash critical information, the user is able to quickly review the information for accuracy and completeness prior to submission. After the user reviews the information, the crash critical user information process 3000 prompts the user to make a selection with respect to the crash critical information (at 3060), the selection being whether to submit the crash critical information or cancel and return to the crash critical user/incident interface with the plurality of crash critical information questions shown, but without any of the user input shown or saved.

In some embodiments, the crash critical user information process 3000 determines (at 3070) whether the user has selected to submit the crash critical information. When the user has canceled submission ('NO'), the crash critical user information process 3000 transitions back to the first step for visually outputting the crash critical user/incident interface (at 3010). On the other hand, when the user has decided to submit the crash critical information ('YES'), the crash critical user information process 3000 continues forward to the next step for submitting the crash critical information (at 3080). In addition to submitting the crash critical information, the crash critical user information process 3000 stores the submitted crash critical information in a persistent database (such as the EIRS database and persistent storage 2855, described above by reference to FIG. 28). Then the submitted and persistently stored crash critical information can be used in a final incident report after gathering all relevant incident data, information, imagery, etc. After submitting and persistently storing the crash critical information (at 3080), the crash critical user information process 3000 ends.

Now turning to another process in the plurality of EIRS processes, FIG. 31 conceptually illustrates a crash critical other driver information process 3100. The crash critical other driver information process 3100 corresponds to the crash critical other driver information section 2815, described above by reference to FIG. 28.

In some embodiments, the crash critical other driver information process 3100 starts by visually outputting a crash critical user/incident interface of the EIRS mobile app (at 3105). The crash critical user/incident interface is displayed, in this case, on the screen of the mobile device. It is a notable point that the crash critical user/incident interface, and all of the other user interfaces associated with the EIRS mobile app, can be adapted for display on different screens and visually output by other software implementations, such as an EIRS web app implementation that is configured to run within a browser application on a computing device, such as a smartphone, a tablet computing device, a laptop, an in-vehicle computing device/laptop, a personal computer (PC), or other computing devices. However, the preferred implementation is the EIRS mobile app, as this provides the driver with an instant way to connect to the EIRS system and be guided through all of the crash critical information that needs to be obtained.

After visually outputting the crash critical user/incident interface (at 3105), the crash critical other driver information process 3100 proceeds to a first section of the crash critical user/incident interface (at 3110). The first section of the crash critical user/incident interface is focused on gathering information about the license of the driver of another vehicle involved in the crash incident. If there are two or more other vehicles involved in the crash incident, the user would navigate to the first section of the crash critical user/incident interface twice, once for each of the other drivers.

In some embodiments, the crash critical user/incident interface provides a plurality of license information fields, each of which when selected by the user enables the user to input alpha-numeric data. For instance, the other driver's name can be input as first name/last name, the other driver's address can be input as numbers (for street number and zip code) and text (for name of street, name of city, initials of state), and the other driver's license number can be input as alpha-numeric text (since most drivers licenses have a combination of letters and numbers). In addition to providing alpha-numeric input fields, the crash critical user/incident interface of some embodiments provides a license image capture and upload tool. When selected, the license image capture and upload tool allows the user to take a photo of the other driver's license. In some embodiments, the first section of the crash critical user/incident interface expects the user to select the license image capture and upload tool twice to capture and upload two images of the other driver's license, namely a front image of the front of the other driver's license and a backside image of the back of the other driver's license.

Since there are two ways (photo capture/upload or manual text input) of providing information about the other driver's license, the crash critical other driver information process 3100 waits for user interactions to determine (at 3115) whether the user has captured and uploaded image(s) of the other driver's license or has instead entered text-based data with the other driver's license information. When a license image has been uploaded ('YES'), the crash critical other driver information process 3100 proceeds to a step for extracting alpha-numeric character-based (written) license data from the license image (at 3120). Specifically, when two images of the other driver's license are captured and uploaded, the crash critical other driver information process 3100 extracts the written license data from the front image of the other driver's license. The crash critical other driver information process 3100 of some embodiments distinguishes between the front image and the backside image of the other driver's license by detecting an image of a human face in the front image. However, human face images or partial human facial image elements are not needed by the EIRS mobile app and never stored in the persistent storage of the EIRS system. Consequently, the crash critical other driver information process 3100 obscures and/or removes the detected human face image (normally on the front image, but possibly also on the backside image of the other driver's license) before extracting the written data from license image(s) of the other driver's license. This is described in greater detail below, by reference to FIG. 32.

Turning back to the determination (at 3115), when the user has opted to manually input the text-based (written) license information from the other driver's license, then the crash critical other driver information process 3100 proceeds to a step for receiving, as the user inputs the data, the other driver's license information as alpha-numeric character-based (written) license data (at 3125).

After extracting (at 3120) or receiving (at 3125) the alpha-numeric character-based (written) license data of the other driver's license, the crash critical other driver information process 3100 of some embodiments proceeds to a second section of the crash critical other driver information interface to acquire the other driver's vehicle registration information (at 3130).

In some embodiments, the crash critical user/incident interface provides a plurality of other driver vehicle registration information fields, each of which when selected by the user enables the user to input alpha-numeric data pertaining to the other driver's registration. In addition to providing alpha-numeric input fields, the crash critical user/incident interface of some embodiments provides a registration image capture and upload tool. When selected, the registration image capture and upload tool allows the user to take a photo of the other driver's vehicle registration.

Since there are two ways (photo capture/upload or manual text input) of providing information about the other driver's vehicle registration, the crash critical other driver information process 3100 waits for user interactions to determine (at 3135) whether the user has captured and uploaded image(s) of the other driver's vehicle registration or has instead entered text-based data with the other driver's vehicle registration information. When an image of the other driver's registration has been uploaded ('YES'), the crash critical other driver information process 3100 proceeds to a step for extracting alpha-numeric character-based (written) registration data from the image of the other driver's registration (at 3140).

Turning back to the determination (at 3135), when the user has opted to manually input the text-based (written) vehicle registration information, the crash critical other driver information process 3100 proceeds to a step for receiving, as the user inputs the data, the other driver's vehicle registration information as alpha-numeric character-based (written) registration data (at 3145).

After extracting (at 3140) or receiving (at 3145) the alpha-numeric character-based (written) registration data of the other driver's vehicle registration, the crash critical other driver information process 3100 of some embodiments proceeds to a third section of the crash critical other driver information interface to acquire the other driver's insurance information (at 3150).

Similar to those for the other driver's license and vehicle registration, the crash critical user/incident interface provides a plurality of other driver insurance information fields, each of which when selected by the user enables the user to input alpha-numeric data pertaining to the other driver's insurance. In addition to providing alpha-numeric input fields, the crash critical user/incident interface of some embodiments provides a vehicle insurance image capture and upload tool. When selected, the vehicle insurance image capture and upload tool allows the user to take a photo of the other driver's vehicle insurance.

Thus, the crash critical other driver information process 3100 determines (at 3155) whether the user has captured and uploaded a vehicle insurance image or has instead entered text-based data with the other driver's vehicle insurance data. When an insurance image has been uploaded ('YES'), the crash critical other driver information process 3100 proceeds to a step for extracting alpha-numeric character-based (written) registration data from the insurance image (at 3160). However, when the user has opted to manually input the text-based (written) vehicle insurance information, the crash critical other driver information process 3100 proceeds to a step for receiving, as the user inputs the data, the other driver's vehicle insurance information as alpha-numeric character-based (written) insurance data (at 3165).

After extracting (at 3160) or receiving (at 3165) the alpha-numeric character-based (written) insurance, the crash critical other driver information process 3100 of some embodiments transitions to a final step for aggregating the images, OCR-converted written data, and user-entered data from all sections as other driver data and adding the other driver data to the crash critical information (at 3170) pertaining to the crash incident. Then the crash critical other driver information process 3100 ends.

As described above, by reference to FIG. 31, the step for extracting alpha-numeric character-based (written) license data from the user-uploaded license image (at 3120) involves several detailed steps of a driver's license information extraction process, which is described next, by reference to FIG. 32.

Specifically, FIG. 32 conceptually illustrates a driver's license information extraction process 3200. As shown in this figure, the driver's license information extraction process 3200 starts by receiving the uploaded license image of the other driver's license (at 3210). The uploaded license image may include a single front image of the other driver's license or two images-one front image of the other driver's license and another backside image of the other driver's license.

Next, the driver's license information extraction process 3200 proceeds to a step for analyzing (at 3220) groups of picture elements (pixels) in the uploaded license image to detect a human face portion of the license image. In some embodiments, the driver's license information extraction process 3200 the groups of pixels by a computer vision algorithm that is configured to distinguish human face-based pixels from character-based pixels and other pixels. In some embodiments, the computer vision algorithm is implemented as a software program that is integrated into the EIRS mobile app.

After analyzing groups of pixels in the uploaded license image, the driver's license information extraction process 3200 removes the human face portion from the license image (at 3230). In some embodiments, the driver's license information extraction process 3200 removes the human face portion by purging the detected human face portion from the license image. In some embodiments, the driver's license information extraction process 3200 removes the human face portion by obscuring the detected human face portion of the license image.

Next, the driver's license information extraction process 3200 analyzes groups of pixels in the license image to detect portions of the license image with text information about the other driver's license (at 3240). In some embodiments, the driver's license information extraction process 3200 then applies optical character recognition (OCR) to the text information portions of the license image (at 3250). After applying OCR to the text information portions, the driver's license information extraction process 3200 proceeds to a final step for receiving OCR image-to-text license data output (at 3260). Then the driver's license information extraction process 3200 ends.

Now referring to another process among the plurality of EIRS processes, FIG. 33 conceptually illustrates a questionnaire for other driver process 3300. The questionnaire for other driver process 3300 corresponds to the questionnaire for other driver section 2820, described above by reference to FIG. 28. In some embodiments, the questionnaire for other driver process 3300 starts by visually outputting, on the screen of the mobile device, another driver questionnaire interface of the EIRS mobile app (at 3310). Within the other driver questionnaire interface, the questionnaire for other driver process 3300 presents (at 3320) questions relating to the other driver, the other driver's company (if any), and the other driver's vehicle involved in the incident. The user interacts with the other driver questionnaire interface to enter or select answers responsive to the presented questions.

In some embodiments, the questionnaire for other driver process 3300 receives (at 3330) the user-entered (or user-selected) data responses to the questions about the other driver, company, and/or vehicle. Next, the questionnaire for other driver process 3300 determines (at 3340) whether any data response received from the user requires more information. When all data responses to the questions provide sufficient information to be fully responsive to the questions ('NO'), the questionnaire for other driver process 3300 transitions to a step for aggregating the user response data for all questions as other driver questionnaire data and adding the other driver questionnaire data to the crash critical information about the incident (at 3360).

On the other hand, when a user-provided response to at least one of the presented questions is insufficient and requires more information ('YES'), then the questionnaire for other driver process 3300 moves forward to prompt the user, within the other driver questionnaire interface, to input responsive data to follow-up questions (at 3350). Specifically, the user is prompted to provide further responsive data to one or more follow-up questions pertaining to each particular question in which the initial responsive data for the particular question from the user is insufficient. For example, the other driver questionnaire interface may present three questions requesting the name of the other driver, whether the other driver sustained an injury as a result of the crash incident, and whether the other driver was driving a company vehicle for another company. In this example, the user may provide a name of the other driver, and select a 'YES' response to each of the other two questions. Given that the last two questions were responded with 'YES', the questionnaire for other driver process 3300 may seek further information to flesh out or clarify the 'YES' response. For instance, the questionnaire for other driver process 3300 may present several follow-up questions about the injury sustained by the other driver (e.g., questions regarding body part(s) injured, severity, whether emergency services were contacted and arrived at the scene, etc.) and several other follow-up questions about the vehicle and company of the other driver (e.g., questions regarding the name of the company, the type of company vehicle, whether the other driver was on company time at the time of the crash incident, etc.).

After receiving user input responsive to the follow-up questions, the questionnaire for other driver process 3300 proceeds to the step for aggregating the user response data for all questions as other driver questionnaire data and adding the other driver questionnaire data to the crash critical information about the incident (at 3360). Then the questionnaire for other driver process 3300 ends.

By way of another example, FIG. 34 conceptually illustrates a crash incident photos acquisition process 3400. The crash incident photos acquisition process 3400 corresponds to the crash incident photos section 2825, described above by reference to FIG. 28. In some embodiments, the crash incident photos acquisition process 3400 starts by visually outputting, on the screen of the mobile device, a crash photos interface of the EIRS mobile app (at 3410). The crash photos interface is visually output with a plurality of different sections for a user to provide various photos (as digital images) related to the crash incident. In some embodiments, the crash incident photos acquisition process 3400 proceeds to a first section for the user to capture and upload one or more digital images of the accident (at 3420). As described above, the user interacts with the interface by selection of an image capture and upload tool. Since the EIRS mobile app runs on the user's mobile device, the image capture and upload tool, when selected within the interface, is configured to activate the onboard camera of the mobile device to capture an image (of the accident or other digital imagery as described further below). For each digital image that the user captures and uploads (by way of selecting the image capture and upload tool for each image), the crash incident photos acquisition process 3400 receives the corresponding uploaded image of the accident (at 3430).

After the uploaded accident image(s) are received, the crash incident photos acquisition process 3400 proceeds to a second section of the crash photos interface (at 3440). The second section of the crash photos interface pertains to images of the damage to the vehicles involved in the crash incident. Thus, the user again selects an image capture and upload tool from within the second section of the crash photos interface to snap a digital photo (image) of damage of the vehicles involved in the crash incident. Upon capturing the digital image damage of the vehicles, the captured digital image is automatically uploaded application memory of the mobile device (where the application memory is the mobile device runtime memory devoted to the EIRS mobile app). Later, the EIRS mobile app may upload the digital image(s) to the EIRS system, but for sake of the crash incident photos acquisition process 3400, after the captured digital image is uploaded, then the user may continue to capture and upload more digital images of the damage to each vehicle. For example, the user may capture and upload several images of damage to the user's vehicle and several other digital images to the vehicle of the other driver, and all of the images may be captured from different angles, with different fields of view, different zoom perspectives, etc. In connection with the capture and upload actions of the user, the crash incident photos acquisition process 3400 receives (at 3450) the user-captured and automatically uploaded digital images of the damage to the vehicles involved in the crash incident.

After the uploaded damage image(s) are received (at 3450), the crash incident photos acquisition process 3400 proceeds to a third section of the crash photos interface (at 3460) for the user to provide written (text) or vocal (audio) damage descriptions of the vehicle damage. In this third section, the user interacts with a description field that accepts text-based data input or selects an audio option that triggers a microphone of the mobile device to capture an audio stream of the user vocalizing the description of the damage to the vehicles. After the user provides the damage description, the crash incident photos acquisition process 3400 proceeds to the next step for receiving (at 3470) the user-provided damage descriptions. In some embodiments, the crash incident photos acquisition process 3400 receives (at 3470) the damage descriptions in realtime upon entry of text data for the text-based damage description or in near realtime after conversion of the audio stream data in which the user is vocally describing the damage to the vehicles.

After the vehicle damage descriptions are received (at 3470), the crash incident photos acquisition process 3400 proceeds to a fourth section of the crash photos interface (at 3480) for the user to capture and upload other images relevant to the crash incident, the vehicles involved in the crash incident or nearby the crash incident, or other damage arising out of the crash incident, etc. Using the capture and upload tool, the user then provides one or more images if the user has some other relevant images to capture and provide. In other words, such other images may not be needed and the user can skip ahead to aggregate all the images and data (at 3495), described below. On the other hand, when the user does capture and upload other images relevant to the crash incident (at 3480), then the crash incident photos acquisition process 3400 proceeds to a step for receiving (at 3490) the uploaded images relevant to the crash incident, vehicles involved in the crash incident, other damage, etc.

Finally, the crash incident photos acquisition process 3400 moves ahead to the step for aggregating (at 3495) the user-provided images and text description data (whether text-based user entered text data or audio-based user vocalized data that is converted by voice-to-text processing to text data) received in all sections. Specifically, the crash incident photos acquisition process 3400 aggregates the user-provided images and text description data as crash incident photo and text data and then adds the crash incident photo and text data to the crash critical information about the crash incident. Then the crash incident photos acquisition process 3400 ends.

Turning to another process, FIG. 35 conceptually illustrates a crash incident other information acquisition process 3500. The crash incident other information acquisition process 3500 corresponds to the crash incident other information/photos section 2830, described above by reference to FIG. 28. In some embodiments, the crash incident other information acquisition process 3500 starts by visually outputting, on the screen of the mobile device, a crash incident other information interface of the EIRS mobile app (at 3510). The crash incident other information interface is visually output with a plurality of different sections for a user to provide text and image data pertaining to other information about the crash incident. In some embodiments, the crash incident other information acquisition process 3500 proceeds to a first section for the user to provide pedestrian information about any relevant pedestrians in and around the crash incident (at 3520). In some embodiments, the user provides written (text-based) input of pedestrian information for each pedestrian in and around the crash incident. However, there may not even be any pedestrians, which allows the user to skip the first section. Nevertheless, when there is at least one pedestrian, the crash incident other information acquisition process 3500 then receives the user-provided pedestrian information (at 3530) for each pedestrian relevant to the crash incident.

Then the crash incident other information acquisition process 3500 proceeds to a second section (at 3540) for the user to provide external property damage descriptions and/or photos. When the user provides text-based property damage descriptions, the user simply interacts with a description field displayed in the second section or selects an audio option to trigger the microphone of the mobile device to capture an audio stream in which the user vocally expresses property damage descriptions. The audio data is thereafter converted, by voice-to-text processing, to text-based property damage descriptions. Thus, the crash incident other information acquisition process 3500 of some embodiments receives (at 3550) the property damage text data for each individual property damage description entered as text-based data or converted from audio to text.

After receiving the property damage text data (at 3550), the crash incident other information acquisition process 3500 receives external property damage imagery (at 3560). Specifically, the crash incident other information acquisition process 3500 receives (at 3560) a digital image of external property damage (damage to property other than the vehicles involved in the crash incident) for each separate case of external property damage arising out of the crash incident.

After receiving the external property damage descriptions and photos in the second section, the crash incident other information acquisition process 3500 proceeds to a third section (at 3570) for the user to provide witness information about any witnesses of the crash incident. The user provides text information for witnesses one-by-one. However, there may not even be any witnesses, which allows the user to skip the third section. Nevertheless, when there is at least one witness of the crash incident, the crash incident other information acquisition process 3500 would then receive (at 3580) the user-provided witness information for each witness who observed the crash incident and for whom the user has provided corresponding witness information. For example, there may be three witnesses to a crash incident-one witness may be left the scene of the crash incident immediately, another witness may helpful provide their information to the user, while the third witness may be reluctant to get involved and, therefore, the user cannot obtain willing information from the third witness.

After completing the three sections, the crash incident other information acquisition process 3500 proceeds to a final step for aggregating the received images and pedestrian/witness text data (at 3590). In particular, the images and pedestrian/witness text data are aggregated as crash incident other information data. Then the crash incident other information acquisition process 3500 adds (at 3590) the crash incident other information to the ongoing crash critical information as previously aggregated and compiled. Then the crash incident other information acquisition process 3500 ends.

Referring to another example, FIG. 36 conceptually illustrates a crash description and other information acquisition process 3600. The crash description and other information acquisition process 3600 corresponds to the crash description section 2835, described above by reference to FIG. 28. In some embodiments, the crash description and other information acquisition process 3600 starts by visually outputting, on the mobile device screen, a crash description interface with multiple sections for the user to provide a crash description (at 3605). The crash description and other information acquisition process 3600 proceeds to a first section for the user to provide a description of what happened in connection with the crash incident (at 3610). The user may provide the description in text form or audio form, which is automatically converted, by voice-to-text processing, to a textual description of what happened in the crash incident. The voice-to-text processing is described next.

To carry out voice-to-text processing, the crash description and other information acquisition process 3600 determines (at 3615) whether the user-provided description is an audio data input, such as an audio stream captured by a microphone of the mobile device. When the user-provided description is not audio data ('NO'), the crash description and other information acquisition process 3600 proceeds to a step for capturing text input as the user types the description in a text description field of the crash description interface (at 3620). Then the crash description and other information acquisition process 3600 proceeds to a step for displaying the textual description in the text description field (at 3635), which is displayed in realtime as the user types in the description.

On the other hand, when the user-provided description is affirmatively determined (at 3615) to be audio data input, then the crash description and other information acquisition process 3600 performs steps for capturing the audio stream data as the user provides a vocal description (at 3625) and automatically converting the audio data to text data (at 3630) by audio analysis and converting identifiable utterances to text-based words which, when compiled together, form the text data for the textual description. After the conversion from audio to text data, the crash description and other information acquisition process 3600 moves forward to the step for displaying the textual description in the text description field (at 3635), which in this case is displayed in near realtime upon completing the audio-to-text conversion. In this scenario, near realtime indicates at a slightly delayed time after the user vocalizes the description audio. While not realtime in the same sense as displaying the text as user types the text description, the display of the text data after conversion from audio to text occurs contemporaneously with the user vocalizing the words of the description (or "in near realtime").

In some embodiments, the crash description and other information acquisition process 3600 moves on to another step for determining (at 3640) whether the user interacts with displayed textual description in the text description field to edit the textual description. When there is no interaction detected, the crash description and other information acquisition process 3600 proceeds to save the crash description text data (at 3650), including either the user input text data or the audio-to-text converted text data. However, when the user is determined (at 3640) to be interacting with the displayed textual description in the text description field to edit the textual description ('YES'), the crash description and other information acquisition process 3600 carries out a step for capturing (at 3645) user input to edit the displayed textual description in the text description field. Then the crash description and other information acquisition process 3600 moves forward to the step for saving the crash description text data (at 3650), which in this case includes the edited text data (whether originating from the user input text data or the audio-to-text converted text data).

After saving the crash description text data (at 3650), the crash description and other information acquisition process 3600 proceeds to a second section for the user to provide address and conditions information (at 3655). In the second section, the crash description and other information acquisition process 3600 receives (at 3660) user input of a street address proximate to the location of the crash incident or, when there is no available street address proximate to the location of the crash incident, a description of the location of the crash incident. Next, the crash description and other information acquisition process 3600 receives (at 3665) weather conditions data based on the user selecting a weather condition icon image that exemplifies the type of weather conditions at the site of the crash incident and at the time of the crash incident.

After collecting the address and weather conditions information, the crash description and other information acquisition process 3600 of some embodiments proceeds to a third section (at 3670) for the user to provide information about other crash incident details and/or make selections of various options relating to the crash incident. In some embodiments, the crash description and other information acquisition process 3600 receives (at 3675) data input, image uploads, and user selections of different options by interaction with additional fields in the third section of the crash description interface.

In some embodiments, the crash description and other information acquisition process 3600 moves on to the final step for aggregating the saved crash description text data (whether original text input, text converted from audio input, or edited text description data), the address/location description and weather conditions information, and data (if any) from the additional fields (at 3680). The crash description and other information acquisition process 3600 aggregates all such data from these sections as aggregated crash description data and adds the aggregated crash description data to the ongoing crash critical information (at 3680) about the crash incident. Then the crash description and other information acquisition process 3600 ends.

By way of example, FIG. 37 conceptually illustrates a high-level crash diagram creation process 3700. The high-level crash diagram creation process 3700 corresponds to the crash diagram section 2840, described above by reference to FIG. 28. As shown in this figure, the high-level crash diagram creation process 3700 starts by visually outputting, on the screen of the mobile device, a crash diagram interface with multiple sections to create a crash diagram of the crash incident. In some embodiments, the high-level crash diagram creation process 3700 proceeds to a first section to obtain a current location, set a crash site location, and capture a crash site location image (at 3720). A detailed example of a process for obtaining the current location, setting the crash site location, and capturing the crash site location image is described below, by reference to FIG. 38.

Next, the high-level crash diagram creation process 3700 proceeds to a second section to create a crash diagram and add objects to the crash diagram to depict other physical objects and items in and around the crash site location at the time of the crash incident (at 3730). A detailed example of a process for creating the crash diagram and adding objects to the crash diagram is described below, by reference to FIG. 39.

After creating the crash diagram (and optionally adding objects to the crash diagram), the high-level crash diagram creation process 3700 proceeds to a third section for the user to confirm or update driver and vehicle information and set a final crash diagram for submission (at 3740). Then the high-level crash diagram creation process 3700 aggregates the confirmed/updated driver and vehicle information and the final crash diagram as crash diagram imagery and data (at 3750). The high-level crash diagram creation process 3700 also adds the crash diagram imagery and data to the ongoing compiled crash critical information for the crash incident (at 3750). Then the high-level crash diagram creation process 3700 ends.

Turning now to a first detailed process involving a first part of the high-level crash diagram creation process 3700, FIG. 38 conceptually illustrates a first detailed crash diagram creation process 3800. In some embodiments, the first detailed crash diagram creation process 3800 includes several detailed steps and actions that occur when the high-level crash diagram creation process 3700 performs the step for proceeding to the first section to get the current location, set a crash site location, and capture a crash site location image (at 3720), as described above by reference to FIG. 37. This is how it is done in some embodiments. Specifically, the first detailed crash diagram creation process 3800 starts by retrieving location data from a GPS receiver of the user's mobile device (at 3805). The location data from the GPS receiver includes GPS coordinates of the mobile device as a calculated geospatial location. The calculation of the geospatial location (as denoted by the GPS coordinates) is based on triangulation of location data received from at least multiple GPS satellites with different orbital locations.

Next, the first detailed crash diagram creation process 3800 identifies, in an interactive GPS map displayed in the crash diagram interface, a current location of the mobile device (at 3810). The identification of the current location in the GPS map is based on the GPS coordinates calculated via the satellite-based location data. After identifying the current location, the first detailed crash diagram creation process 3800 visually outputs an aerial image view of the interactive GPS map with the current location of the mobile device centered within the interactive GPS map (at 3815). This is followed by the first detailed crash diagram creation process 3800 performing a step for visually outputting interactive map tools in a map tool section overlaying a bottom of the aerial view of the interactive GPS map (at 3820). In some embodiments, the interactive map tools include at least a capture tool and map zoom tools.

In some embodiments, the first detailed crash diagram creation process 3800 proceeds to set a crash site location on the interactive GPS map to the current location (at 3825). The current location, as noted above, is the current location of the mobile device. Therefore, the current location may not represent the actual crash site. Nevertheless, the first detailed crash diagram creation process 3800 moves forward at this point with the crash site location being set to the current location.

Next, the first detailed crash diagram creation process 3800 determines (at 3830) whether the user has selected the capture tool from the interactive map tools in the map tool section overlaying the bottom of the aerial view of the interactive GPS map. When the capture tool is affirmatively determined (at 3830) to be selected ('YES'), the first detailed crash diagram creation process 3800 proceeds to a final step for capturing a crash location image of the aerial image view of the interactive GPS map with the crash site location noted or marked in some way visible (at 3855). Then the first detailed crash diagram creation process 3800 ends.

On the other hand, when the capture tool is not selected ('NO'), the first detailed crash diagram creation process 3800 proceeds to another determination (at 3835) of whether the user is current interacting with the interactive GPS map. When the user is not interacting with the GPS map ('NO'), the first detailed crash diagram creation process 3800 transitions back to the first determination (at 3830) of whether the capture tool has been selected or not. However, when the user is determined (at 3835) to be interacting with the interactive GPS map ('YES'), then the first detailed crash diagram creation process 3800 moves forward to a step for detecting a selection of a second location on the interactive GPS map (at 3840). Specifically, the first detailed crash diagram creation process 3800 detects selection of the second location when the second location is different from the current location. In other words, a user selection of the same current location as the 'second location' is not recognized by the first detailed crash diagram creation process 3800 as a valid detectable interaction, since there is no change in the location (it's the same 'current location' as identified by the GPS receiver of the mobile device).

Thus, when the user interacts with the GPS map by a selection of a second, different location, then the first detailed crash diagram creation process 3800 reorients the aerial image view of the interactive GPS map with the second location centered within the interactive GPS map (at 3845). Next, the first detailed crash diagram creation process 3800 sets the crash site location to the second location (at 3850). Although the first detailed crash diagram creation process 3800 proceeds to the final step for capturing the crash site location image of the aerial image view of the interactive GPS map with the crash site location noted (at 3855), it is evident that instead of proceeding to this final step (at 3855) after selection of the second location (at 3840), reorientation of the map based on centering the second location (at 3845), and setting the crash site location to the second location (at 3850), the user may optionally continue to interact with the GPS map and select subsequent locations (e.g., third location different from the second location, fourth location different from the third location, and so on). Ultimately, the event that triggers the first detailed crash diagram creation process 3800 to proceed to the final step (at 3855) is an interaction by the user to select the capture tool. According, when the first detailed crash diagram creation process 3800 determines (at 3830) that the user has affirmatively selected the capture tool, the most recently selected location (whether the initial location, or the second, third, fourth, etc., location selection) is set as the current location. Then the first detailed crash diagram creation process 3800 captures (at 3855) the crash site location image of the aerial image view (which would have been reoriented according to the interactive GPS map location selection last made by the user) of the interactive GPS map with the crash site location (based on the current location) visibly identified in the crash site location image. Then the first detailed crash diagram creation process 3800 ends.

Next, a second detailed process involving a second part of the high-level crash diagram creation process 3700 is described by reference to FIG. 39. Specifically, FIG. 39 conceptually illustrates a second detailed crash diagram creation process 3900. In some embodiments, the second detailed crash diagram creation process 3900 includes several detailed steps and actions that occur when the high-level crash diagram creation process 3700 performs the step for proceeding to the second section to create a crash diagram and add objects to the crash diagram to depict other physical objects (at 3730), such as other vehicles, pedestrians, witnesses, obstructions, etc., described above by reference to FIG. 37.

Initially, the second detailed crash diagram creation process 3900 starts by generating a crash diagram based on the crash site location image (with crash site visibly identified thereupon) and visually outputs the crash diagram in a crash diagram screen view (at 3905). Next, the second detailed crash diagram creation process 3900 visually outputs crash diagram tools that enable interaction with the crash diagram (at 3910). The crash diagram tools of some embodiments comprise a submit tool and an add objects tool.

After visual output is completed, the second detailed crash diagram creation process 3900 determines (at 3915) whether the add objects tool is selected. When the add objects tool is not selected ('NO'), the second detailed crash diagram creation process 3900 transitions to a step for determining (at 3930) whether any newly added object is selected. This is described in more detail below. Turning back to the determination (at 3915), when the add objects tool is affirmatively selected ('YES'), the second detailed crash diagram creation process 3900 of some embodiments proceeds to a next step for adding a crash diagram object overlay element to the crash diagram based on a selection of an object associated with the crash incident (at 3920). This step (at 3920) involves a full process in which the user may select one or more object icon image(s) to add as a visible element to the crash diagram. Specifically, a detailed add object process is described further below, by reference to FIG. 40.

After the crash diagram object overlay element is added to the crash diagram (at 3920), the second detailed crash diagram creation process 3900 proceeds to a follow-up step for setting the crash diagram object overlay element as a newly added crash diagram object at a particular position, in a specific display orientation, and with a particular size in the crash diagram (at 3925). Details of the position, orientation, and size of the newly added crash diagram object are set in the detailed add object process, which is described below by reference to FIG. 40. After setting the newly added crash diagram object in the crash diagram (at 3925), the second detailed crash diagram creation process 3900 determines whether any newly added object is presently selected (at 3930). For example, the user may have cycled through the adding of multiple objects to the crash diagram, but now wishes to modify, remove, or otherwise interact with the first object added—this is done by mere user selection of the desired object in the crash diagram. When no newly added object is selected ('NO'), the second detailed crash diagram creation process 3900 transitions to another determination (at 3940) of whether the submit tool is selected or not. However, when a particular newly added object is selected in the crash diagram ('YES'), the second detailed crash diagram creation process 3900 moves forward to a step for processing user interactions with respect to the particular newly added object selected in the crash diagram (at 3935). Examples of the types of interactions include, without limitation, interactions to remove, reposition, reorient, or resize the display of the particular newly added object in the crash diagram.

Next, the second detailed crash diagram creation process 3900 proceeds to the step for determining whether the submit tool is selected (at 3940). When the submit tool is not presently selected ('NO'), the second detailed crash diagram creation process 3900 transitions back to the step for determining (at 3915) whether the add objects tool is selected, and proceeds forward through the steps of the second detailed crash diagram creation process 3900 in the manner described above. On the other hand, when the submit tool is affirmatively selected ('YES'), the second detailed crash diagram creation process 3900 of some embodiments generates a composite image of the crash diagram with each newly added crash diagram object placed in the crash diagram (with their respective position, orientation, and size) as ready for submission (at 3945). Then the second detailed crash diagram creation process 3900 updates the crash diagram with the composite image and sets it as ready for submission to add to the crash critical information (at 3950), which occurs in the high-level crash diagram process 3700 at the step for aggregating (at 3750), as described above by reference to FIG. 37.

Providing even further detailed steps and operations, FIG. 40 conceptually illustrates a detailed add object process 4000 of the second detailed crash diagram creation process 3900, described above by reference to FIG. 39. Specifically, the detailed add object process 4000 is performed when the second detailed crash diagram creation process 3900 carries out the step for adding a crash diagram object overlay element to the crash diagram based on the selection of the object associated with the crash incident (at 3920), as is described above, by reference to FIG. 39.

As shown in this figure, the detailed add object process 4000 starts by visually outputting (at 4005) a crash diagram object icon selection screen view with a plurality of different crash diagram object icon images that represent different types of crash site objects. The crash diagram object icon selection screen view is automatically output when the user selects the add objects tool (as described above, by reference to FIG. 39). Next, the detailed add object process 4000 receives a selection of a crash diagram object icon image from the plurality of different crash diagram object icon images (at 4010) shown in the crash diagram object icon selection screen view. Upon receiving the selection (at 4010), the detailed add object process 4000 hides the crash diagram object icon selection screen view and reverts back to displaying the crash diagram screen view (at 4015). The crash diagram screen view is the view from which the user initially selected the add objects tool that triggered performance of the detailed add object process 4000 now being described.

After reverting back to the display of the crash diagram screen view (at 4015), the detailed add object process 4000 adds the selected crash diagram object icon image to the crash diagram as an interactive and modifiable crash diagram object overlay element and places it in the crash diagram at an initial position, with an initial orientation, and an initial size (at 4020).

Next, the detailed add object process 4000 of some embodiments determines (at 4025) whether the object is selected in the crash diagram. When the object is not selected in the crash diagram ('NO'), the detailed add object process 4000 proceeds to set a current object position to position in the crash diagram (at 4065), set a current orientation to an orientation in the crash diagram (at 4070), and set a current object size to the object size in the crash diagram (at 4075). Then the detailed add object process 4000 ends.

On the other hand, when the object is selected in the crash diagram ('YES'), the detailed add object process 4000 then determines (at 4030) whether there is a user interaction to reposition the object placed in the crash diagram. When there is no user interaction to reposition the object, the detailed add object process 4000 proceeds to another determination (at 4040) of whether there is a user interaction to reorient the object in the crash diagram or not, which is described further below.

Turning back to the determination (at 4030), when there is a user interaction to reposition the object in the crash diagram ('YES'), the detailed add object process 4000 of some embodiments performs a step for repositioning the object to a new position of the crash diagram (at 4035). Then the detailed add object process 4000 determines (at 4060) whether the user has released the selection of the object in the crash diagram. When the user has not released the selection of the object ('NO'), the detailed add object process 4000 transitions back to the determination step (at 4030) of whether there is a user interaction to reposition the object in the crash diagram, and proceeding in the manner described above. However, when the user has affirmatively released the selection of the object ('YES'), the detailed add object process 4000 transitions ahead to the steps for setting a current object position to its new position in the crash diagram (at 4065), set a current orientation to the orientation in the crash diagram (at 4070), and set a current object size to the object size in the crash diagram (at 4075). Then the detailed add object process 4000 ends.

Now turning back to the determination (at 4040), when there is no user interaction to reorient the object ('NO'), the detailed add object process 4000 proceeds to another determination (at 4050) of whether there is a user interaction to resize the object in the crash diagram or not, which is described further below. On the other hand, when there is a user interaction to reorient the object in the crash diagram ('YES'), the detailed add object process 4000 performs a step for reorienting the display of the object at its current position in the crash diagram (at 4045). Then the detailed add object process 4000 determines (at 4060) whether the user has released the selection of the object in the crash diagram. When the user has not released the selection of the object ('NO'), the detailed add object process 4000 transitions back to the determination step (at 4030) of whether there is a user interaction to reposition the object in the crash diagram. However, when the user has affirmatively released the selection of the object ('YES'), the detailed add object process 4000 transitions ahead to the steps for setting a current object position to its position in the crash diagram (at 4065), setting a current orientation to the its reoriented display at the position in the crash diagram (at 4070), and setting a current object size to the object size in the crash diagram (at 4075). Then the detailed add object process 4000 ends.

Once again making reference back to a determination (at 4050), when there is no user interaction to resize the object ('NO'), the detailed add object process 4000 proceeds to a final determination (at 4060) of whether the user releases selection of the object (as has been described above and is described further below). On the other hand, when there is an affirmative user interaction to resize the object in the crash diagram ('YES'), the detailed add object process 4000 performs a step for resizing the display of the object to a new size at its current position in the crash diagram (at 4055). Then the detailed add object process 4000 determines (at 4060) whether the user has released the selection of the object in the crash diagram. When the user has not released the selection of the object ('NO'), the detailed add object process 4000 transitions back to the determination step (at 4030) of whether there is a user interaction to reposition the object in the crash diagram. However, when the user has affirmatively released the selection of the object ('YES'), the detailed add object process 4000 transitions ahead to the steps for setting a current object position to its position in the crash diagram (at 4065), setting a current orientation to the its orientation in the crash diagram (at 4070), and setting a current object size to the new size in the crash diagram (at 4075). Then the detailed add object process 4000 ends.

By way of another example process corresponding to a section of the EIRS mobile app, FIG. 41 conceptually illustrates a high-level injury/illness reporting process 4100. The high-level injury/illness reporting process 4100 corresponds to the injury/illness and related information section 2845, described above by reference to FIG. 28. In some embodiments, the high-level injury/illness reporting process 4100 starts by visually outputting, on the mobile device screen, an injury/illness reporting interface with multiple sections for the user to confirm and/or update injury/illness information (at 4110) arising out of the crash incident.

In some embodiments, the high-level injury/illness reporting process 4100 proceeds to a first section for the user to confirm and/or update injury and/or illness information arising as a result of the crash incident (at 4120). In the first section, one or more body injury fields are displayed and are configured for user interaction. Thus, the high-level injury/illness reporting process 4100 determines (at 4130) whether the user is interacting with the a body injury field or not. When the user is not interacting with the body injury field ('NO'), the high-level injury/illness reporting process 4100 proceeds directly to a second section for the user to provide additional relevant injury/illness details (at 4180), which is described in greater detail below. However, when the user is affirmatively determined (at 4130) to be interacting with the body injury field ('YES'), the high-level injury/illness reporting process 4100 proceeds through a sequence of steps starting with visually outputting a body part icon screen (at 4140).

In particular, the high-level injury/illness reporting process 4100 visually outputs (at 4140) the body part icon screen upon detection of the user interaction with the body part injury field. Furthermore, the body part icon screen includes a plurality of different body part icon images that are visually output with the body part icon screen. All of the images in the plurality of different body part icon images are selectable. This enables the user to select a particular body part icon image as injury input for the body injury field.

Accordingly, when the user selects one of the body part icon images in the plurality of different body part icon images shown in the body part icon screen, the high-level injury/illness reporting process 4100 receives the selection of the body part icon image (at 4150). After receiving the user selection of the body part icon image (at 4150), the high-level injury/illness reporting process 4100 retrieves, from a persistent database (such as the EIRS database and persistent storage) or from a look-up table (LUT) of body part image descriptions in application memory space, a body part textual description corresponding to the selected body part icon image (at 4160). Then the high-level injury/illness reporting process 4100 adds the retrieved body part textual description to the user's injury and illness information (at 4170), as arising out of the crash incident. This finalizes the steps in the first section.

In some embodiments, the high-level injury/illness reporting process 4100 proceeds to the second section (at 4180) for the user to provide additional relevant injury/illness details in connection with the incident. Specific details of providing additional relevant injury/illness details are fleshed out in a detailed additional relevant injury/illness information acquiring process, described below by reference to FIG. 42. However, to provide some contextual examples, for instance, the user may provide input regarding starting work time on the day of the incident, weather conditions at the time of the incident, other person(s) involved beyond the drivers, pedestrians, and witnesses, whether the user stretched prior to work or not, and written or voice description(s) of the incident as pertaining to the injury/illness suffered by the user, etc.

In some embodiments, the high-level injury/illness reporting process 4100 proceeds to the final step for aggregating the confirmed/updated injury/illness information and the additional relevant injury/illness details as the crash incident injury/illness information and adds the crash incident injury/illness information to the ongoing crash critical information about the crash incident (at 4190). Then the high-level injury/illness reporting process 4100 ends.

Turning to another fine-grained, detailed example, FIG. 42 conceptually illustrates a detailed process for acquiring additional relevant injury/illness information 4200. The detailed process for acquiring additional relevant injury/illness information 4200 is performed when the high-level injury/illness reporting process 4100, described above by reference to FIG. 41, performs the step for proceeding to the second section for the user to provide additional relevant injury/illness details in connection with the crash incident (at 4180).

In some embodiments, the detailed process for acquiring additional relevant injury/illness information 4200 starts by receiving a user selection of time data for a starting time of work on the day of the crash incident (at 4210). This is typically the same day as the resultant injury/illness, but not always—sometimes the user may not be aware of an injury/illness suffered as a result of the crash incident.

In some embodiments, the detailed process for acquiring additional relevant injury/illness information 4200 then moves on to another step for receiving a user selection of a weather type at the time of the crash incident (at 4220). This user selection may be made by the user interacting with and selecting one out of several weather condition icon images, with a corresponding text description of the selected weather condition being retrieve and added to the field.

Next, the detailed process for acquiring additional relevant injury/illness information 4200 receives a user response (e.g., 'YES' or 'NO') as to whether there was another person involved in the incident as it pertains to the injury/illness (at 4230). This is followed by the detailed process for acquiring additional relevant injury/illness information 4200 receiving another user response (e.g., 'YES' or 'NO') as to whether there was another vehicle involved in the accident as it pertains to the injury/illness (at 4240). Then the detailed process for acquiring additional relevant injury/illness information 4200 receives yet another user response (e.g., 'YES' or 'NO') as to whether the user did any pre-work body stretching on the day of the crash incident (at 4250).

In some embodiments, the detailed process for acquiring additional relevant injury/illness information 4200 performs a step for receiving, as textual input or voice input converted to text data (by voice-to-text processing), a job description the user was performing at the time of the injury or on the day and time of the crash incident (at 4260).

In some embodiments, the detailed process for acquiring additional relevant injury/illness information 4200 proceeds to the next step for receiving, as textual input or voice input converted to text data (by voice-to-text processing), an incident description as it pertains to the injury/illness arising out of the crash incident (at 4270). Note that the user may have already provided an incident description, so this could just be confirmed by the user or the user could opt to update or edit an existing crash description entered by the user in a previous interface.

In some embodiments, the detailed process for acquiring additional relevant injury/illness information 4200 proceeds to the final step for aggregating all of the received information and data as additional relevant injury/illness information (at 4280). Since detailed process for acquiring additional relevant injury/illness information 4200 is performed when the high-level injury/illness reporting process 4100, described above by reference to FIG. 41, performs the step for proceeding to the second section for the user to provide additional relevant injury/illness details in connection with the crash incident (at 4180), the aggregated additional relevant injury/illness information (at 4280) is available as data back to the high-level injury/illness reporting process 4100.

Culminating the plurality of EIRS processes, FIG. 43 conceptually illustrates a final incident report creation and submission process 4300. The final incident report creation and submission process 4300 corresponds to the final incident report creation/submission section 2850, described above by reference to FIG. 28. In some embodiments, the final incident report creation and submission process 4300 starts by generating a final crash critical information checklist for each section/area in which information was acquired about the crash incident (at 4310). Next, the final incident report creation and submission process 4300 visually outputs a final checklist interface with the final crash critical information checklist with selectable drill-down options (at 4320). Then the final incident report creation and submission process 4300 visually outputs (at 4330) a selectable confirm and send tool within the final checklist interface.

After the steps for visually outputting the final checklist interface and selectable confirm and send tool, the final incident report creation and submission process 4300 of some embodiments determines (at 4340) whether the confirm and send tool is presently selected. When the confirm and send tool is affirmatively selected ('YES'), the final incident report creation and submission process 4300 transitions to a step for generating a final incident report with all of the (previously ongoing) crash critical information about the crash incident (at 4370). However, when the confirm and send tool is not presently selected ('NO'), the final incident report creation and submission process 4300 performs another determination (at 4350) of whether any of the checklist drill-down options are selected. When no checklist drill-down options is presently selected, the final incident report creation and submission process 4300 returns back to the step for determining (at 4340) whether the confirm and send tool is selected or not. However, when there is a current selection of a checklist drill-down option ('YES'), the final incident report creation and submission process 4300 moves on to a step for reverting back to the interface corresponding to the drill-down option selected from the final crash information checklist (at 4360). In that corresponding interface, the user may simply review the existing information (as previously provided) or make changes, updates, add additional details, etc. The EIRS system is a consolidated system that is able to take any such disparate (non-sequential) changes, updates, edits, removals, or additions (hereinafter referred to as "crash incident data changes") and update all data that is dependent on the crash incident data changes or wherever the crash incident data changes appears in other areas, interfaces, or sections. In this way, the EIRS system is able to cascade those crash incident data changes up and down through the sequence to the various areas, interfaces, or sections.

Turning back to the determination (at 4340), when the confirm and send tool is affirmatively selected ('YES'), the final incident report creation and submission process 4300 transitions to the step for generating the final incident report (at 4370) as described above. In this case, the final incident report would be generated to include any of the crash incident data changes and consequent changes to other aggregated data that result from the crash incident data changes. After generating the final incident report (at 4370), the final incident report creation and submission process 4300 saves (at 4380) the final incident report as generated, as well as all of the crash critical information about the incident (as aggregated and/or as updated based on any cascaded crash incident data changes). In some embodiments, the final incident report is saved in the persistent database. For instance, permanently stored in the EIRS database and persistent storage 2855, described above by reference to FIG. 28. Furthermore, the crash critical information about the crash incident is saved in the persistent data in connection with the final incident report. In some embodiments, the crash critical information about the crash incident is saved in original form (as provided initially by the user) and in all forms of changed data (e.g., in cascaded crash incident data changed form).

Beyond generating and saving the final incident report and the crash critical information about the incident, the final incident report creation and submission process 4300 also transmits the final incident report and the crash critical information about the incident to the notification group members (at 4390). In some embodiments, transmission is through email, text message link, or another digital/electronic notification method. In some embodiments, the notification group members include at least four members even when the notification group as a whole comprises more than four members. After transmitting the final incident report and the crash critical information about the incident to the members of the notification group (at 4390), the final incident report creation and submission process 4300 ends.

We claim:

1. A comprehensive electronic vehicular incident reporting (EIRS) process that provides comprehensive procedural control and guidance for gathering all critical information related to a vehicular incident, said comprehensive EIRS process comprising:

initializing an EIRS mobile app on a mobile device operable by a driver ("user") of a vehicle involved in a crash incident with another vehicle driven by another driver;

visually outputting, by the EIRS mobile app and on a screen of the mobile device, a preliminary incident reporting information interface;

receiving, by the EIRS mobile app, preliminary incident reporting information data entered by the user interacting with the preliminary incident reporting information interface;

generating, by the EIRS mobile app, a digital incident notification with the preliminary incident reporting information data;

retrieving, by the EIRS mobile app from a global positioning system (GPS) receiver of the mobile device, a current location of the user;

transmitting, by the EIRS mobile app, the digital incident notification with the preliminary incident reporting information data and the current location of the user to a notification group;

providing, by the EIRS mobile app, a crash critical user and incident section by (i) visually outputting, on the screen of the mobile device, an interactive crash critical user and incident interface, (ii) presenting, within the interactive crash critical user and incident interface, a plurality of crash critical information questions relating to the crash incident, (iii) prompting the user to interact with the interactive crash critical user and incident interface and enter response data for each crash critical information question, (iv) receiving a plurality of user-entered response data answers responsive to the plurality of crash critical information questions, and (v) aggregating the plurality of user-entered response data answers as crash critical information about the crash incident;

providing, by the EIRS mobile app, a crash critical other driver information section by (i) visually outputting, on the screen of the mobile device, a crash critical other driver information interface, (ii) receiving user-provided license data associated with a driver's license of the other driver of the other vehicle involved in the crash incident and comprising an image of the other driver's license including a plurality of pixels, (iii) analyzing the plurality of pixels of the image to detect a first portion of the image including a human face, (iv) identifying a first group of pixels representing the human face, (v) modifying the first group of pixels to obscure the human face, (vi) receiving an updated license image after obscuring the human face, (vii) analyzing the plurality of pixels to detect one or more additional portions of the image including character-based text information, (viii) identifying a second portion of the image including character-based text information about the other driver, (ix) applying optical character recognition (OCR) to the second portion of the image including character-based text information about the other driver, (x) receiving OCR image-to-text data as output from applying OCR to the second portion of the image, (xi) receiving user-provided vehicle registration data and vehicle insurance data associated with the other vehicle, and (xii) aggregating the updated license image, the OCR image-to-text data, the vehicle registration data, and the vehicle insurance data as other driver data;

providing, by the EIRS mobile app, a crash incident photos section by (i) visually outputting, on the screen of the mobile device, a crash photos interface, (ii) receiving a user selection of an image capture and upload tool, (iii) activating a camera of the mobile device within the EIRS mobile app, (iv) receiving an accident image associated with the crash incident, (v) receiving a plurality of damage images including at least a first damage image of damage to the user's vehicle and a second damage image of damage to the other vehicle, (vi) receiving damage descriptions corresponding to the plurality of damage images, and (vii) aggregating the accident image, the plurality of damage images, and the damage descriptions as crash incident photo and text data, wherein the crash critical information, the other driver data, and the crash incident photo and text data are progressively aggregated into a unified crash-critical data structure maintained by the EIRS mobile app; and providing, by the EIRS mobile app, a final crash incident report section by (i) generating a final crash critical information checklist based on the unified crash-critical data structure, (ii) visually outputting a checklist interface configured to enable user review of aggregated information, (iii) receiving a user selection of a selectable confirm and send tool of the checklist interface as a user confirmation input, (iv) generating a final incident report from the unified crash-critical data structure in response to receiving the user confirmation input, and (v) transmitting the final incident report to the notification group.

2. The comprehensive EIRS process of claim 1, wherein providing the crash incident photos section further comprises:

maintaining the camera of the mobile device activated within the EIRS mobile during capture of the accident image associated with the crash incident and the plurality of damage images such that the accident image and the plurality of damage images are captured in a continuous image capture session within the EIRS mobile app; and associating each of the plurality of damage images with a corresponding damage description entered by the user through the crash photos interface prior to aggregation into the unified crash-critical data structure.

3. The comprehensive EIRS process of claim 1, wherein providing the final crash incident report section further comprises:

requiring completion of review of each item in the final crash critical information checklist prior to enabling selection of the selectable confirm and send tool; and preventing generation of the final incident report until the user confirmation input is received after completion of review of each item in the final crash critical information checklist.

4. A non-transitory computer readable medium storing a comprehensive electronic vehicular incident reporting (EIRS) application which, when executed on a processing unit of a mobile computing device, provides comprehensive procedural control and guidance for gathering all critical information related to a vehicular incident, the comprehensive EIRS application comprising sets of instructions for:

visually outputting, on a screen of a mobile device operable by a driver ("user") of a vehicle involved in a crash incident, a preliminary incident reporting information interface;

receiving preliminary incident reporting information data entered by the user interacting with the preliminary incident reporting information interface on the screen of the mobile device;

generating a digital incident notification with the preliminary incident reporting information data;

retrieving, from a global positioning system (GPS) receiver of the mobile device, a current location of the user;

transmitting the digital incident notification with the preliminary incident reporting information data and the current location of the user to a notification group;

providing, on the screen of the mobile device, a crash critical user and incident section by (i) visually outputting, on the screen of the mobile device, an interactive crash critical user and incident interface, (ii) presenting, within the interactive crash critical user and incident interface, a plurality of crash critical information questions relating to the crash incident, (iii) prompting the user to interact with the interactive crash critical user and incident interface and enter response data for each crash critical information question, (iv) receiving a plurality of user-entered response data answers responsive to the plurality of crash critical information questions, and (v) aggregating the plurality of user-entered response data answers as crash critical information about the crash incident;

providing, on the screen of the mobile device, a crash critical other driver information section by (i) visually outputting, on the screen of the mobile device, a crash critical other driver information interface, (ii) receiving user-provided license data associated with a driver's license of the other driver of the other vehicle involved in the crash incident and comprising an image of the other driver's license including a plurality of pixels, (iii) analyzing the plurality of pixels of the image to detect a first portion of the image including a human face, (iv) identifying a first group of pixels representing the human face, (v) modifying the first group of pixels to obscure the human face, (vi) receiving an updated license image after obscuring the human face, (vii) analyzing the plurality of pixels to detect one or more additional portions of the image including character-based text information, (viii) identifying a second portion of the image including character-based text information about the other driver, (ix) applying optical character recognition (OCR) to the second portion of the image including character-based text information about the other driver, (x) receiving OCR image-to-text data as output from applying OCR to the second portion of the image, (xi) receiving user-provided vehicle registration data and vehicle insurance data associated with the other vehicle, and (xii) aggregating the updated license image, the OCR image-to-text data, the vehicle registration data, and the vehicle insurance data as other driver data;

providing, on the screen of the mobile device, a crash incident photos section by (i) visually outputting, on the screen of the mobile device, a crash photos interface, (ii) receiving a user selection of an image capture and upload tool, (iii) activating a camera of the mobile device, (iv) receiving an accident image associated with the crash incident, (v) receiving a plurality of damage images including at least a first damage image of damage to the user's vehicle and a second damage image of damage to the other vehicle, (vi) receiving damage descriptions corresponding to the plurality of damage images, and (vii) aggregating the accident image, the plurality of damage images, and the damage descriptions as crash incident photo and text data, wherein the crash critical information, the other driver data, and the crash incident photo and text data are progressively aggregated into a unified crash-critical data structure maintained by the EIRS application; and providing, on the screen of the mobile device, a final crash incident report section by (i) generating a final crash critical information checklist based on the unified crash-critical data structure, (ii) visually outputting a checklist interface configured to enable user review of aggregated information, (iii) receiving a user selection of a selectable confirm and send tool of the checklist interface as a user confirmation input, (iv) generating a final incident report from the unified crash-critical data structure in response to receiving the user confirmation input, and (v) transmitting the final incident report to the notification group.

5. The non-transitory computer readable medium of claim 4, wherein the set of instructions for providing the crash incident photos section further comprises sets of instructions for:

maintaining the camera of the mobile device activated within the EIRS application during capture of the accident image associated with the crash incident and the plurality of damage images such that the accident image associated with the crash incident and the plurality of damage images are captured in a continuous image capture session within the EIRS application; and associating each of the plurality of damage images with a corresponding damage description entered by the user through the crash photos interface prior to aggregation into the unified crash-critical data structure.

6. The non-transitory computer readable medium of claim 4, wherein the set of instructions for providing the final crash incident report section comprises sets of instructions for:

requiring completion of the review of each item in the final crash critical information checklist prior to enabling selection of the confirm and send tool; and preventing generation of the final incident report until the user confirmation input is received after completion of the review of each item in the final crash critical information checklist.

* * * * *